US012782889B2

(12) United States Patent
Sun et al.

(10) Patent No.: US 12,782,889 B2
(45) Date of Patent: Nov. 3, 2026

(54) SYSTEM AND METHOD FOR IDENTIFYING PROCESS-TO-PRODUCT CAUSAL NETWORKS AND GENERATING PROCESS INSIGHTS

(71) Applicant: Eigen Innovations Inc., Fredericton (CA)

(72) Inventors: Ganyan Sun, Fredericton (CA); Joshua Pickard, Fredericton (CA); Scott Everett, Fredericton (CA)

(73) Assignee: Eigen Innovations Inc., Fredericton (CA)

( * ) Notice: Subject to any disclaimer, the term of this patent is extended or adjusted under 35 U.S.C. 154(b) by 260 days.

(21) Appl. No.: 18/791,119

(22) Filed: Jul. 31, 2024

(65) Prior Publication Data

US 2025/0044749 A1 Feb. 6, 2025

Related U.S. Application Data

(60) Provisional application No. 63/516,733, filed on Jul. 31, 2023.

(51) Int. Cl.
*G05B 13/02* (2006.01)

(52) U.S. Cl.
CPC ................................ *G05B 13/0265* (2013.01)

(58) Field of Classification Search
None
See application file for complete search history.

(56) References Cited

U.S. PATENT DOCUMENTS

| | | | |
|---|---|---|---|
| 10,360,527 B2 | 7/2019 | Abe et al. | |
| 10,739,752 B2 | 8/2020 | Zhao et al. | |
| 2019/0384255 A1 | 12/2019 | Krishnaswamy et al. | |
| 2021/0256406 A1 * | 8/2021 | Lau | G06F 16/287 |
| 2023/0052691 A1 | 2/2023 | Thiruvenkatanathan | |

OTHER PUBLICATIONS

Glymour, C. et al. "Review of Causal Discovery Methods Based on Graphical Models." Frontiers in genetics vol. 10 524. Jun. 4, 2019 doi:10.3389/fgene.2019.00524.
Granger, C. W. J. "Investigating Causal Relations by Econometric Models and Cross-Spectral Methods." Econometrica, vol. 37, No. 3, 1969, pp. 424-438. JSTOR https://doi.org/10.2307/1912791.
Peng, B. et al. "GODEL: Large-Scale Pre-Training for Goal-Directed Dialog" Jun. 22, 2022 arXiv:2206.11309v1 [cs.CL] Jun. 22, 2022.

* cited by examiner

*Primary Examiner* — Ryan A Jarrett

(57) ABSTRACT

System and method for context prediction via application-specific process-to-product causal networks for generating manufacturing insights. A process graph is obtained that comprises a set of data nodes, including operation specific process data nodes and product data nodes. A probabilistic graph model (PGM) is learned for the industrial process based on the process graph and historic process and product data collected for the industrial process in respect of the data nodes The PGM comprises a computed structure and a set of relationship parameters.

20 Claims, 41 Drawing Sheets

110

| | Defect True | Defect False |
|---|---|---|
| $F^a, x^0$ | 0.1 | 0.9 |
| $F^b, x^0$ | 0.4 | 0.6 |
| $F^c, x^0$ | 0.05 | 0.85 |
| $F^a, x^1$ | 0.33 | 0.67 |
| $F^b, x^1$ | 0.99 | 0.01 |
| $F^c, x^1$ | 0.2 | 0.8 |

FIG. 11D

Context Insight

Summary - We identified several highly relevant process data relationships that resulted in a defective part.

Details

| Defect A True Context | Relevance Score |
|---|---|
| Context 1 | 90 % |
| Context 2 | 75 % |
| Context 3 | 25 % |

Action - Decrease the probability of defect A from <Value> to <Value> by adjusting setpoint X2 at location 2 to <Value>.

FIG. 14A

Context Insight

Summary - Context prediction identified a high probability that the process is trending towards the production of a bad part.

Details

| Defect True Context | Confidence Score |
|---|---|
| Location 2 + Setting 2 | 90 % |
| Location 2 + Sensor 1 | 75 % |
| Location 3 + Sensor 3 | 25 % |

Action - Consider adjusting Setting 2 at Location 2 to <Value> to improve the production process.

FIG. 14B

| | | |
|---|---|---|
| 0 | 1 | 2 |
| 0.15 | 0.77 | 0.08 |

P(E)

| | |
|---|---|
| 0 | 1 |
| 0.5 | 0.5 |

P(F1|[E, x1])

| | | |
|---|---|---|
| 0 | 1 | 2 |
| 0.14 | 0.19 | 0.00 |
| 0.14 | 0.19 | 0.00 |

| | | |
|---|---|---|
| 0 | 1 | 2 |
| 0.33 | 0.64 | 0.63 |
| 0.33 | 0.64 | 0.63 |

| | | |
|---|---|---|
| 0 | 1 | 2 |
| 0.53 | 0.17 | 0.37 |
| 0.53 | 0.17 | 0.37 |

P(Flash|[E, F1])

| | | |
|---|---|---|
| 0 | 1 | 2 |
| 0.50 | 0.40 | 0.58 |
| 0.50 | 0.40 | 0.58 |

| | | |
|---|---|---|
| 0 | 1 | 2 |
| 0.50 | 0.60 | 0.42 |
| 0.50 | 0.60 | 0.42 |

| | features | scores |
|---|---|---|
| 6 | Barrel_Pressure_0__percentage_of_reoccurring_v... | -4668.746759 |
| 18 | Hydraulic_Back_Pressure__fourier_entropy__bins_10 | -4242.961164 |
| 22 | Hydraulic_Back_Pressure__symmetry_looking__r_0.2 | -3017.968599 |
| 23 | Mold_Pressure_2__fourier_entropy__bins_10 | -2956.001554 |
| 39 | Engle_Speed__symmetry_looking__r_0.2 | -2539.341150 |
| 34 | Engle_Speed__large_standard_deviation__r_0.350... | -2400.882335 |
| 42 | Barrel_Pressure_0__large_standard_deviation__r... | -2390.396766 |
| 153 | Barrel_Pressure_1__value_count__value_1 | -2142.307980 |
| 48 | Engle_Speed__large_standard_deviation__r_0.300... | -2126.077319 |
| 27 | Barrel_Pressure_2__large_standard_deviation__r... | -1725.705488 |
| 31 | Barrel_Pressure_1__symmetry_looking__r_0.05 | -1276.418520 |
| 47 | Barrel_Pressure_1__large_standard_deviation__r... | -1267.212217 |

FIG. 18C

SYSTEM AND METHOD FOR IDENTIFYING PROCESS-TO-PRODUCT CAUSAL NETWORKS AND GENERATING PROCESS INSIGHTS

RELATED APPLICATIONS

This application claims the benefit and priority of U.S. Provisional Patent Application No. 63/516,733 "SYSTEM AND METHOD FOR IDENTIFYING PROCESS-TO-PRODUCT CAUSAL NETWORKS AND GENERATING PROCESS INSIGHTS" filed Jul. 31, 2023, the contents of which are incorporated herein by reference.

FIELD

This disclosure relates generally to methods and systems for managing industrial processes, and in particular to systems and methods for identifying process-to-product causal networks and generating process insights.

BACKGROUND

Monitoring and managing complex production processes is an ongoing challenge for engineers and researchers. A fundamental task in performing various production processes is to understand the context of the processes, find underlying causal relations within the context, and use the identification of these causal relationships to derive meaningful insights that can be leveraged for process management and improvement activities.

Systems for autonomous predictive real-time monitoring of faults in process and equipment are known (See for example, U.S. patent documents US20190384255A1, US20230052691A1, U.S. Ser. No. 10/360,527B2, U.S. Ser. No. 10/739,752B2). In known solutions, a monitoring component can record a dynamic system, and a predictive model can predict a trend of failure. However, without understanding the context of the complex production processes, fault diagnosis or system health monitoring are always passive responses. Isolating factors that are a source of the defects/faults in complex production processes are challenging since the processes require multiple steps, various materials, and distinct physical/chemical/biological conditions, among other things. The process variables relating to defects/faults may not be the underlying causes.

Finding underlying causal relations is known as causal discovery. A traditional way to discover causal relations is to use interventions or randomized experiments. However, experiments during production processes are expensive, time consuming, and constrained by the nature of the production processes. Therefore, in the context of industrial processes, causal discovery is often based on gathering purely observational data, turning those observations into causal knowledge, and applying that causal knowledge in planning and prediction.

Causal knowledge can be modelled as causal networks. One kind of representation of a causal network is the directed graphical causal model (DGCM), which is composed of variables (nodes), directed connections (edges) between pairs of variables, and a joint probability distribution over the possible values of all the variables.

Machine learning based prediction usually relies on two main approaches: either finding a function mapping inputs to class labels or finding the probability distributions over the variables and then using these distributions to answer queries about new data points. When a DGCM uses probability distributions over all the variables, and then marginalizes and reduces over these variables according to new data points to get the probabilities of classes, the DGCM provides inference over the joint distributions. This allows users to explore and exploit causality based on data.

Causal discovery relies on data, and the data are produced by not only the underlying causal process but also the sampling process. In practice, to achieve reliable causal discovery, specific challenges are addressed by estimating the causal generating processes for a time series. According to Granger Causality [Granger, C. (1969). Investigating Causal Relations by Econometric Models and Cross-spectral Methods. Econometrica, 37(3), 424-438. https://doi.org/10.2307/1912791], if a time series X Granger-causes another time series Y, then predicting future values of Y using the knowledge of the past values of X is better than using the past values of Y alone. However, Granger causality is very sensitive to temporal aggregation or subsampling. If data are subsampled or temporally aggregated due to the measuring device, sampling procedure, or storage limitations, the true causal relations may not be identifiable. Therefore, combining product data with process data in real-time is necessary for capturing causal relations.

In the context of industrial processes such as manufacturing processes, understanding the context of the process and effectively leveraging this information for real-time monitoring of the process are important for improving product insights through available process data. Known solutions fail to provide robust and consistent causal insights for the prevention of process and product issues, manifesting in a disconnect between unstructured expert knowledge and the generic learning strategies of a learning system. The unstructured and fragmented nature of expert knowledge, coupled with the challenges of expert participation in the knowledge capture process, create significant barriers to the integration of that knowledge into a real-time system. On the contrary, the expense of real-world experimentation or the incongruence of simulated data result in learning systems that are unable to provide robust, interpretable and real-time insights in manufacturing environments.

Accordingly, there is a need for intelligent systems and methods that can be applied to understand the context of industrial processes, to find underlying causal relations between processes and the final products of such processes and make use of this contextual and causal relation data to provide meaningful and actionable insights for the processes.

SUMMARY

According to an example aspect, a computer implemented method and system is described for a system and method for context prediction via application-specific process-to-product causal networks for generating manufacturing insights.

According to a first example aspect of the disclosure, a method of generating a causal network representation of an industrial process that is configured to perform one or more process operations to generate a product is disclosed. The method includes obtaining a process graph that comprises a set of data nodes for the industrial process. The set of data nodes included (i) for at least some of the process operations, a respective set of operation specific process data nodes, wherein the process data nodes for each respective process operation represent variables that are specified, measured or derived for the respective process operation, and one or more product data nodes that represent variables that are specified, measured, or derived for the product. The method also includes learning a probabilistic graph model (PGM) for the industrial process based on the process graph and historic process and product data collected for the industrial process in respect of the data nodes Learning the PGM includes: computing a graph structure based on the process graph and the historic process and product data, the graph structure including a subset of the set of data nodes from the process graph and defining a set of edges that connect data nodes within the subset that have been identified as having causal relationships, and computing a set of parameters that includes a respective probability for each of the edges in the set of edges, the respective probability for each edge indicating a causal relationship probability between the data nodes that are connected by the edge. The PGM comprises the computed optimal graph structure and the computed set of parameters. The learned PGM is stored.

In some examples, the method also includes obtaining new values in respect of the industrial process for the variables of the data nodes represented in the process graph; generating predictions or insights in respect of the process based on the new values and the PGM; and performing an action based on the generated predictions or insights.

In some examples, the action comprises causing information about the predictions or insights to be displayed as part of a graphical user interface display.

In some examples, the action comprises causing an operating parameter of the industrial process to be adjusted.

In some examples, generating the predictions or insights comprises performing causality structure predictions or conditional probability inference to generate a causal information prediction that estimates the relevance of relationships between respective pairs of the data nodes included in the graph structure.

In some examples, the causal information prediction is provided for at least one pair of data nodes that are not directly connected to each other by an edge.

In some examples, at least some of the data nodes have associated semantic descriptors, wherein generating the predictions or insights comprises generating insights based on the output of large language model (LLM) that has received at least some of the associated semantic descriptors as inputs.

In some examples, at least some of the data nodes are associated with a respective semantic descriptor that provides a natural language context for the variable that is represented by the data node.

In some examples, obtaining the process graph comprises prompting an LLM with information about the industrial process and receiving a list of proposed data nodes together with associated semantic descriptors for the process graph in response to the prompting.

In some examples, the respective set of operation specific data nodes for at least one of the process operations includes: specified data (SD) nodes that represent variables that are specified for the respective process operation; measured data (MD) nodes that represent variables that are obtained using respective process operation sensors at the respective process operation; and feature descriptor (FD) nodes that represent variables that are derived from data included in SD nodes or MD nodes.

In some examples, the method includes obtaining a value for an FD node by: (i) computing a representative value for time series of MD node values; or (ii) applying a machine learning based model to map an image captured for an MD node to a node value.

In some examples, computing the graph structure comprises computing an optimized graph structure by applying a structure learning algorithm to identify non-relevant data nodes and non-relevant edges that are represented in the process graph.

In some examples, obtaining the PGM model further comprises obtaining a base PGM model for a different industrial process and applying transfer learning to adapt the base PGM model for the industrial process.

In some examples, the data nodes include a quality related data node representing a variable that indicates a quality of the product, and the PGM model embeds causal relationship information indicative of the relevance of other data nodes within the PGM model to the quality related data node.

In some examples, the set of parameters that includes respective probability for each of the edges in the set of edges are represented as one or more conditional probability tables.

In some examples, the industrial process in an injection molding process.

According to further example aspect a system comprising a processor and a persistent storage that stores instructions that, when executed by the processor configuring the system to perform a method of generating a causal network representation of an industrial process that is configured to perform one or more process operations to generate a product. The method can be any of the examples described above.

According to a further example aspect, a system for managing industrial processes is disclosed. The system includes: a data collection module configured to collect specified data (SD) and measured data (MD) from an industrial process; a processing module configured to process the collected data to generate feature descriptors (FD) from the specified data (SD) and measured data (MD); a graphical modeling engine configured to generate a probabilistic graphical model (PGM) from the feature descriptors (FD), specified data (SD), and measured data (MD); an PGM processing module configured to produce context predictions or insights based on the PGM; and a client module configured to present the generated insights to process operators through an interactive graphical user interface (GUI).

In some examples, the data collection module is further configured to collect data from inline process components, including machine-based controllers and sensors, and manual operator inputs through a human-machine interface.

In some examples, the specified data (SD) includes predefined product characteristics and the measured data (MD) includes information collected from quality-based inspection devices such as machine vision sensors.

BRIEF DESCRIPTION OF THE DRAWINGS

Reference will now be made, by way of example, to the accompanying drawings which show example embodiments of the present application, and in which:

FIG. 11D which shows a tabular example of conditional probability distributions computed for relationships for the nodes of the graph of FIG. 11B.

FIGS. 14A and 14B illustrate examples of context insight information that can be generated according to example implementations.

FIG. 18C illustrates a GUI depicting, in tabular format, the highly ranked feature descriptors included in the process graph of FIG. 18A.

Similar reference numerals may have been used in different figures to denote similar components.

DESCRIPTION OF EXAMPLE EMBODIMENTS

This disclosure presents systems and methods for identifying process-to-product causal networks and generating process insights for an application-specific process.

As used in this disclosure, "process" can refer to the manufacturing operation or consecutive manufacturing operations (also referred to as "stages") that convert raw materials or components into finished products. Each stage may be performed by one or more machines; conversely, in some examples, a single machine may perform multiple stages. "Product" can refer to the output of a specific process, which may be a finished product or a component that is then provided to another process.

Figure 1:
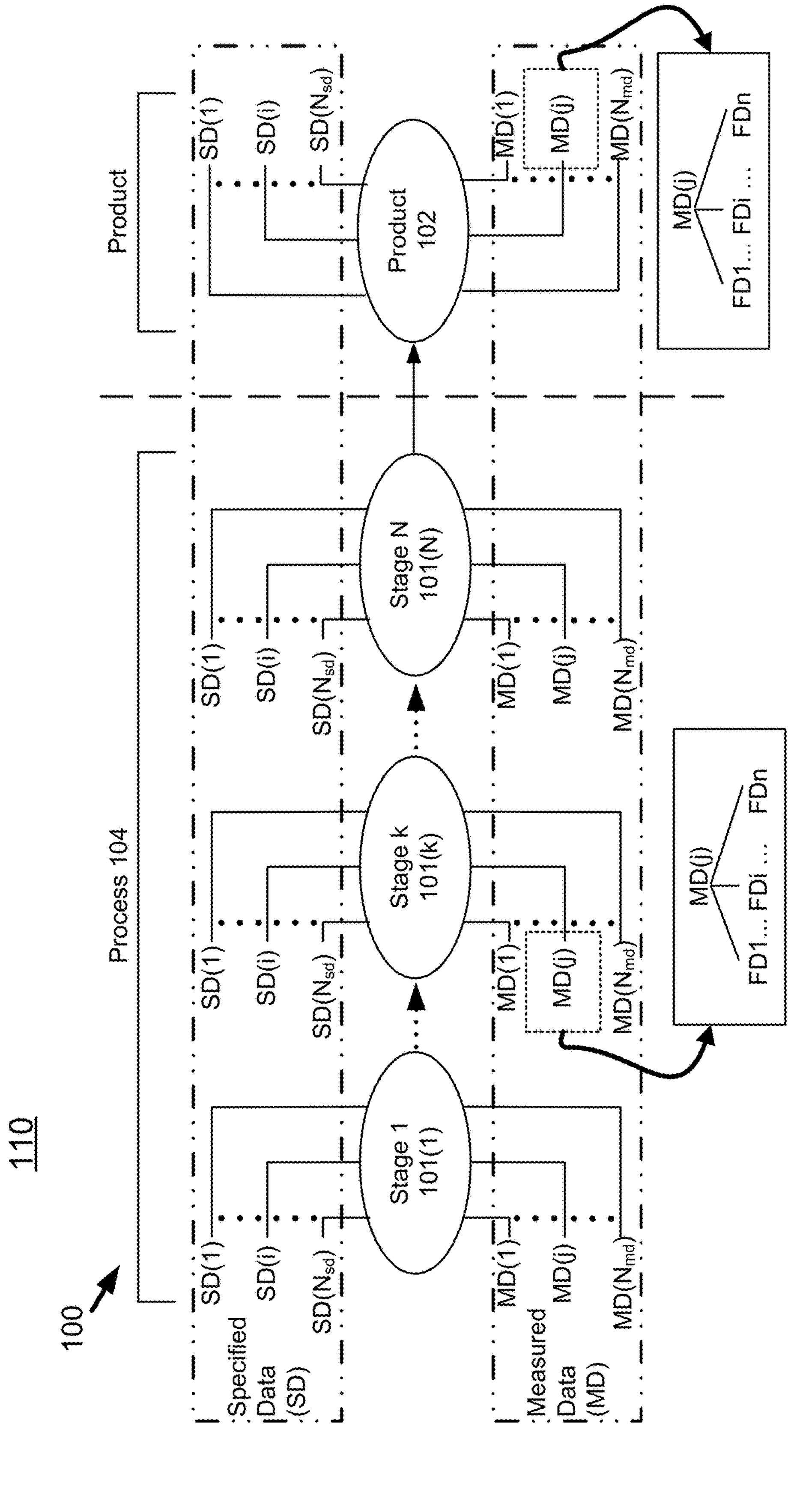
FIG. 1 is a block diagram illustrating an interactive graphical user interface depicting a process graph representing an industrial process according to example embodiments.
Figure 2:
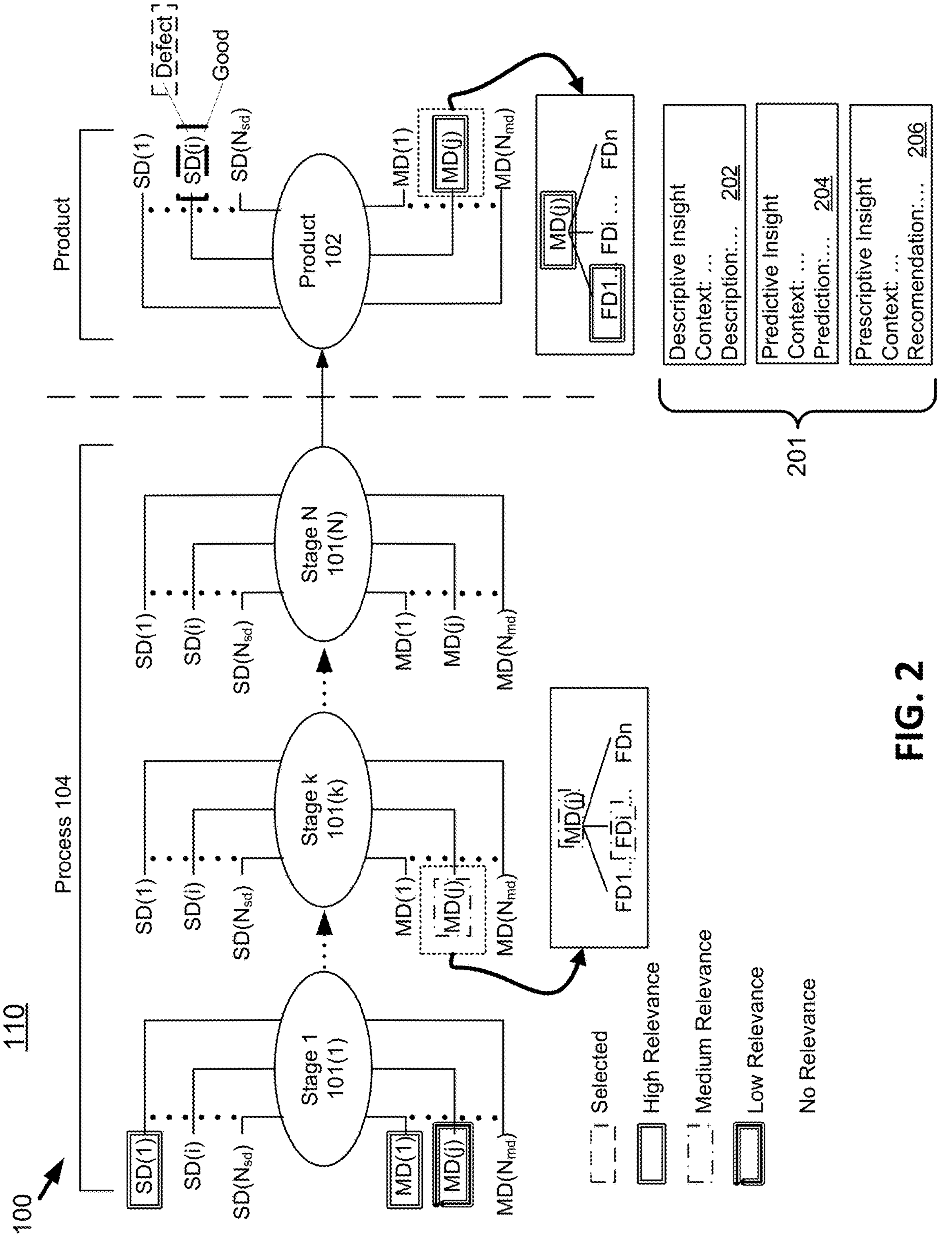
FIG. 2 illustrates the graphical user interface of FIG. 1 with causal data overlaid on the process graph together with generated insight data.

A high level description of example aspects of the disclosure will be provided with reference to FIGS. 1, 2 and 3. Further details of such aspects will then be described further below.

In an example embodiment, FIG. 1 is a block diagram illustrating a process graph 100 representing an industrial process 104 that produces a product 102, according to example embodiments. In one example, process graph 100 can be displayed on a display screen of a computer device as part of an interactive graphical user interface (GUI) 110. The industrial process 104 includes multiple successive processing stages 101(1) to 101(N) (index value "k" is used herein to denote a representative stage) that collectively produce product 102. Each processing stage 101(1) to 101(N) corresponds to a physical activity (or set of activities) and can be represented as a respective process stage node ("Stage 1", "Stage k", "Stage N") in the process graph 100. Product 102 is represented in process graph 100 by a Product Node.

As illustrated in FIG. 1, process graph 100 can include data, represented as data nodes, about the process 104 and the product 102. In this regard, "process data" can include all information related to the process 104, the environment of the process 104, and the process operators (e.g., human or other intelligent operators). For example, process data can include: machine data such as sensor readings and setpoint values; environment data such as operating conditions, time of day, etc.; and operator information such as shift, user identification, etc. "Product data" can include all information related to the product, such as: human inputs on product quality; sensor readings, such as image data from machine vision systems, and other measured product features including quality, dimensions, etc.

Process 104 can take a number of different configurations in different example implementations. For example, process 104 can, in various implementations, include one or more machines that manufacture the same product or similar products (e.g. same base product with different materials, finishes, etc.), or one or more machines that manufacture different products using similar processes.

The methods and systems described herein can be applied to any number of industrial processes, however for illustrative purposes at least some example implementations will be described in the context of an injection molding process. In the case of an injection molding process, stages 101(1) to 101(N) for a single injection molding machine can, for example, include: heating stage (materials are heated); injection stage (molten material is injected into a mold); holding stage (molten material held at pressure equilibrium until gate freeze); cooling stage (material is cooled in mold); and ejection state (solidified part is ejected from mold). These stages collectively result in manufacturing of a production part (product 102). In the example where process 104 is an injection molding process, the process data may for example include sensor time series data, setpoint values, room temperature data, shift time data, operator data, etc. Product data can, for example, include: operator labelled defects (e.g., different types of defects such as flash, short shot, splay, warping, etc.), thermal image data (e.g., illustrating cold spots), and color image data (e.g., illustrating surface texture).

Injection molding process scenarios can include, for example: one or more injection molding machines manufacturing the same or similar parts (various shape, dimensions, synthetic polymer or plastic); one or more injection molding machines manufacturing different products that incorporate similar processes (metal injection molding machine, plastic injection molding machine); one or more products from the same injection molding process.

As illustrated in FIG. 1, process and product data each include specified data (SD) and measured data (MD). Specified data SD can, for example, include all information collected from human inputs or predefined machine inputs related to the process 104 or product 102. This may include preconfigured product characteristics, such as geometry from CAD models, defect proximity, setpoints, etc. Measured data MD can, for example, include all information collected from measurement devices, such as embedded or external sensors related to the process 104 or product 102.

The specified data SD for each process stage 101($k$) can include multiple specified data elements SD(1) to SD($N_{sd}$) (represented as respective data nodes), where $N_{sd}$ denotes the number of data elements for the process stage ($N_{sd}$ can have a different value for each process stage) and the index "i" denotes a generic data element SD(i) for the process stage 101($k$). Similarly, the measured data MD for each process stage 101($k$) can include multiple measured data elements MD(1) to MD($N_{md}$), where $N_{md}$ denotes the number of data elements for the process stage ($N_{md}$ can have a different value for each process stage) and the index "j" denotes a generic measured data element MD(j) for the process stage 101($k$). Some of the data elements may be tensors that are comprised of further elements. In some examples, data elements may be processed to extract feature descriptors. For example, measured data element MD(j) can be processed to generate a set of one or more associated measured data feature descriptors FD1, . . . , FDn. In some examples, specified data SD elements can also be processed to generate a set of one or more associated specified data feature descriptors. These feature descriptors also are represented as data nodes in the process graph 100.

Similarly, the specified data SD for product 102 can include multiple specified data elements SD(1) to SD($N_{sd}$), where $N_{sd}$ denotes the number of data elements for the product and the index "i" denotes a generic data element SD(i) for the product 102. Similarly, the measured data MD for product 102 can include multiple measured data elements MD(1) to MD($N_{md}$), where $N_{md}$ denotes the number of data elements for the product 102.

In process graph 100, each stage's respective specified data elements SD(1) to SD($N_{sd}$), and each stage's respective measured data elements MD(1) to MD($N_{md}$), correspond to a respective process node of the process graph 100. Product 102's specified data elements SD(1) to SD($N_{sd}$), and product 102's respective measured data elements MD(1) to MD($N_{md}$), each correspond to a respective product node of the process graph 100. The feature descriptors FD can correspond to sub-nodes of nodes of process graph 100.

FIG. 2 illustrates the GUI 110 of FIG. 1 with causal network data overlaid on the process graph 100 together with generated insight data. In example embodiments the causal network data is obtained based on a trained probabilistic graphical model (PGM) that has been trained over time in respect of the process 104 and product 102. In one example, an operator can use a navigation indicator (e.g., a pointing element controlled by a pointing device such as a mouse or trackpad) to select a node represented in the GUI 110. Selection of the node causes causal network summary data to be displayed on the process graph, together with insights 201 that can, for example include descriptive insight 202, a predictive insight 204 and a prescriptive insight 206.

In the example of FIG. 2, the product 102 has an associated specified data node, namely specified data element SD(i), that indicates the result of a manual quality assurance input regarding product quality, which has two possible values, "Defect" and "Good". An operator who is seeking causal information as to what has caused a "Defect" has used a navigation indicator to select the specified data element SD(i). As a result, causal network summary data is overlaid on process graph 100 in the GUI 110. The causal network summary data overlaid on process graph 100 indicates the following: specified data element SD(1) and measured data element MD(1) of stage 101(1) each have high relevance to specified data element SD(i) for product 102; measured data element MD(j) of stage 101(1) has low relevance to specified data element SD(i) for product 102; measured data element MD(j) of stage 101(*k*), and in particular its feature descriptor FDi, has medium relevance to specified data element SD(i) for product 102; and measured data element MD(j) of product 102, and in particular its feature descriptor FD1, has high relevance to specified data element SD(i) for product 102.

Figure 3A:
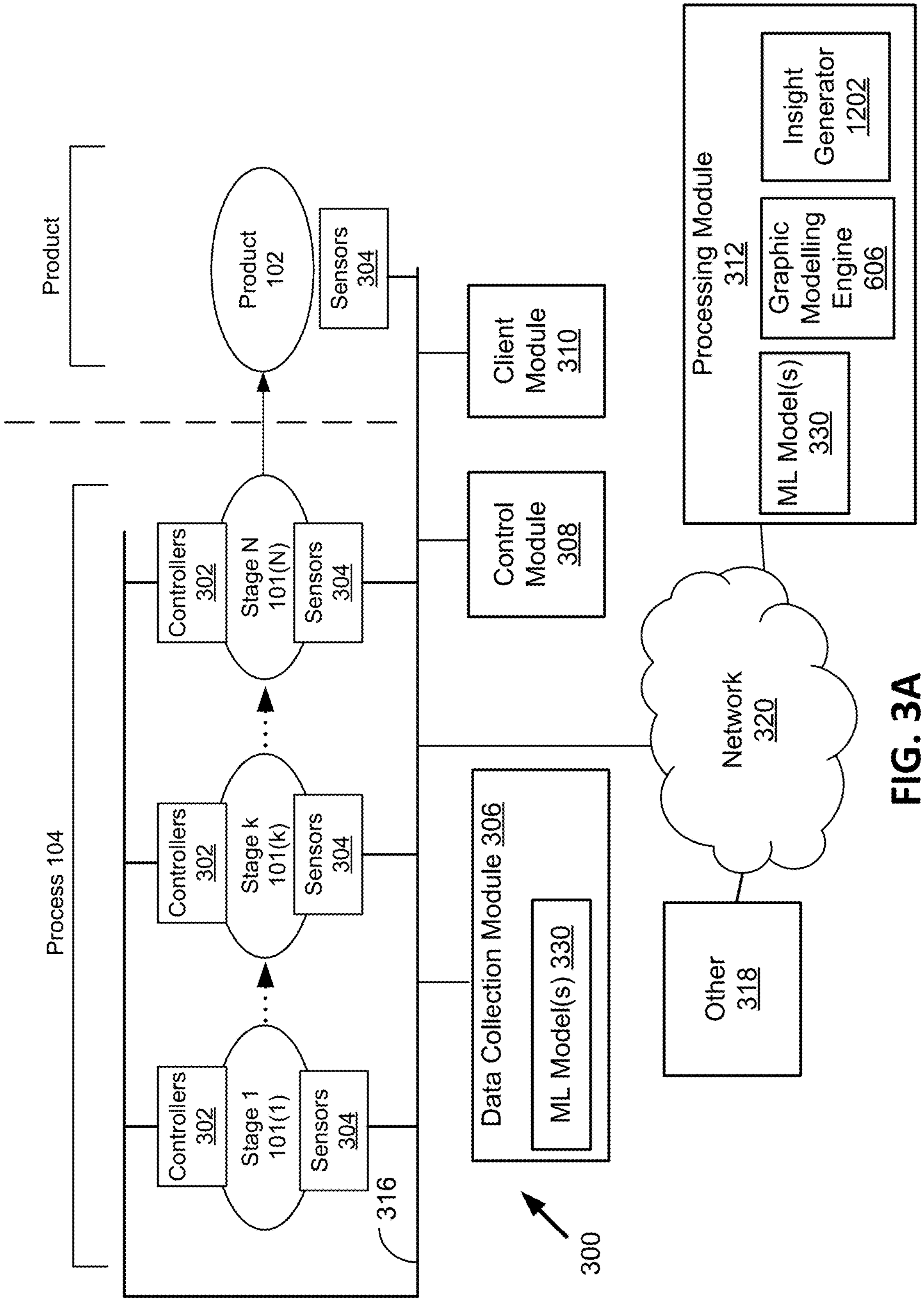
FIG. 3A is a block diagram of a computer implemented system used to control an industrial process, collect and process information in respect of the industrial process, and predict causal networks and generate insights for the industrial process based on the collected information.

FIG. 3A is a block diagram of a computer implemented system 300 used to collect and process information in respect of the industrial process 104 represented as a process graph 100 in FIGS. 1 and 2. Computer implemented system 300 can be used to predict causal network relationships (e.g., such as the causal network summary information overlaid on process graph 100 in FIG. 2) and generate insights 201 (e.g., descriptive insight 202, predictive insight 204 and prescriptive insight 206) for the industrial process 104 based on the collected information.

In example embodiments, the components of system 300 include one or more sensors 304 and controllers 302 associated with each of the industrial process stages 102(1) to 101(N), at least one data collection module 306, at least one control module 308, at least one client module 310, at least one processing module 312, and one or more other modules 318. As used here, a "module" can refer to a combination of a hardware processing circuit and machine-readable instructions and data (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

In example embodiments, controllers 302, sensors 304, data collection module 306, control module 308 and client module 310 may be located at an industrial process location or site and enabled to communicate with an enterprise or local communications network 316 that includes wireless links (e.g. a wireless local area network such as WI-FI™ or personal area network such as Bluetooth™), wired links (e.g. Ethernet, universal serial bus, network switching components, and/or routers), or a combination of wireless and wireless communication links. In example embodiments, processing module 312 and other modules 318 may be located at one or more geographic locations remote from the industrial process location and connected to local communications network 318 through a further external network 320 that may include wireless links, wired links, or a combination of wireless and wireless communication links. External network 320 may be a cloud network and may include the Internet. In some examples, one or more of data collection module 306, control module 308, and client module 310 may alternatively be distributed among one or more geographic locations remote from the industrial process location and connected to the remaining modules through external network 320. In some examples, processing module 312 and one or more other modules 318 may be located at the industrial process location and directly connected to local communications network 316. In some examples, data collection module 306, control module 308, client module 310, processing module 312 and one or more other modules 318 may be implemented using suitably configured processor enabled computer devices or systems such as personal computers, industrial computers, laptop computers, computer servers, edge devices, smartphones, and programmable logic controllers. In some examples, individual modules may be implemented using a dedicated processor enabled computer device, in some examples multiple modules may be implemented using a common processor enabled computer device, and in some examples the functions of individual modules may be distributed among multiple processor enabled computer devices. Further information regarding example processor enabled computer device configurations will be described below.

In example embodiments, sensors 304 that are associated with a respective stage 101(*k*) can for example include standard industrial process sensors such as image sensors (cameras), temperature sensors, pressure sensors, current sensors, vibrations sensors, inertial measurement unit sensors, and position sensors, among other things. The controllers 302 that are associated with a respective stage 101(*k*) can include electronic controllers that cause an automated process action to occur based on one or more input commands and/or setpoints that can be included, for example, in specified data elements SD(1) to SD($N_{sd}$), In example embodiments, data collection module 306 is configured to receive and pre-process sensor data from sensors 304 to provide measured data elements MD(1) to MD($N_{md}$), for each process stage 101(1) to 101(N) and for product 102. Data collection module can also receive and pre-process specified data elements SD(1) to SD($N_{sd}$), for each process stage 101(1) to 101(N) and for product 102. The pre-processing performed by data collection module 306 can, for example, put process and product data into a format for suitable downstream processing that can include generating a PGM representation of the process 104 and product 104 as explained in greater detail below. Examples of possible data sources for data collection module 306 can include, for example: data from inline process components (e.g., machine based controllers and sensors) through a PLC or other communication interface; data from inline external sensors (e.g., cameras); data from manual operator inputs through a human-machine-interface (e.g., observational data such as "good part", "defect part" input by an operator provided through client module 310); and other industrial data sources such as upstream machines and other process and user management systems.

Control module 308 is configured to provide control instructions, including for example, specified data SD(1) to SD($N_{sd}$), to the controllers 302 for each process stage 101(1) to 101(N).

In some examples, processing module 312 is configured to receive and further process measured data MD (including measured data elements MD(1) to MD($N_{md}$), generated in respect of each process stage 101(1) to 101(N)) and the specified data SD (including specified data elements SD(1) to SD($N_{sd}$), for each process stage 101(1)) to 101(N)) of the process. Processing module 312 processes the specified data SD and measured data MD in the context of process graph 100 to identify causal relationships and generate insights in respect of the process that is represented by the process graph 100. The causal relationships can, for example, be represented in a trained PGM.

Client module 310 may be configured to allow users at the industrial process location to interact with the other modules and components of system 300. In one example, client module 310 is configured to generate interactive GUI 110 that enables a user to view causal relationships and generated insights in the context of process graph 100. Client module 310 may for example include a viewer application that allows the user to view and interact with data received from the Processing module 312.

As will now be described in greater detail, according to example embodiments, system 300 collectively functions to enable manufacturing process data to be associated with product data using measured data (MD), specified data (SD), and associated feature descriptors (FD) to construct application-specific causal networks from pre-configured process graphs for the purposes of automatically generating descriptive, predictive, and prescriptive insights. In at least some examples, this process can be automated and performed without requiring substantive user input. The descriptive, predictive, and prescriptive insights can be communicated to process operators and process control systems to enable improved process decision making and performance improvements.

Figure 3B:
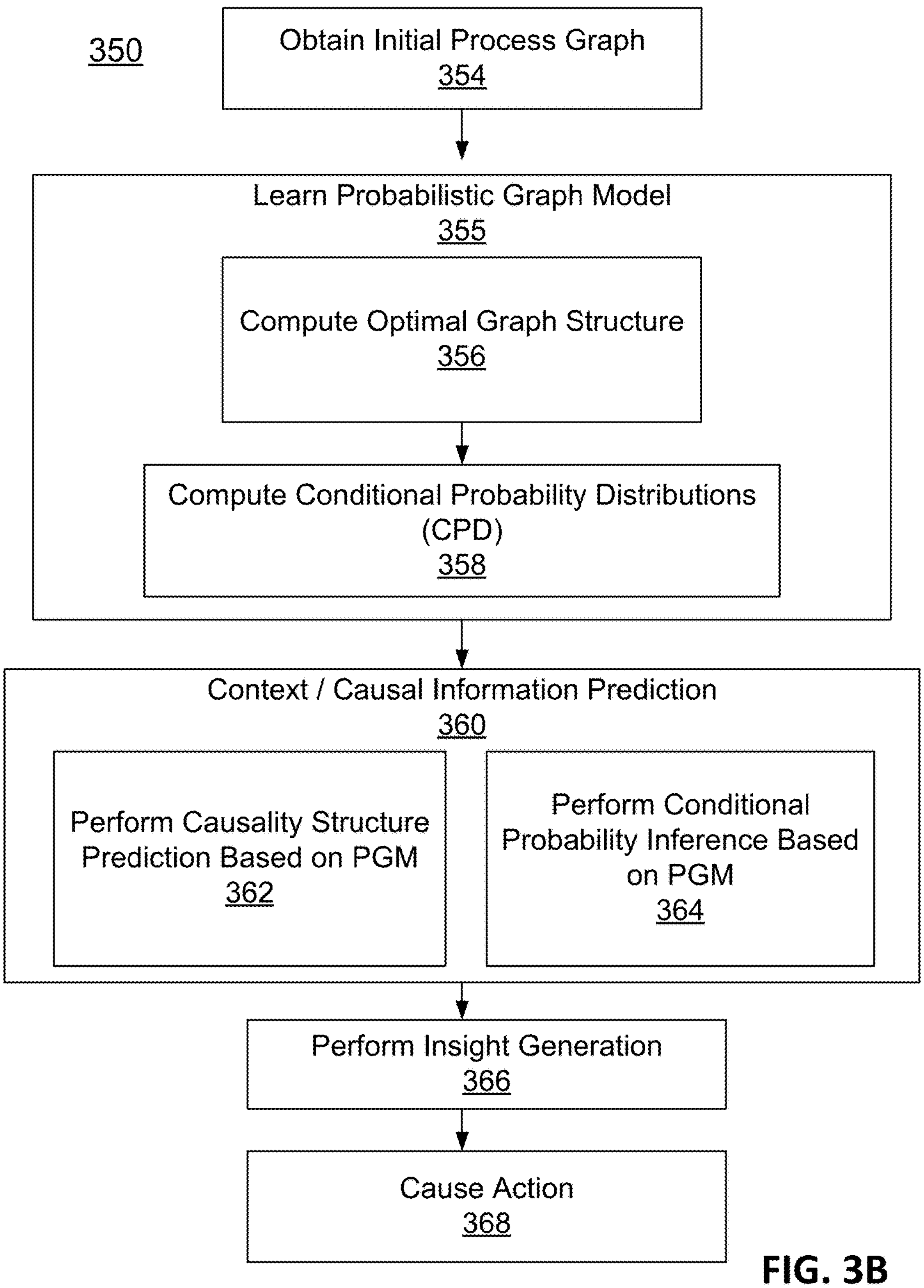
FIG. 3B is a workflow diagram of a method for probabilistic graphical model-based learning and context prediction that can be applied using the computer implemented system of FIG. 3A, according to example implementations.

An example of a method 350 that can be applied using computer implemented system 300 to enable Probabilistic Graphical Model based learning and context prediction is shown in FIG. 3B.

Obtain Initial Process Graph (Block 354)

As indicated by block 354 in FIG. 3B, in some example implementations, a starting point for implementing system 300 is defining the process graph 100. Process graph 100 is a data structure that represents an actual industrial process 104 that produces a product 102. As noted above in respect of FIGS. 1 and 2, process graph 100 defines a set of process stage 101 nodes, a product 102 node, and a respective sets of data nodes (specified data SD elements and feature descriptors FD, and measured data MD elements and feature descriptors FD) for each of the process stage nodes and the product node. In one example, process graph 100 can be stored as a list or table of entries that identifies each of the sequential process stages 101 and the product 102 and their respective data nodes (specified data SD elements, measured data MD elements and feature descriptors FD). In an example implementation, these entries can take the form of semantic descriptors or terms.

Figure 4:
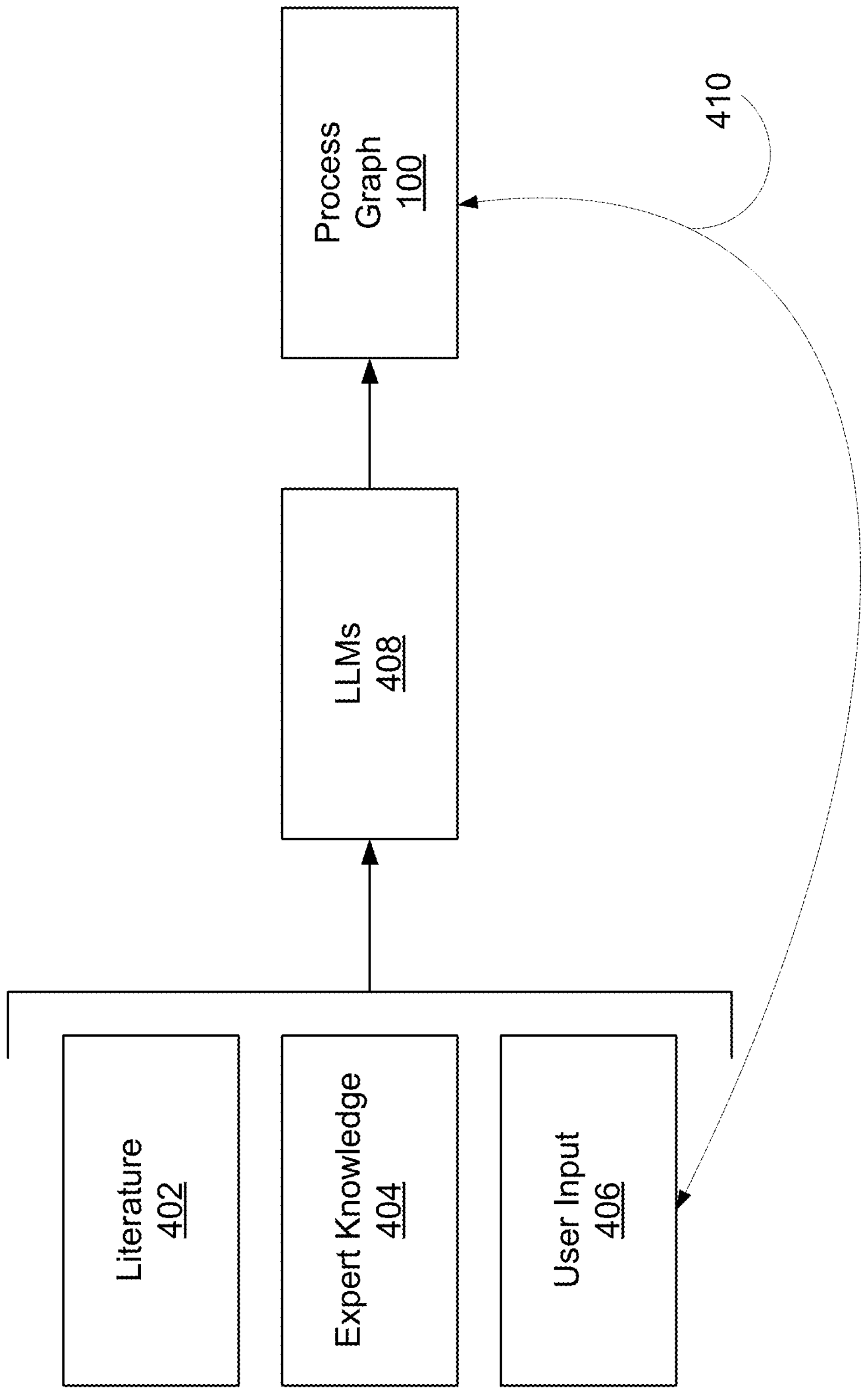
FIG. 4 is a block diagram illustrating generation of a process graph representation of an industrial process.

In this regard, FIG. 4 illustrates an example of an automated method for generating an application specific process graph 100. As part of a configuration step, data for a specific industrial process can be obtained from sources including literature 402, expert knowledge 404 and user (e.g., operator) inputs 406. This source data can, for example, include whitelists, blacklists, and/or connectivity graphs, matrices or maps. In some examples, these inputs are processed by one or more large language models (LLMs) 408 to generate process graph 100. In an example embodiment, one or more LLMs 408 may be provided by one or more of the other modules 318 that are available through network 320, and the generation of process graph 100 may be controlled by a suitably configured processing module 312.

Figure 5A:
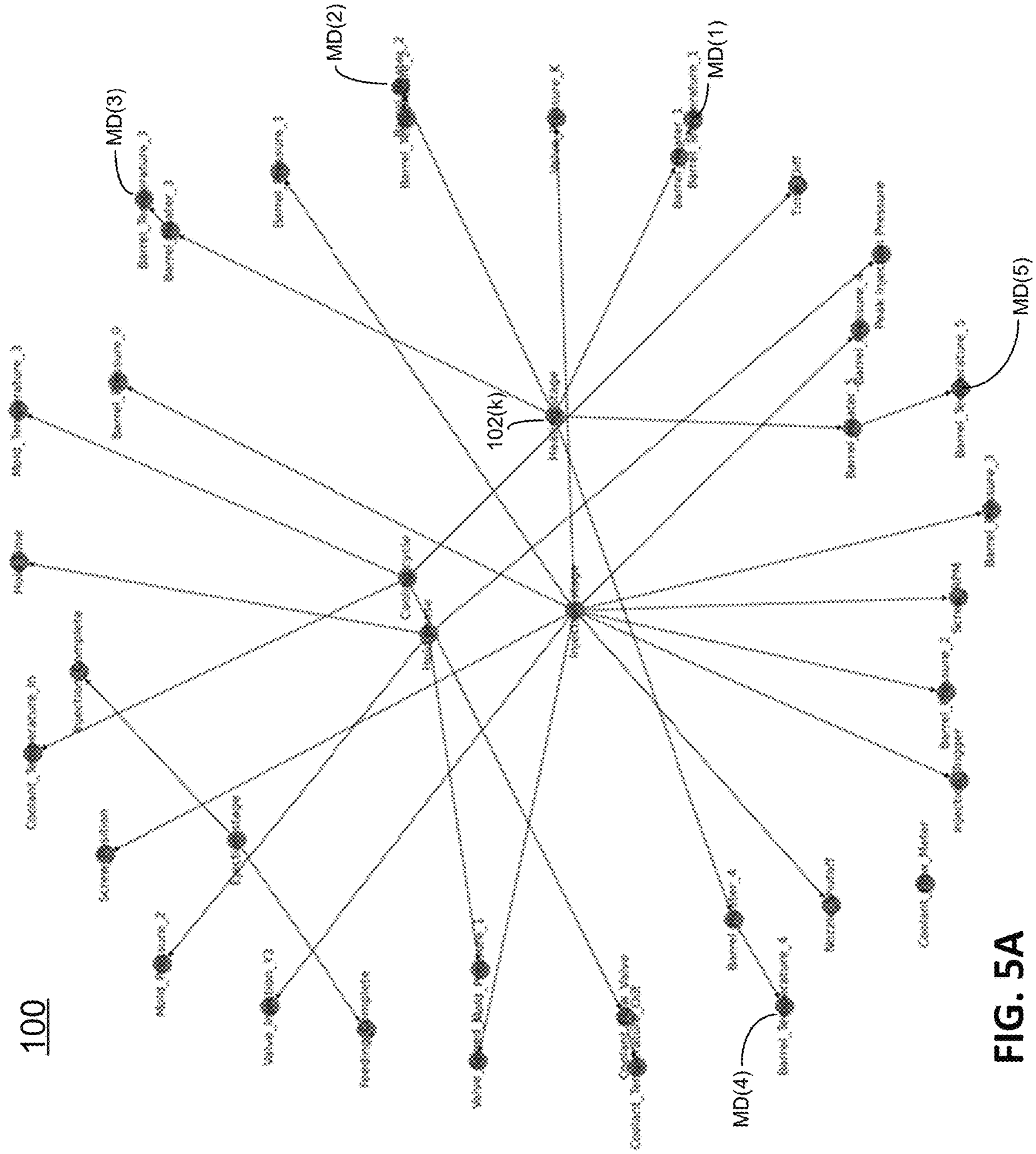
FIG. 5A is a schematic diagram representing an example of a process graph generated by the process of FIG. 4 for an injection molding process.

By way of example, in the case of an injection molding machine, literature 402, expert knowledge 404 and user input 406 can provide the list of stages with a semantic description (e.g., heating, injection, hold, cooling, ejection stages), and the components and sensors for each stage. One or more LLMs 408 can use this data to generate a list of nodes and basic topology for process graph 100, including nodes representing each of the process stages in sequential order and their respective specified data SD and measured data MD elements, as well as nodes representing the product and its respective specified data SD and measured data MD elements. By way of example, FIG. 5A illustrates an example of a process graph 100 with nodes representing the stages of an injection molding process (e.g., heating, injection, hold, cooling, ejection stages) and their respective SD and MD elements. For example, a node representing the process stage "heating stage" 102(*k*) is shown with lines (i.e., edges) to semantically named data nodes that represent its associated MD elements (Barrel_Temperature_1 [MD (1)] to Barrel_Temperature_5 [MD(5)]). In the illustrated example, process graph 100 also includes semantically named nodes representing the physical elements of the stages that which the measured data is sensed, e.g., Barrel_Heater_1 in the case of Barrel_Temperature_1). Although not shown in FIG. 5A, the process graph 100 can also include SD elements corresponding to each of the Barrel_Heater_1 to Barrel_Heater_5 nodes that correspond to the set-points specified by a controller for each of the respective barrel heaters. The generation of the nodes and edges leverages the in-context learning capabilities of the LLM where related examples of node definitions and edge topologies are queried from a database of historical examples based on a semantic indexing related to information of the specified data SD elements and measured data MD elements, as well feature descriptors FD.

It will be noted that the process graph of FIG. 5A includes information about each of the process stages and their respective specified data SD elements and measured data MD elements, as well as the product 102 and its respective specified data SD elements and measured data MD elements. However, the process graph of FIG. 5A does not include information about inter-nodal relationships between any of the data nodes (e.g., specified data SD elements, measured data MD elements, and feature descriptors FD).

Figure 5B:
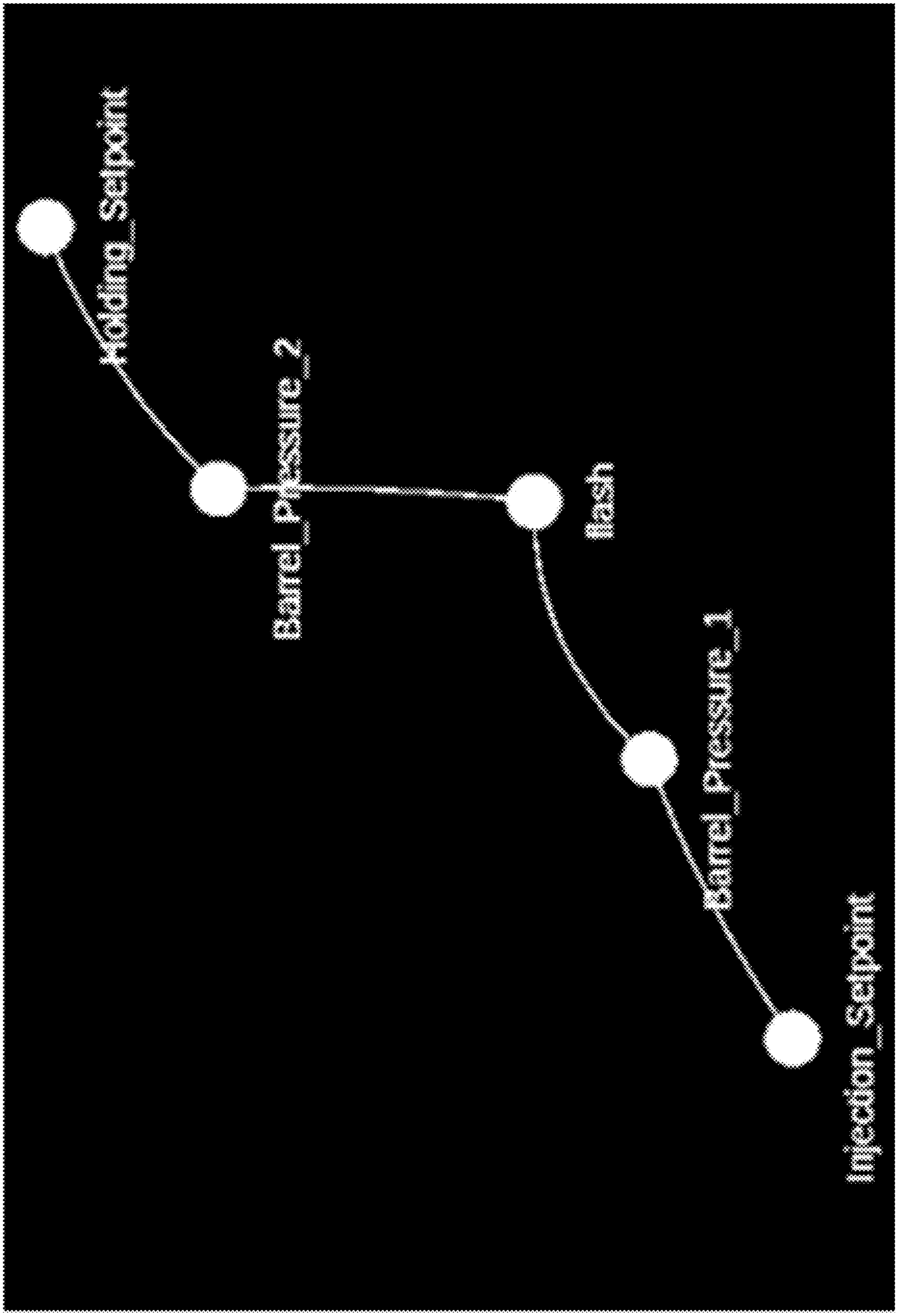
FIG. 5B is a schematic diagram representing an example of inter-nodal relationships for a process graph for the injection molding process

In some examples, operator inputs can be collected through a GUI that can enable a user to provide additional knowledge about the relationships that are omitted from a preliminary process graph (User inputs represented by line 410 in FIG. 4). User inputs can enable a user to modify process graph 100 to add additional inter-node connections that the user knows exist. For example, as illustrated in FIG. 5B, in the case of an injection molding process, a user-computer interface (for example client module 310), can be configured to enable an operator to connect nodes that represent process specified data SD elements (e.g. holding setpoint and injection setpoint that are controllable), process measured data elements (e.g., measured barrel pressure), and product specified data elements (e.g., product defect: "flash") that the operator believes, based on experience to be related (e.g., according to the user's knowledge and experience barrel pressure might affect the defect flash). Additionally, some inter-nodal relationship information for specified data SD elements, measured data MD elements and feature descriptors FD may be generated by LLMs 408 based on literature 402. For example LLMs 408 can be used to generate causal semantic structures based on information derived from publicly available literature 402, historic expert knowledge 404, and user input 406.

Accordingly, semantic information can be collected from users, experts, or literary sources for each node or a subset of the nodes and the relationships between nodes. This semantic information can be vectored and added as ancillary semantic data to process graph 100 to provide a basis for generating causal network data.

In summary, in some example implementations, obtaining the process graph 100 involves building an initial graph structure that represents a complete set of nodes that represent as respective nodes all stages, measured data elements, specified feature data elements and feature descriptors (also referred to as derived nodes), and a set of edges that represent all possible edges between the nodes within the set of nodes. This structure may be manually configured by an expert or through automated configuration tools, or through a combination of both. In some examples, constraints can be imposed when obtaining the process graph 100 such as one or more of: feature descriptors (derived nodes) are only connected to a parent node; node locations configured according to physical locations (e.g., physical process stage nodes); and directed connections are enforced as appropriate considering the process.

As the process understanding evolves, the initial graph structure may become increasingly complex.

Learn Probabilistic Graphical Model (PGM) (Block 355)

As indicated by block 355 in FIG. 3B, in some example implementations, a probabilistic graphical model (PGM) is then learned based on the process graph 100.

Figure 6:
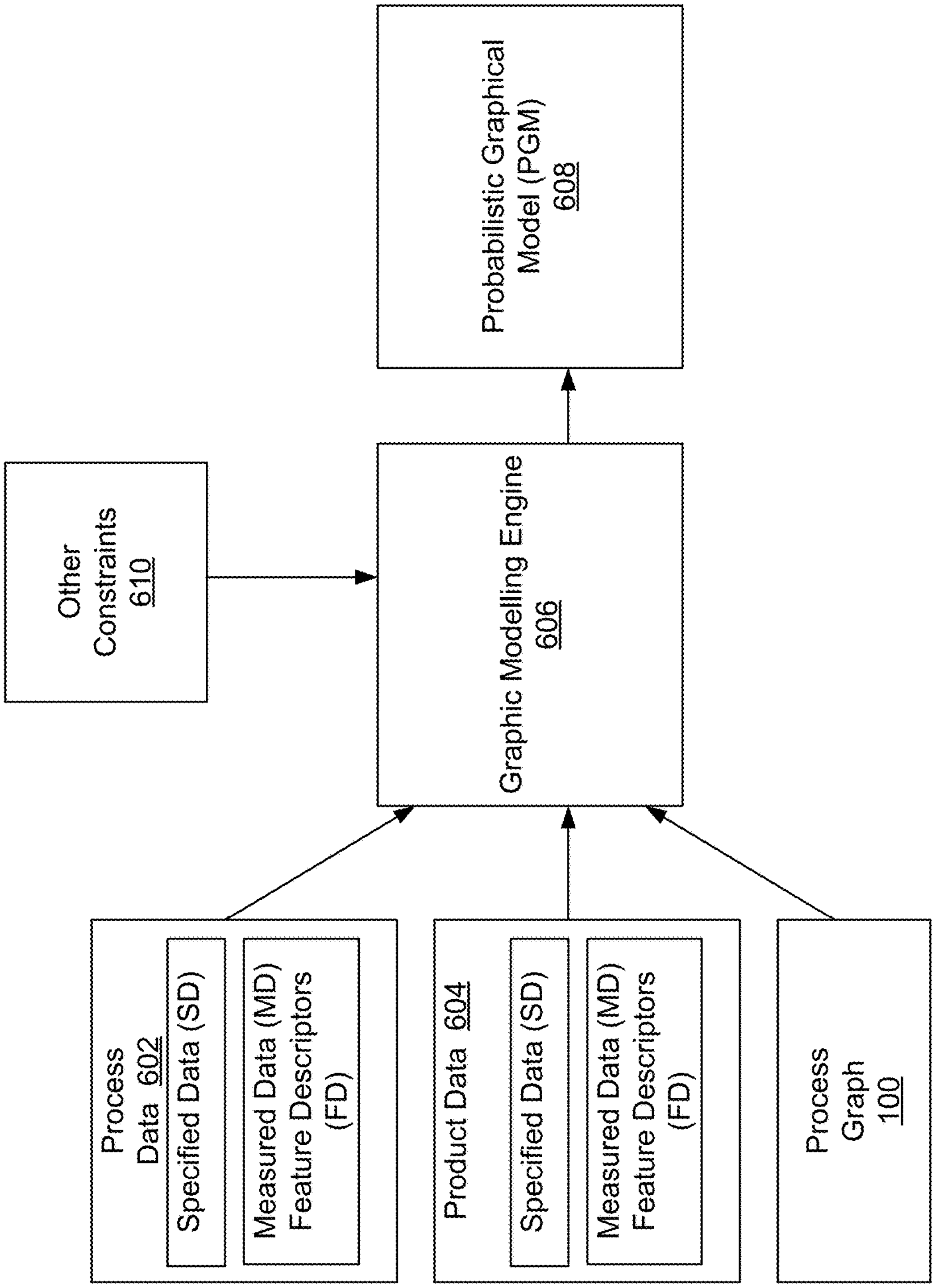
FIG. 6 is a block diagram illustrating generation of a probabilistic graphical model (PGM) representation of an industrial process.

With reference to FIG. 6, process graph 100 (including any preliminary causal network data/semantic data added by users and LLMs) can be used by a graphic modelling engine 606 to train a probabilistic graphical model (PGM) 608 representation of causal networks for process 104 and product 102. Graphic modelling engine 606, which may for example be part of processing module 312, applies algorithms to train data and outputs one or more PGMs 608 that satisfy the process data 602 and product data 604 (including specified data SD and measured data MD) collected in respect of process 104 and product 102 in order to learn a PGM 608 that corresponds to the process graph 100. PGM 608 embeds causal network data (also referred to as context data) such as described above in respect of FIG. 2. In example embodiments, graphic modelling engine 606 can be implemented at processing module 312, and can also receive other constraints 610 as inputs to guide training of the PGM 608.

Graphic modelling engine 606 applies statistical algorithms and machine learning by exploring the interdependencies among the variables (i.e., specified data SD elements and measured data MD elements and feature descriptors FD included in process data 602 and product data 602) represented in process graph 100 to learn a PGM 608 that represents joint probability distributions over these variables. In structure learning, the goal is to infer this graph structure from observed data, with incomplete knowledge about the relationships among variables. The trained PGM 608 can then be used to perform inferences over the joint distributions, enabling users to test causality hypotheses based on novel data.

PGM 608 is characterized by a graph structure (nodes and edges) and a set of parameters associated with the graph structure. In this regard, PGM 608 has nodes representing variables (e.g., nodes representing each of the data nodes in the process graph 100, including specified data SD elements, measured data MD elements, and feature descriptors that are present in process data 602 and product data 604) and edges between the nodes that represent the dependency or correlation between the variables represented by the nodes. The parameters associated with each independent path through the various levels of each node are referred to as the Conditional Probability Distributions (CPD). Each CPD is of the form P(node|parents(node)), where parents(node) are the parents of the node in the graph structure. In the case of a structure A→C←B, the parameters of the network would be P(A), P(B) and P(C|A, B). Graphic modelling engine 606 applies Parameter Learning techniques (e.g. Maximum Likelihood Estimator, Bayesian Estimator, and Expectation Maximization Estimator) to a training dataset (i.e., historically acquired process data 602 and product data 604). This learning operation computes parameter values that fit the training data. A graph structure combined with a set of the learned parameters form a trained PGM 608. In one example, PGM 608 is a directed graphical causal model (DGCM), which is composed of variables (e.g., data nodes including measured MD nodes, specified data SD nodes, and feature descriptor FD nodes), directed connections (edges) between pairs of variables, and a joint probability distribution over the possible values of all of the variables. In some examples, PGM 608 can be represented as a data structure that captures both the graph structure (nodes and edges) and the associated probabilistic information (parameters, including distributions). Nodes can be represented as a list or set of variables (e.g., nodes={A, B, C, D}). Edges can be represented as pairs of nodes indicating dependencies. For example, in a Bayesian Network (Directed Acyclic Graph, DAG), edges are directed (e.g., edges={(A, B), (B, C), (C, D)}. Parameters (including Distributions) can be represented using Conditional Probability Tables (CPTs) for Bayesian Networks, including for example, dictionaries mapping nodes to their conditional probability distributions (e.g., CPTS={A: P(A), B: P(B|A), C: P(C|B), D: P(D|C)}.

In some examples, Graphic Modelling Engine 606 applies a two-step process to obtain PGM 608. Referring again to FIG. 3B, a first step includes computing an optimal graph structure (Block 356) for the PGM 608. The optimal graph structure is a sub-structure of the process graph 100 that removes irrelevant edges. The remaining structure is assigned directed edges between the set of nodes (i.e. connectivity). This optimal graph structure can, for example, be obtained through structure learning (score-based, constraint-based, or hybrid) techniques. An optimal graph structure is one that contains a minimal set of relevant connections between nodes.

Score-based structure learning can be interpreted as an optimization task, which requires a scoring function (which maps structures to a numerical score, based on how well the structures fit to a given data set) and a search strategy (which traverses the search space of possible structures and selects a structure with optimal score). Commonly used scoring functions are Bayesian Dirichlet scores (BDeu or K2), and Bayesian Information Criterion (BIC).

The second step applied by Graphic Modelling Engine 606 to obtain PGM 608 is to compute the conditional probability distributions (CPDs) for the optimal graph structure. These CPDs form a set of learned parameters for the PGM 608, and may for example be stored in look-up tables that are indexed by the nodes included in the optimal graph structure. In example implementations, the CPD parameters are learned using parameter learning techniques (e.g., Maximum Likelihood Estimator, Bayesian Estimator, and Expectation Maximization Estimator) that compute parameter values based on training data.

In at least some examples, PGM 608 can be updated over time so as to capture the evolution of the complex causal networks that are represented by the PGM 608. The path strength can be rated (scored and ranked) based on the inference process with updated data. The top causality paths from specified data to feature descriptors to defects can be presented to human users via a GUI for action validation (As shown, for example, in FIG. 2).

PGM 608 enables joint probability distribution to be compactly represented, based on a relatively small initial training dataset, and the PGM 608 can be regularly updated. This can be contrasted with conventional machine learning (ML) methods that rely heavily on black box network structures that are trained on large volumes of input-output data. These conventional solutions require large datasets, with simple labeling schemes, for robust training. These large datasets are not easily adapted and updated with changing conditions in the process and production environment.

In contrast to conventional ML based solutions, the contextual causal graph data embodied in PGM 608 can be managed dynamically to adapt to changing contexts, through structured knowledge represented in the nodes and edges of the graph structure. Since each node is directly connected to the elements of the physical process and is not a black box of abstracted connections, semantic information can be collected from users or literary sources for each node or a subset of the nodes. This is analogous to the traditional labeling process in conventional deep learning frameworks.

One objective of developing a causal graph (e.g., PGM 608) is to determine a structure of the specified data SD elements and measured data MD elements that best represents the dynamics of the physical system. This differs from purely black box approaches that fit models to a specific dataset for the purpose of generating a predicted output. Since each data node is mapped to a physical element of the process via process graph 100, a broad set of background contextual data known by human experts can exist to define the relationship between nodes. The semantic knowledge (e.g., node descriptor) collected for each node can represent capture of a history and/or background context relevant to the function of each node. This information creates a dynamic dialogue between the system and the user related to one or multiple nodes, enabling a unique labeling experience which represents creates high resolution feedback for a lower volume of training examples. This differs from many machine learning approaches of single concept labels for a high number of training examples. This type of data enables in-context learning for LLMs to create new causal models by transferring learning from similar processes.

By embedding the semantic knowledge in a vectorized format, the system can leverage this data through vector similarity metrics (e.g., Euclidian distance, dot product similarity) to generate a score for individual nodes and edges of the network. This score is then used to help guide the PGM process (e.g., graphic modelling engine 606) in finding causal structures in the process and product data. [See For example "godel-large-scale-pre-training-for-goal-directed-dialog", arXiv:2206.11309v1 [cs.CL]22-6-2022.

Specific examples of process data 602 and measured data 604 will now be discussed in the context of an injection molding process to illustrate aspects of obtaining the process graph 100 and the PGM 608.

Figure 7A:
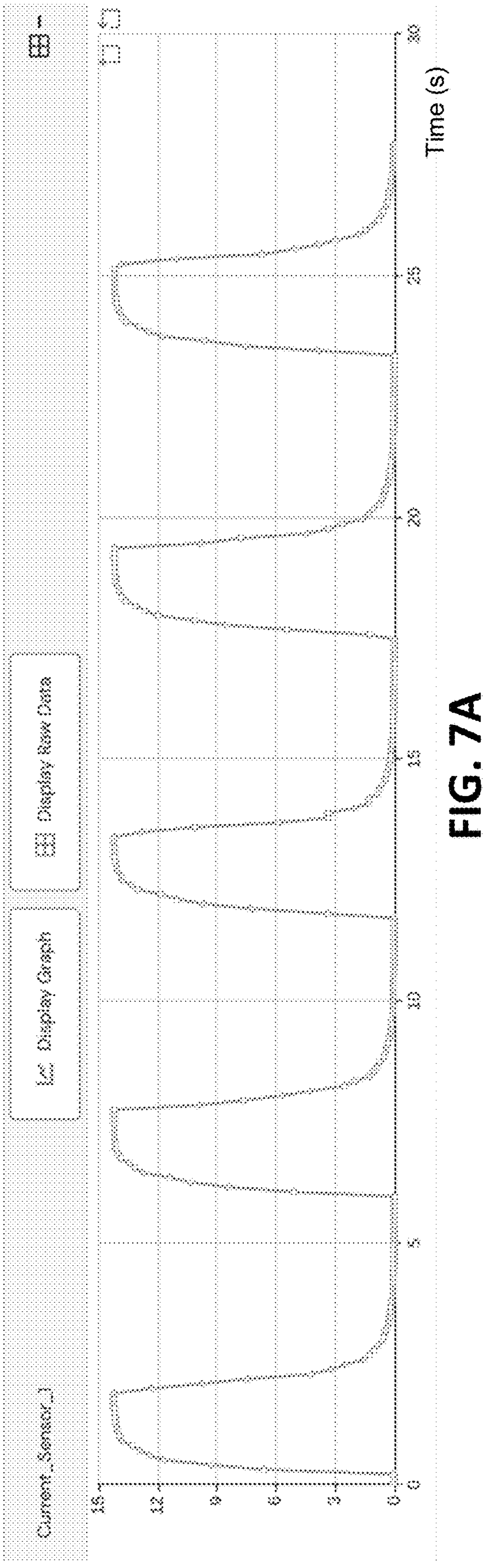
FIG. 7A shows an example of a time series of measured data for a PGM node representing a current sensed by a sensor associated with a process stage.
Figure 7B:
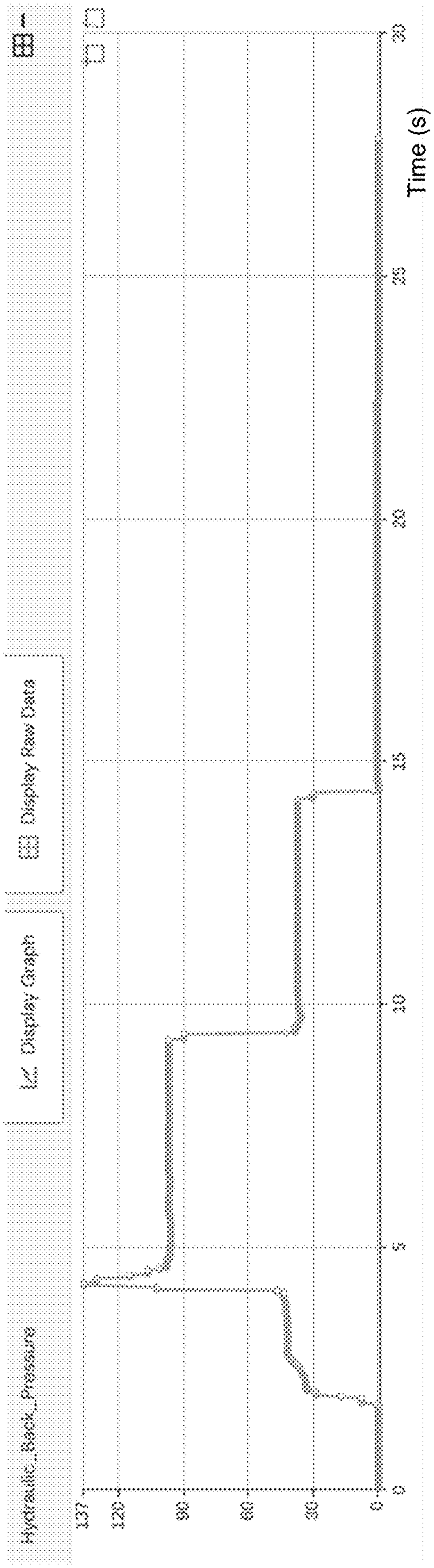
FIG. 7B shows an example of a time series of measured data for a PGM node representing a hydraulic back pressure sensed by a sensor associated with a process stage.
Figure 7C:
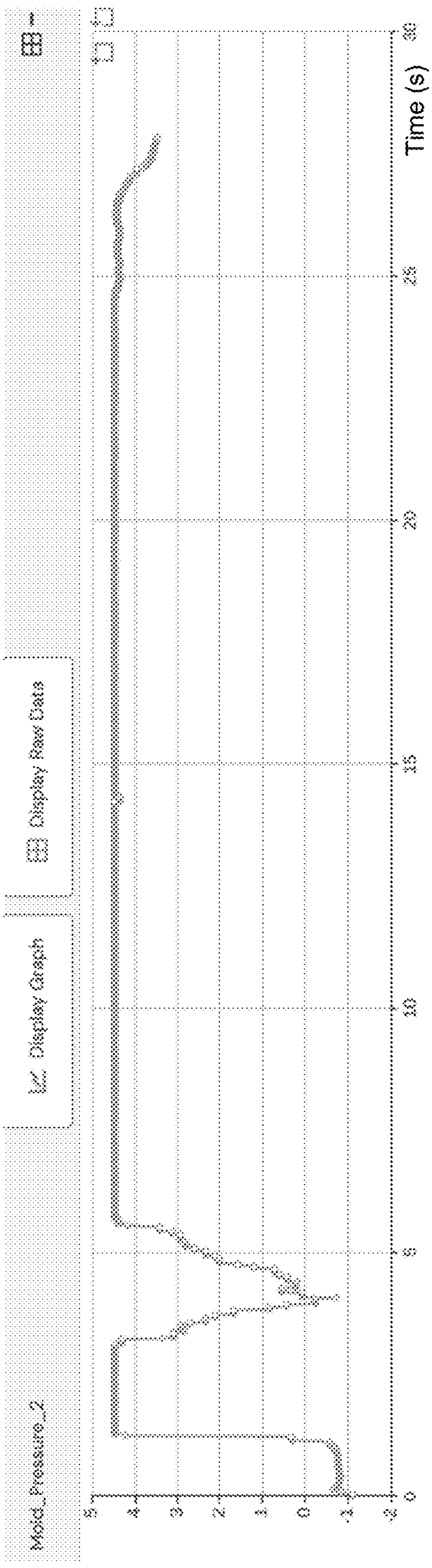
FIG. 7C shows an example of a time series of measured data for a PGM node representing a mold pressure sensed by a sensor associated with a process stage.
Figure 7D:
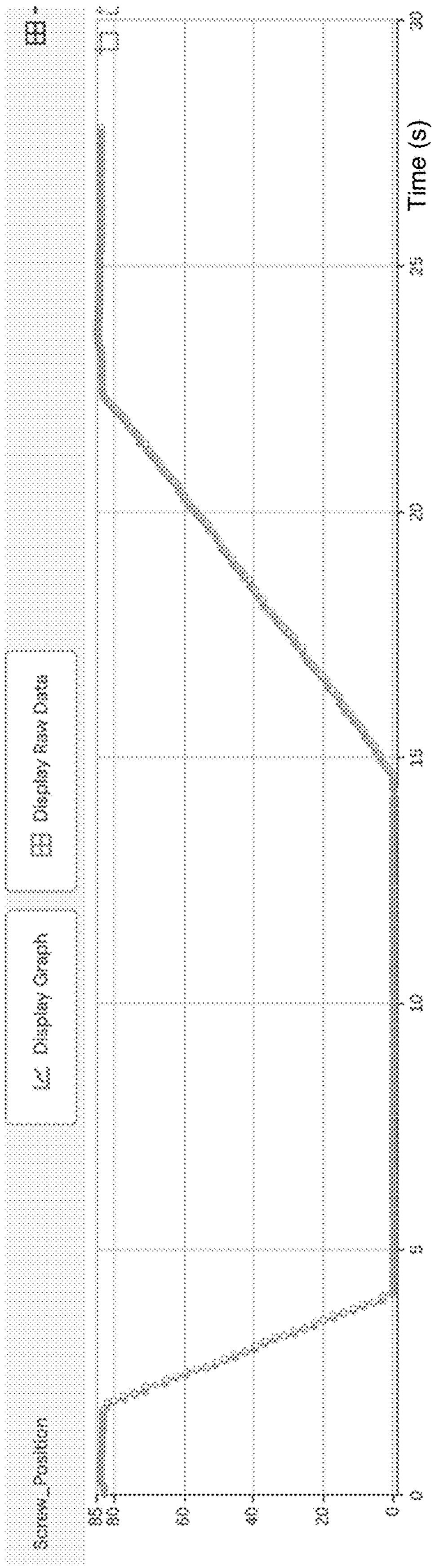
FIG. 7D shows an example of a time series of measured data for a PGM node representing a screw position associated with a process stage.
Figure 7E:
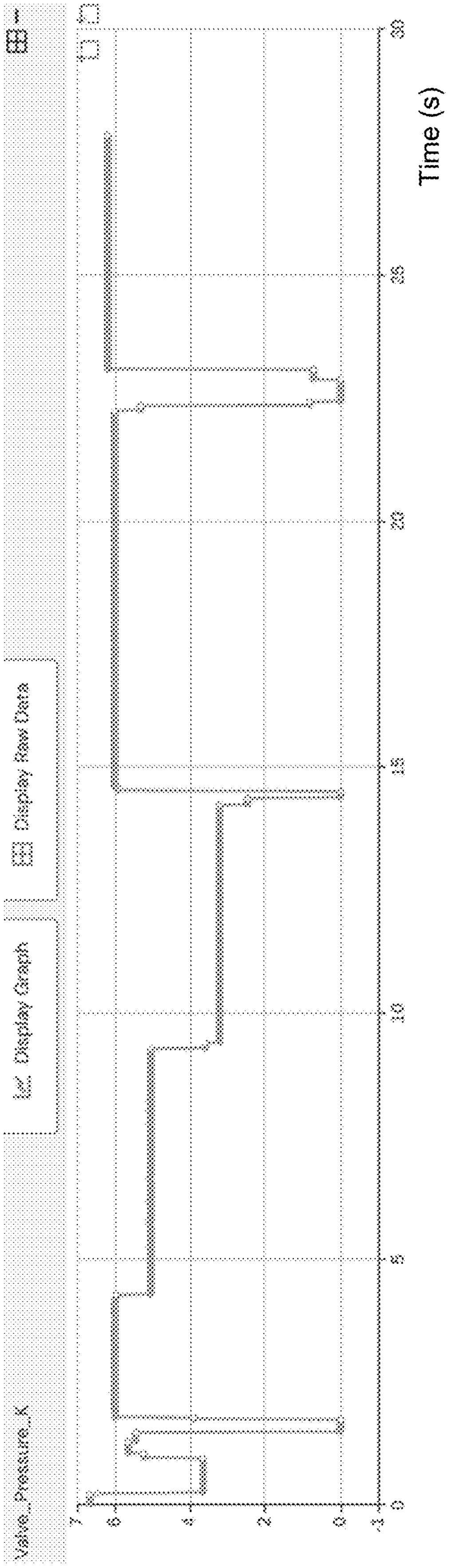
FIG. 7E shows an example of a time series of measured data for a PGM node representing a valve pressure associated with a process stage.

As noted above, measured data MD includes information collected from measurement devices, including for example embedded or external sensors 304 related to the process 104 or the product 102. Time series examples of measured data MD elements corresponding to process data are respectively illustrated in the following set of Figures: FIG. 7A shows an example of a time series of measured data for a PGM node (e.g., measured data MD element MD(j)) representing a current sensed by a sensor associated with a process stage (e.g., stage 101(*k*) of process 104); FIG. 7B shows an example of a time series of measured data for a PGM node representing a hydraulic back pressure sensed by a sensor associated with a process stage; FIG. 7C shows an example of a time series of measured data for a PGM node representing a mold pressure sensed by a sensor associated with a process stage; FIG. 7D shows an example of a time series of measured data for a PGM node representing a screw position associated with a process stage; FIG. 7E shows an example of a time series of measured data for a PGM node representing a valve pressure associated with a process stage.

As noted above, measured data MD can also include machine vision data that is based on images/videos captured by cameras of the process or the product 102.

Figure 8A:
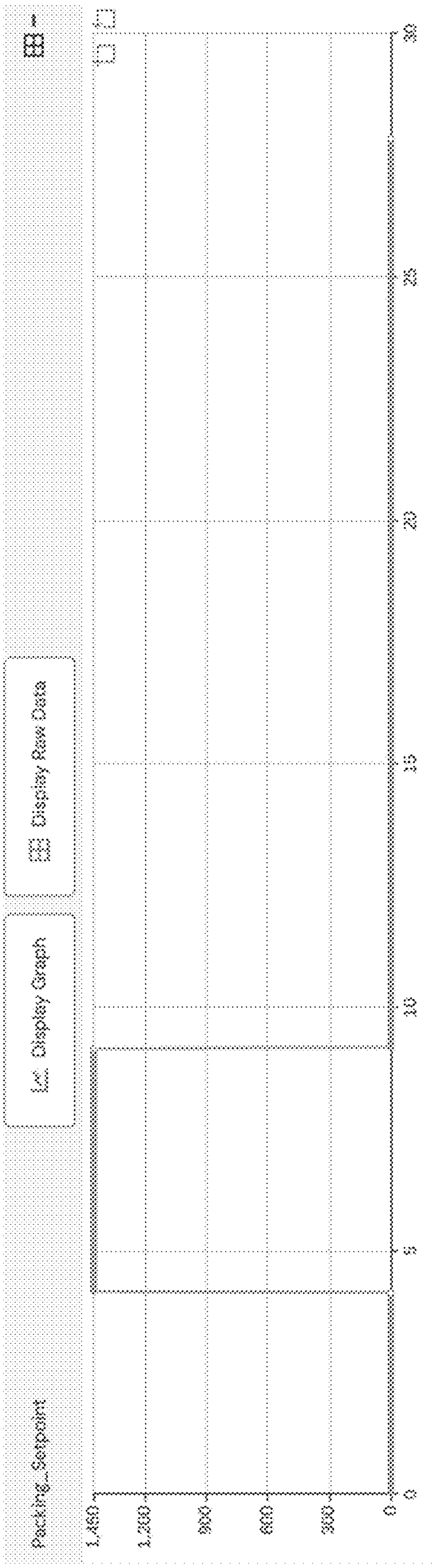
FIG. 8A shows an example of a time series of specified data for a PGM node representing a packing setpoint associated with a process stage.
Figure 8B:
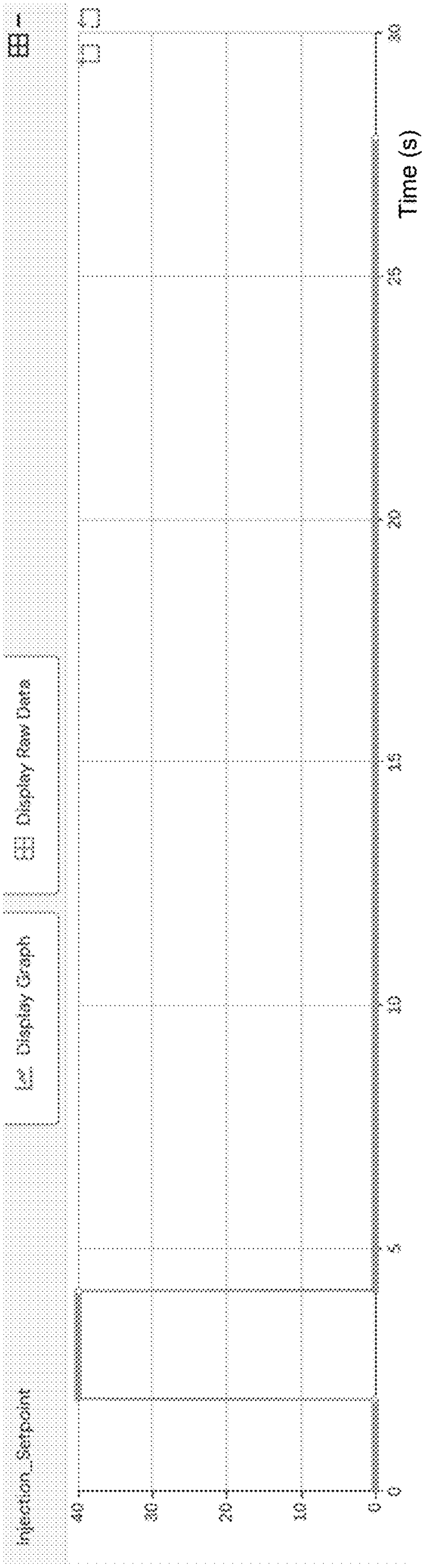
FIG. 8B shows an example of a time series of specified data for a PGM node representing an injection setpoint associated with a process stage.
Figure 8C:
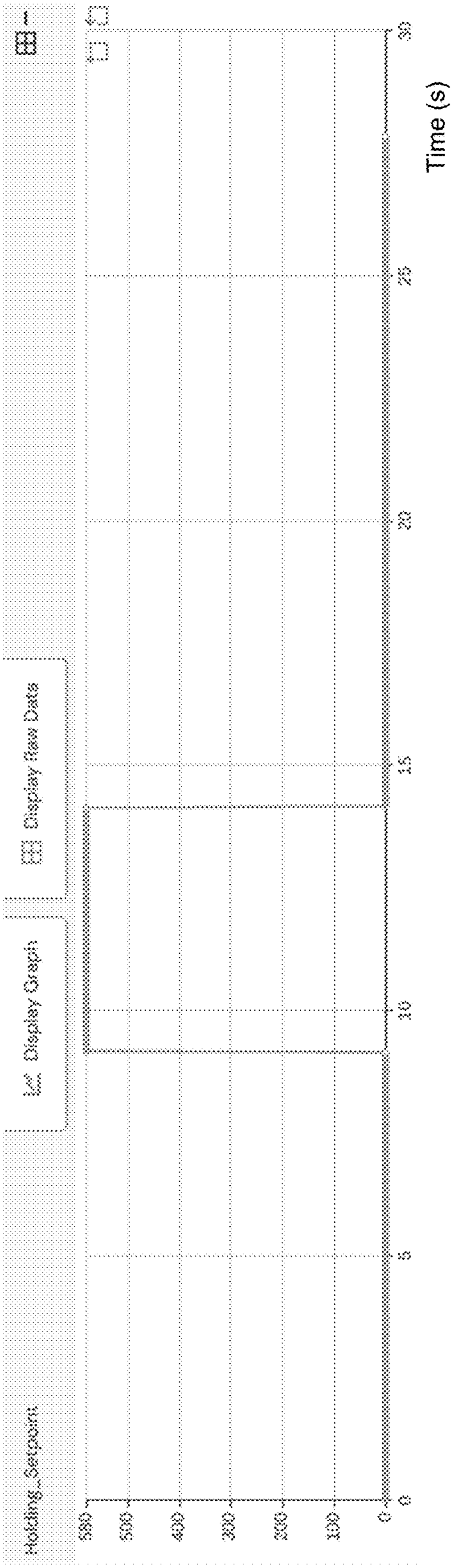
FIG. 8C shows an example of a time series of specified data for a PGM node representing a holding setpoint associated with a process stage.

As noted above, specified data SD includes information collected from human inputs or predefined machine or process inputs related to the process 104 or product 102. Predefined time series examples of specified data SD elements corresponding to process data are respectively illustrated in the following set of Figures: FIG. 8A shows an example of a time series of specified data for a PGM node (e.g., specified data element SD(j)) representing a packing setpoint associated with a process stage (e.g., stage 101(*k*) of process 104); FIG. 8B shows an example of a time series of specified data for a PGM node representing an injection setpoint associated with a process stage; and FIG. 8C shows an example of a time series of specified data for a PGM node representing a holding setpoint associated with a process stage.

Specified data in respect of product 102 can, for example, include a given CAD model of the part, and geometry and other physical data acquired from the CAD model. The geometric information, combined with image data of the product 102, for example through performing object pose estimation to identify the position and orientation of the product 102 in the image, can be used to improve the understanding of quality issues through inherent defect and geometry relationships. Relative geometric differences between the product 102 geometry and part CAD can also be leveraged to identify further quality issues without explicit need for 3D sensors.

As noted above, in at least some examples, data that is collected by data collection module 306 can be processed to facilitate downstream processing. For example, collected data can be preprocessed using appropriate algorithms to standardize and/or normalize the data to improve compatibility with the processing applied by graphic modelling engine 606. For example, thermal and color images collected in respect of product 102 can be processed to standardize the images and remove undesired variations in pose and background.

As noted above, measured data MD and specified data SD can be processed to extract feature descriptors FD that can be included in the data provided to graphic modelling engine 606. In some examples, one or both of data collection module 306 or processing module 312 can be configured with trained machine learning (ML) models 330 that are applied to collected process and product data to generate associated lower dimensional feature vectors or logit scores that can be used by graphic modelling engine 606 as feature descriptors FD when training the PGM 608.

Figure 9:
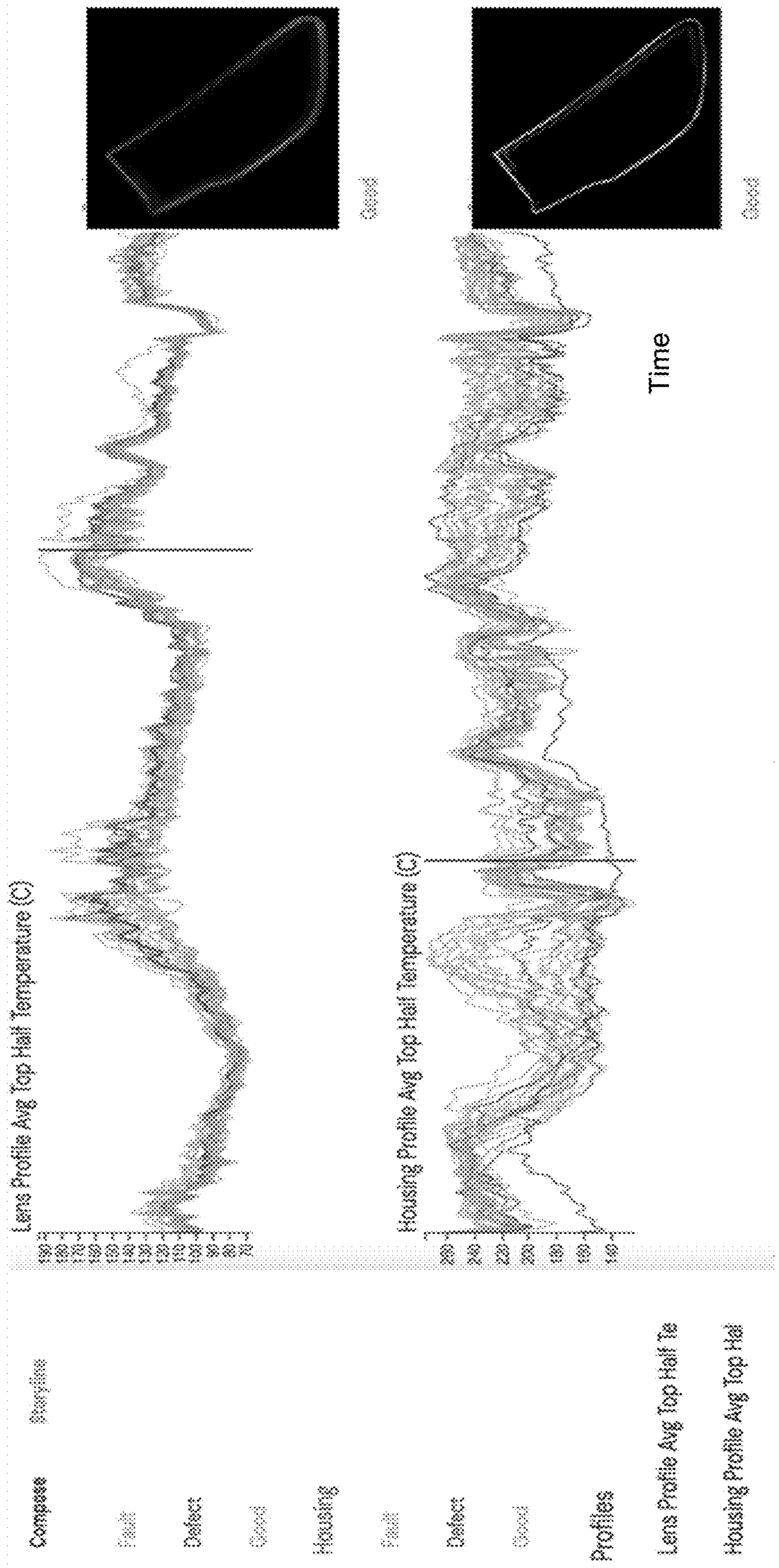
FIG. 9 shows an example of thermal profiles obtained from thermal imaging sensors associated with a process stage that is performing a product quality inspection.

FIG. 9 illustrates an example of profile type feature descriptors FD that can be extracted from the standardized image measured data MD elements that may comprise one or more captured images of the product during a process stage. As illustrated, temperature values are extracted from the images. Furthermore, the extracted temperature values and/or the images are processed by a trained ML model 330 to assign a quality category of "fault", "defect" or"good" to the product. Both the temperature values and quality category can be considered as low dimensionality feature descriptors FDs that correspond to the measured data MD (e.g., the captured thermal image). Additional dimensionality reduction techniques, including manifold learning tools such as Isomap, can also be applied to profile type feature descriptors to generate even lower dimensional feature descriptors to improve the feature descriptor FD compatibility with the PGM 608.

ML models 330 can include trained deep learning based anomaly detection models that are trained to generate score-based quality feature descriptors FD in respect of measured data MD elements. For example, the thermal temperature or image data of FIG. 9 could be provided to an ML model that generates weld quality score on a scale of 0 to 1, with a quality feature descriptor label being assigned based on a comparison of the score to predefined threshold criteria (e.g., weld quality score <0.06=defect; weld quality score between 0.06 and 0.27=fault; etc.)

Figure 10:
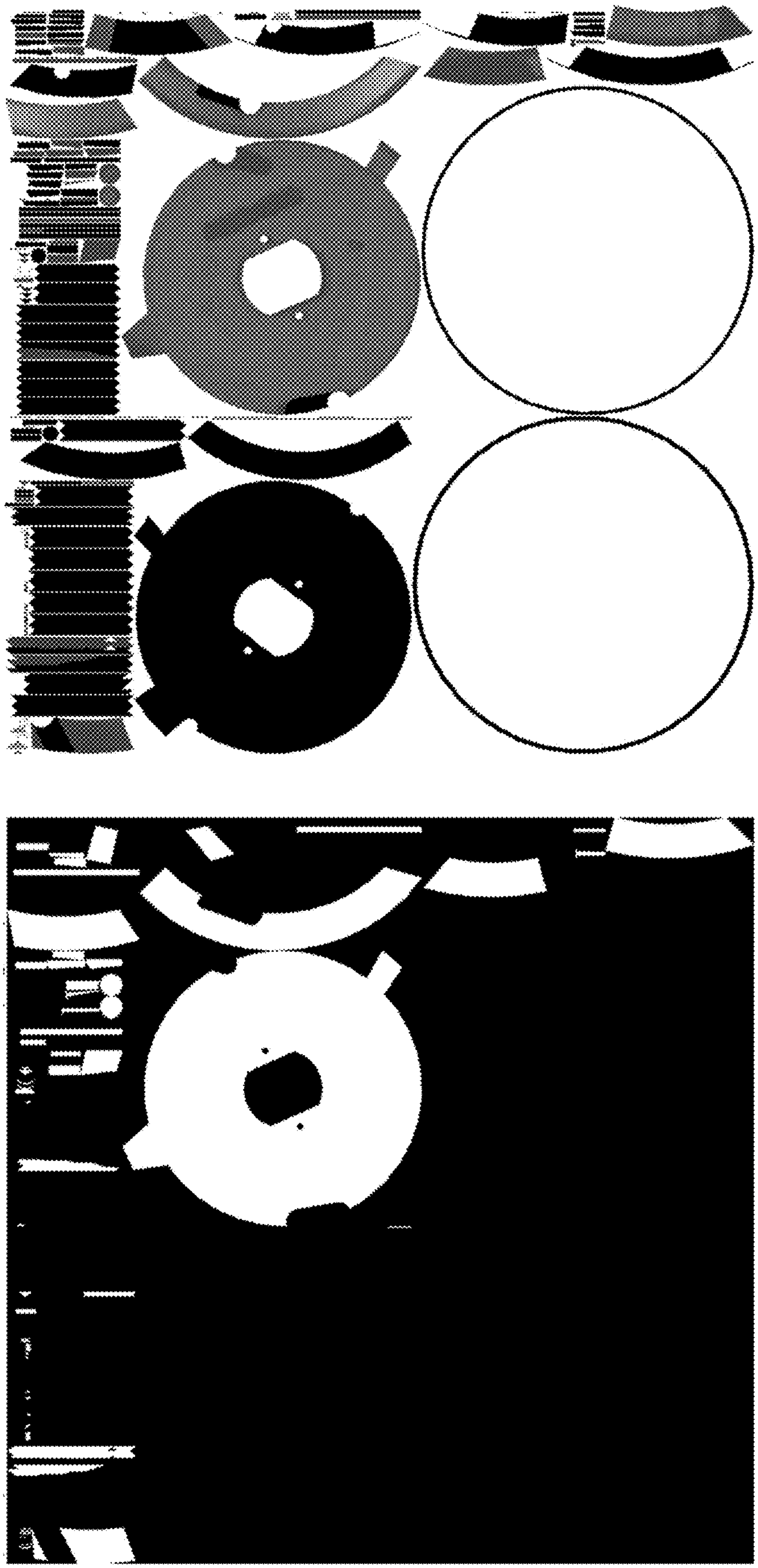
FIG. 10 shows an example of standardized representations of occlusion and inspection data from associated imaging sensors obtained by mapping image data to a part model.

Further, feature descriptors FD may be generated based on preconfigured product characteristics described in specified data (SD), such as 3D features associated with product geometry (e.g. cold spot at location X associated with product aspect Y in thermal image Z). In this regard, FIG. 10 illustrates example standardized representations of texture images of a product with associated UV maps that relate machine vision inspection 2D data to product 3D CAD model, showing inspection coverage (left) and color inspection data (right). Through these preconfigured product characteristics and standardized image representations valuable quality related feature descriptors FD can be derived, such as inspection coverage, defect locality and geometric relationships, and geometrical errors in the product relative to the 3D CAD model.

The conversion of high resolution specified data SD and measured data MD inputs into low dimensional feature descriptor FD representations can, in some examples, be better suited for analysis and decision making by human operator and real-time control algorithms.

By way of further example, in the context of an injection molding process, feature descriptors FD that can be extracted from a measured data MD time series for "barrel pressure" can include: highest absolute value, the absolute energy (the sum over the squared values), the first location of the maximum value, the binned entropy of the power spectral density, etc. These and other feature descriptors can, for example, be generated from measured data and feature descriptors using known solutions such as the Python package tsfresh.

Extracted feature descriptors can be further filtered and selected according to the importance of the features (e.g., the permutation feature importance) and relevance analysis (e.g., univariate feature significance test). During filtering and selection, the paths from measured data MD and specified data SD to various outcomes can be rated (scored and ranked). For example, in an injection molding process, 50 sensors may result in over 700 features for each sensor, with these 700 features then being filtered to about 20 relevant features in total. The relevant feature descriptors FDs can then be used for defect prediction by ML models 330 and causality discovery by graphic modelling engine 606. Examples of quality-based metrics derived from thermal images can include identification of surface defects (flash, spray, short shot, etc.) and location highlighting of cold spots in thermal images. Extracted feature descriptors can enable the dimensions of the feature space to be reduced to 2D or 3D for easy visualization to facilitate human decision-making (e.g. Principal Component Analysis, t-Distributed Stochastic Neighbor Embedding).

Figure 11A:
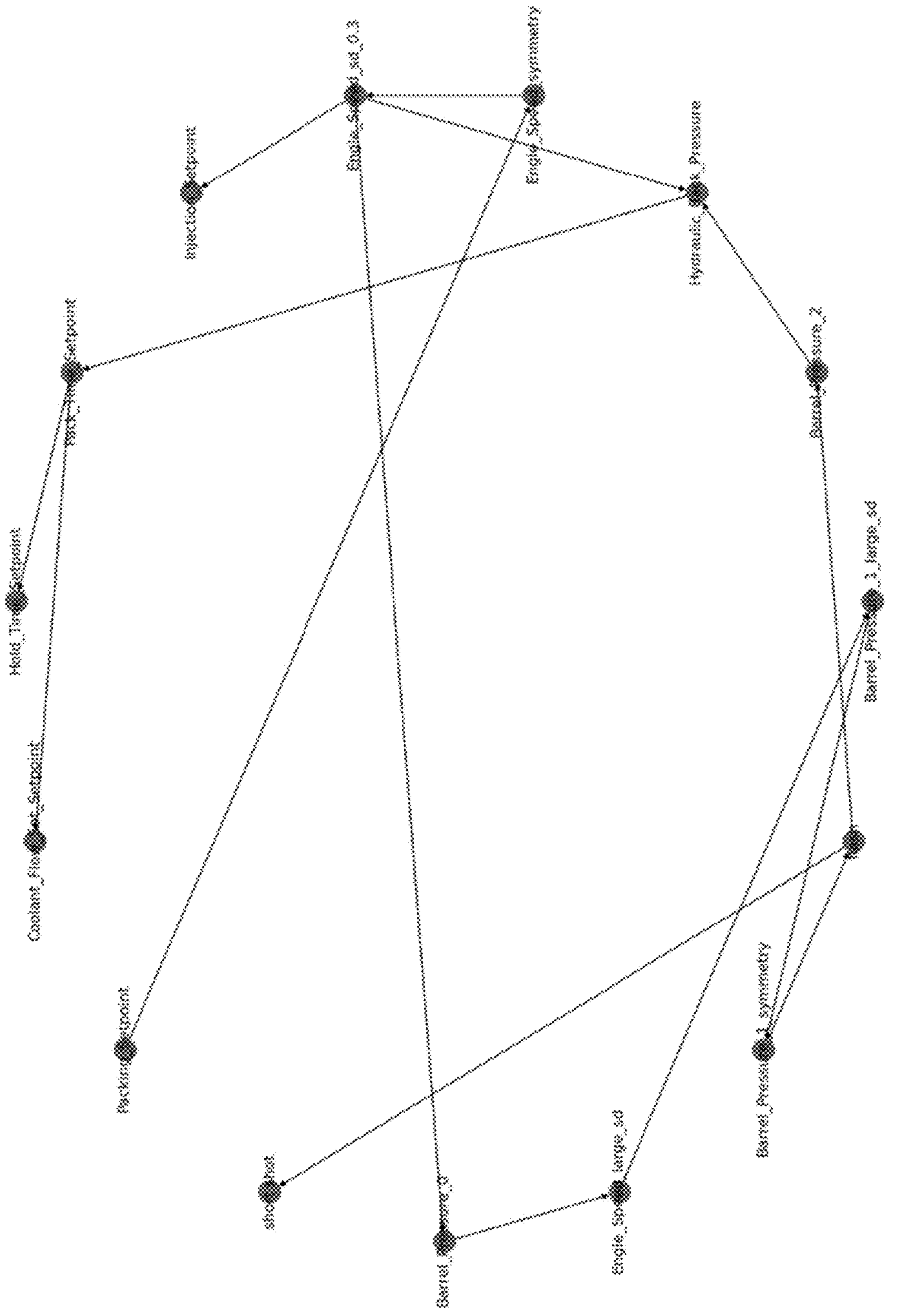
FIG. 11A is a schematic diagram representing an example of causal relationships within a graph for the injection molding process.

FIG. 11A illustrates an example representation of part of a PGM illustrating connections between various measured data MD elements and specified data SD elements. By way of example as shown in FIG. 11, measured data MD element "Short Shot" is connected to measured data MD element "Flash", which in turn is connected to measured data MD element "Barrel_Pressure 1_Symmetry", which in turn is connected to measured data MD element "Barrel_Pressure 1_large", and so on, representing a causal network.

Figure 11B:
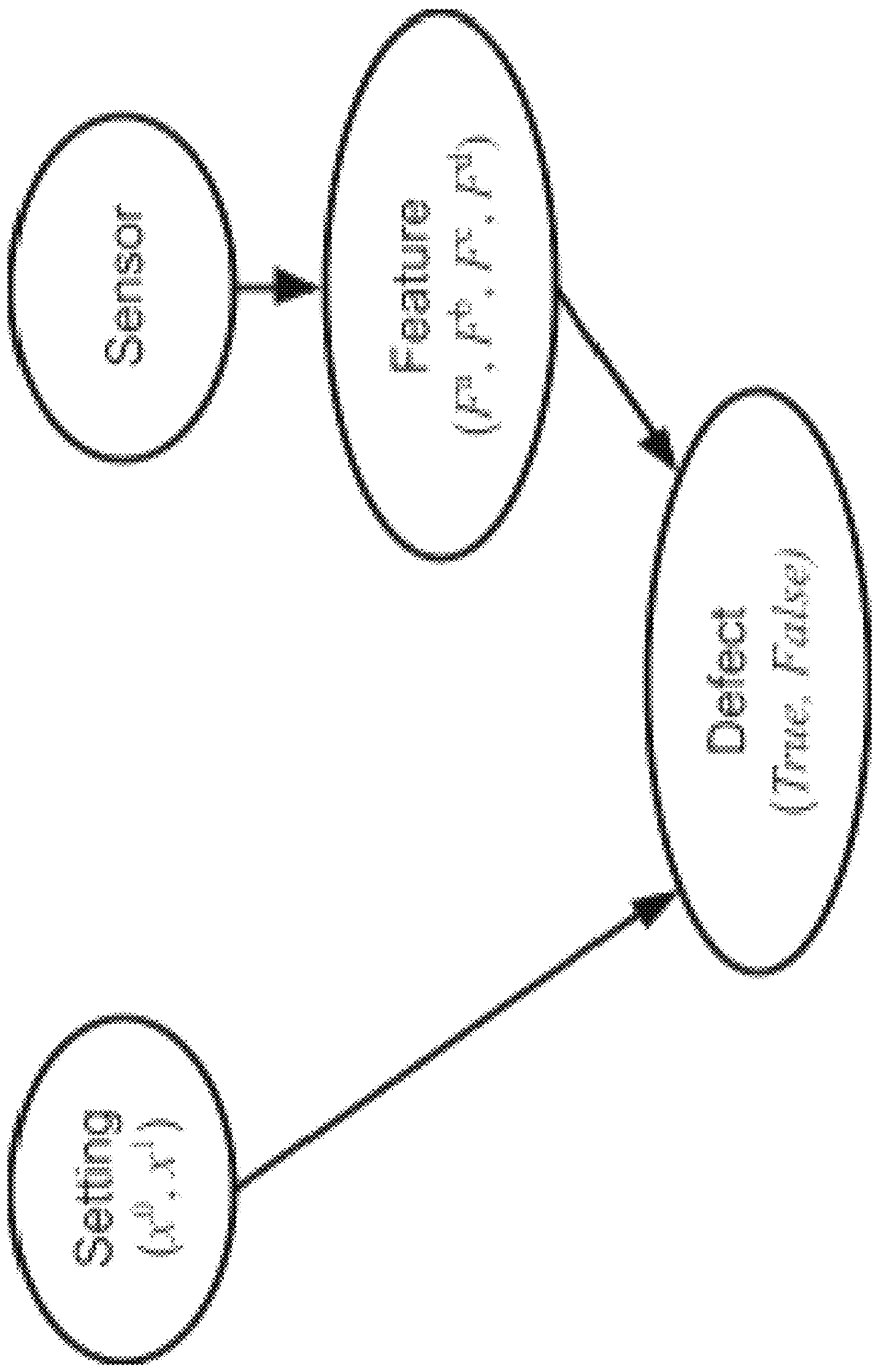
FIG. 11B illustrates a further example of a simple graph having four data nodes and three edges representing causal relationships.

FIG. 11B illustrates a further example of a simple PGM having four data nodes and three edges. The directed edges extend from a "Setting" node (a process specified data SD element) to "Defect" (a product measured data MD element), from "Sensor" (a process measured data MD element) to "Feature" (a process measured feature descriptor FD) and from "Feature" to "Defect". The directed edges represent two parents and one child.

Figure 11C:
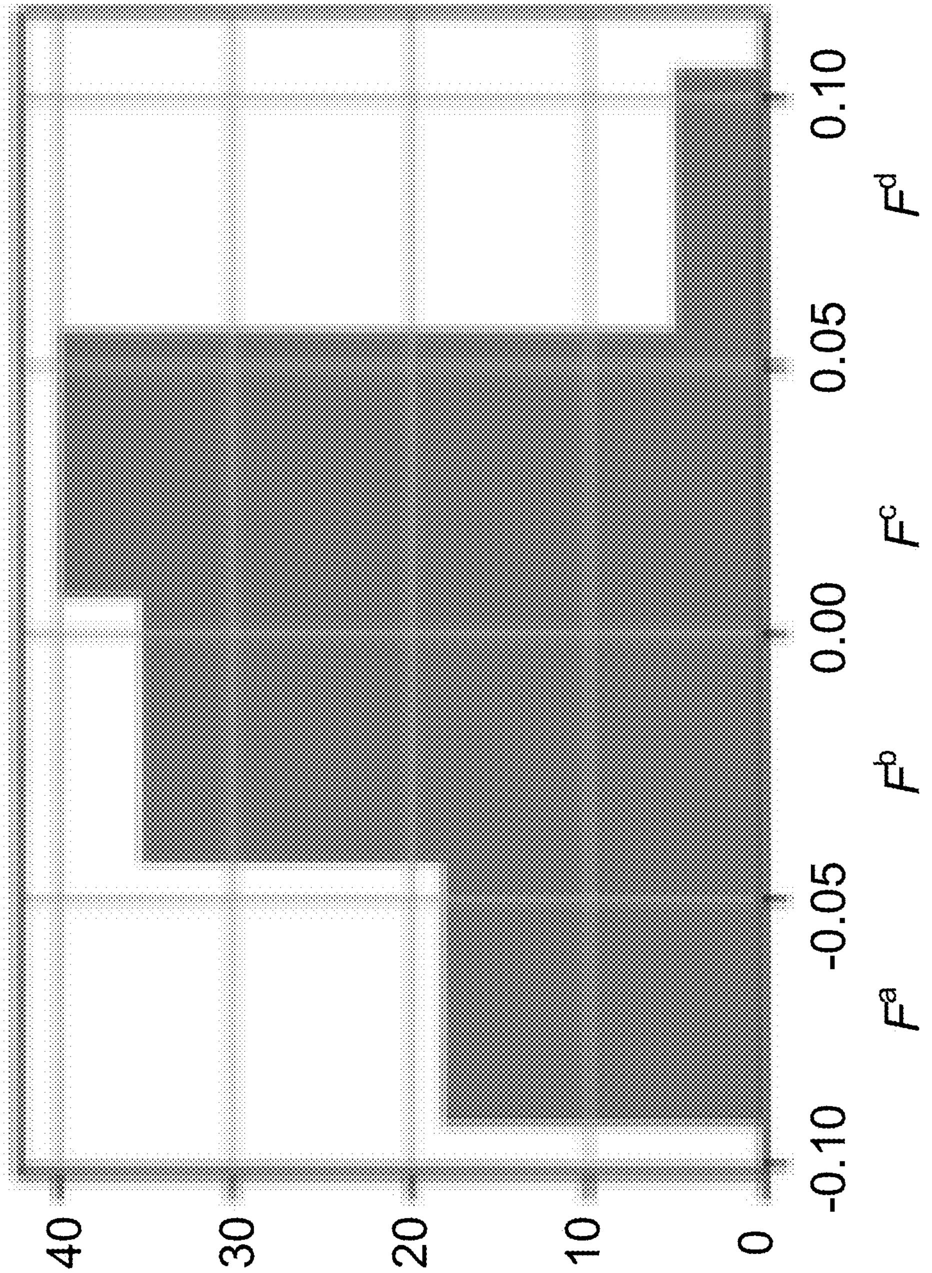
FIG. 11C illustrates an example of node level distributions for four levels for a "Feature" node of FIG. 11B, with an assumed Gaussian distribution.

In the illustrated example, the "Feature" node is derived from parent "Sensor" node. For example, a measured data MD node can be subdivided into one or more abstract components (e.g. feature descriptors FDs, also referred to as features). In some examples, each node in the PGM, whether a discrete or continuous variable, can be discretized into various node levels through binning (via distribution assumptions) to represent a finite number of variable values. FIG. 11C depicts node level distributions for four levels for the "Feature" node with an assumed Gaussian distribution. The parameters associated with each independent path (edge) through the various levels of each node are the Conditional Probability Distributions (CPD), as represented in FIG. 11D, which shows a tabular example of CPDs for the PGM of FIG. 11B. In the example represented in FIGS. 11B to 11C, "Setting" has 2 node levels: $x^0$ and $x^1$; "Feature" has 4 node levels: $F^a$, $F^b$, $F^c$, and $F^d$; the sum of each Conditional Probability of "Defect True" and "Defect False" should be one. As noted above, the CPDs can be learned from a training dataset using Parameter Learning techniques (e.g., Maximum Likelihood Estimator, Bayesian Estimator, and or Expectation Maximization Estimator).

Context/Causal information Prediction (Block 360)

Referring again to FIG. 3B, once PGM 608 is trained in respect of a process, it can be used to provide information about causal relationships within that process (Block 360). In one example, the trained PGM 608 can be used for context prediction by processing using a Causality Structure Prediction algorithm (Block 362) that evaluates the active sub-structure of the PGM 608 to extract a context graph that is a subset of the PGM 608, then compute relevance scores of each remaining path in the extracted context graph.

Figure 11E:
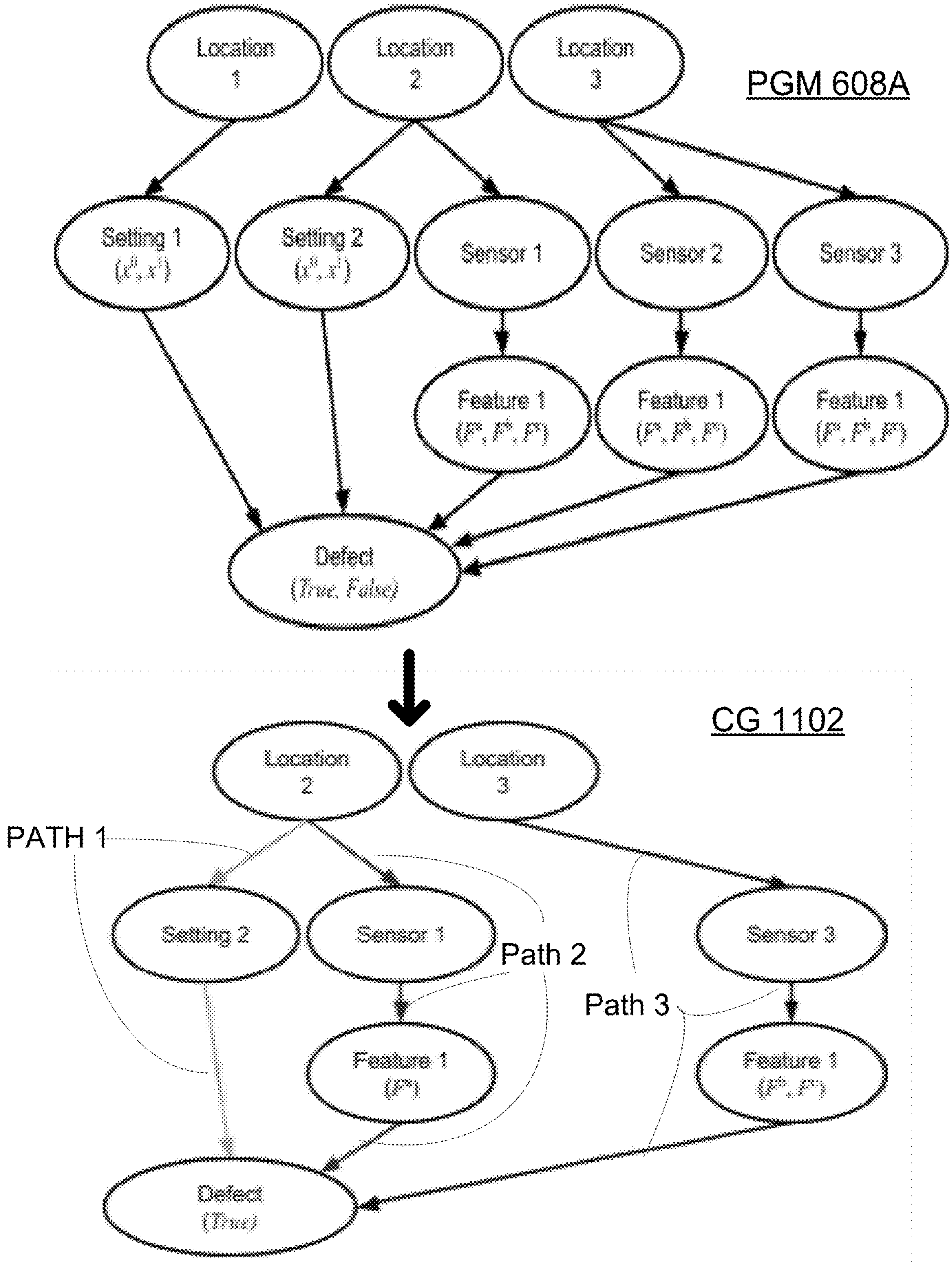
FIG. 11E shows a further example of a probabilistic graph, together with an extracted context graph, according to an example embodiment.

By way of example, FIG. 11E shows a further example of a PGM 608A, together with an extracted context graph CG 1102. Given the known outcome (e.g., Defect True) and the active levels (e.g., variable values) of each node, the active paths in the PGM 608A are determined from the previously computed Conditional Probability Distributions (CBD's) for each of the graph edges, yielding the context graph CG 1102. Context Graph CG 1102 is a sub-structure of the original PGM 608A structure that contains only relevant node connections and their respective nodes. Using the structure of the context graph CG 1102, relevance scores of each path (which can include multiple node hops) can then be obtained (example of relevance scores shown in Table 1 below), using various structure score functions. The ranked relevance scores and associated paths, excluding abstract nodes, can provide context and prediction insights to a user.

TABLE 1

| Example of context graph path relevance scores | |
|---|---|
| PATH | Path Relevance Score |
| Path 1 | 90% |
| Path 2 | 75% |
| Path 3 | 25% |

In a further example, the trained PGM 608 can be used for context prediction (also referred to herein as causal information) based on Conditional Probability Inference (CPI) (FIG. 3B, Block 364). CPI applies a query algorithm or model to answer conditional probability questions based on the PGM 608. The query algorithm or model can be either defined by users or constructed by structure learning. For example, a user might want to know what is the probability of a type of defect occurring given observed variables (including initial setpoint values and time series features), unobserved variables (such as environmental parameters), and the dependency of variables (graphical model). Inference can be done using hard evidence or virtual evidence. Hard evidence or facts (observable variables) are definitely true and do not need to be questioned. Virtual evidence allows for normally unobservable variables. A typical modeling practice in such cases is that with a model observable variables can provide information about the unobservable variables.

Figure 11F:
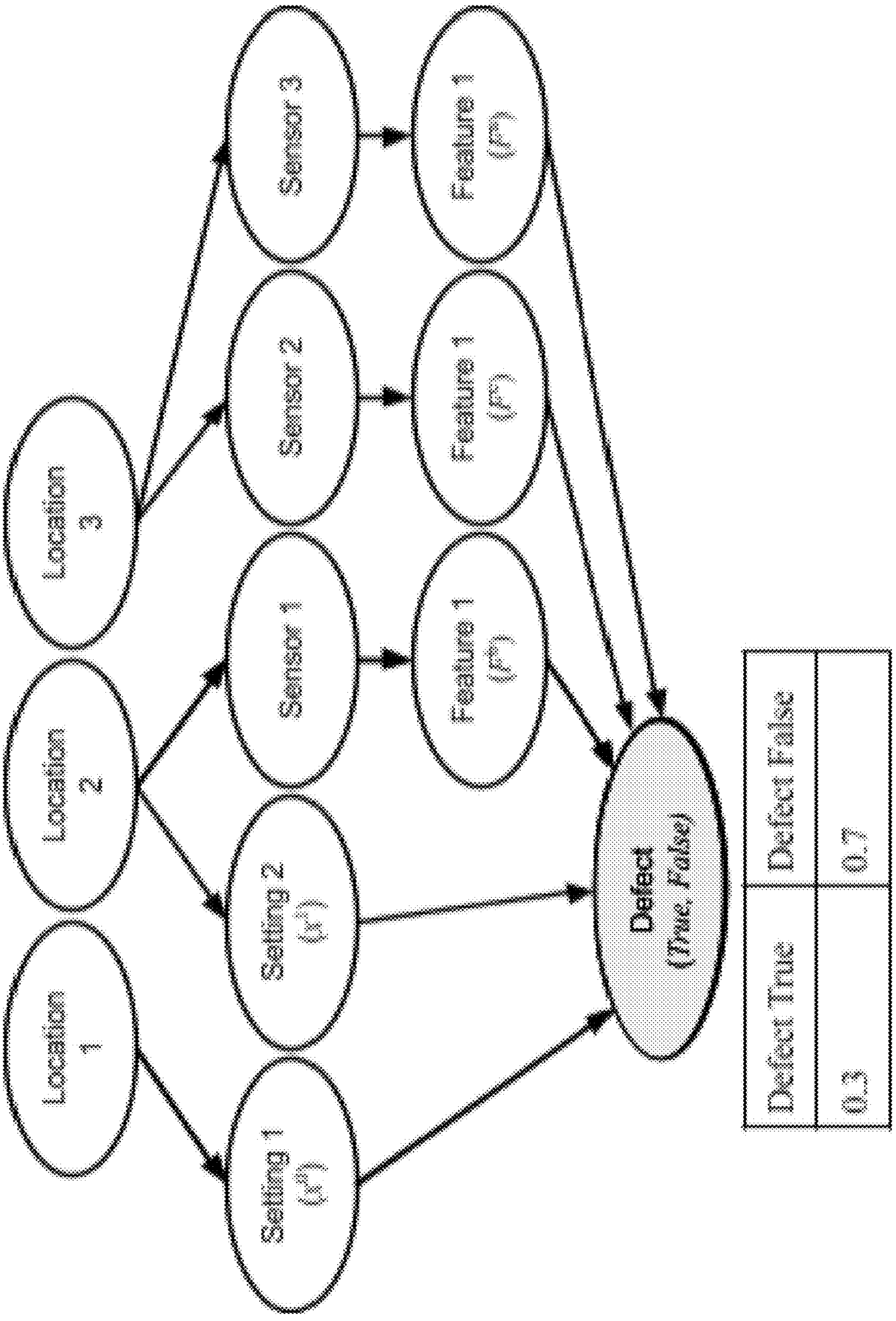
FIG. 11F represents an inference query in order to identify the probability of producing a defective part.

Given the variable values of enough nodes, without necessarily having all of the data or knowing the outcome, the trained PGM 608 can be processed to predict the possible paths and outcomes. The Conditional Probability Distribution parameters of the PGM 608, organized as look-up tables, can be assessed and the rows that remain valid describe the predicted outcome of the system. That is, the predicted outcome of the system can be estimated by repeatedly querying the PGM 608 with the current state (observed node variable values) of the process. FIG. 11F depicts an inference query based on the known process data to evaluate the active node levels (e.g., observed variable values) and paths (as represented by the edge CPDs) in order to identify the probability of producing a defective part.

For process applications where visual confirmation of an outcome is not possible until a later stage in the process, this inference query of FIG. 11F provides a data-driven approach to estimating the outcome based only on existing knowledge of the process. Potential related insights may include: Confidence scores of possible outcomes; suggested control actions; and In-process quality rejections. Some scenarios of using context prediction are listed in Table 2.

TABLE 2

| Scenarios of using context prediction | | | |
|---|---|---|---|
| Scenarios | Inputs | Outputs | Examples |
| Users have no dataset yet. Users need to collect sensor data and product images | Sensor time series and defect images | Time series features, defect labels, structures learned, model parameters learned, statistical inference, and causal inference. | What are the dependencies of the data? If a setting parameter is changed to a value, what is the probability of the defect occurring? |
| Dataset and prior model structures are available. Users guess the connections between settings/sensors and defects according to their knowledge and experience. | Prior structures of variables. Users construct new structures: nodes and edges. | Structure scores are used for comparison to find out which structure fits the data best. | What are the most likely associations with the defects? Is this guess better than machine learning? How much difference? |
| Dataset and prior model structures are available. Users want to know the probability of one type of defect given an updated set point or an updated feature value. | Prior structures of variables. New hard or virtual evidence. | The joint probability of the chosen variable given the condition of some variables. | Is the defect more or less likely to occur if one input setpoint is changed? |
| Dataset and prior model structures are available. Users want to test a hypothesis of causal inference. | Prior structures of variables. A sequence of new hard evidence. | Updated structures and inference | Is this the reason that the defect occurs frequently? |

Figure 12:
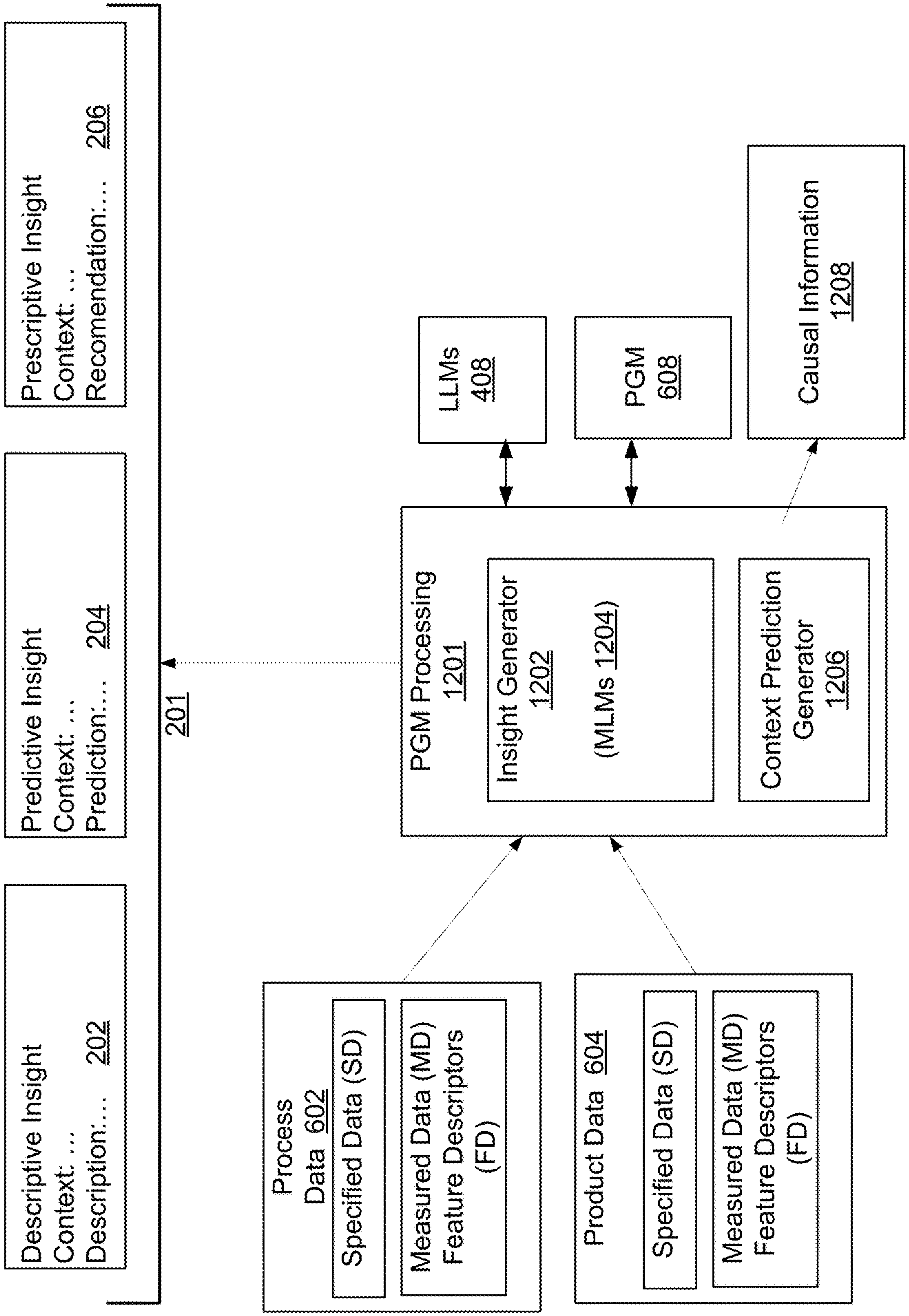
FIG. 12 is a block diagram illustrating the generation of descriptive, predictive, and prescriptive insights for an industrial process.

By way of further illustrative example of context prediction, information from a derived context graph can be presented to a user as described above in respect of FIG. 2, the process graph 100 as represented in GUI 110 of FIG. 1 can be overlaid with causal network data that is obtained based on PGM 608. Furthermore, as noted above in respect of FIGS. 2 and 3, computer implemented system 300 can be used to generate insights 201 (e.g., descriptive insight 202, predictive insight 204 and prescriptive insight 206) for the industrial process 104 based on information embedded in PGM 608. In example embodiments, processing module 312 is configured with a PGM processing module 1201, an example of which is shown in FIG. 12, that is configured to generate information about causal relationships and insights 201.

In one example, PGM processing module 1201 includes a context prediction generator 1206 that is configured to perform Context/Causal Information Predictions (Block 360) to generate causal information 1208 (including for example context predictions in respect of the SD and MD data elements of industrial process 104 and product 102. Context prediction generator 1206 can apply one or more query algorithms to PGM 608, together with newly observed process data 602 and product data 604, to infer or predict causal information 1208.

Insight Generation (Block 366)

With reference to FIGS. 3B, method 350 can include one or more operations for generating insights (Block 366) such as those mentioned above in respect of FIG. 2. In this regard, PGM processing module 1201 can include an insight generator 1202 includes one or more application program interfaces for interfacing with LLMs 408. LLMs 408 can be accessed to provide context refinement, both for generating insights 201 and refining PGM 608. Among other things, LLMs 408 can be used to: evaluate the long range historical relationships between generated insights 201 and their impact on real-time operating environments to refine and adapt the data context for the purpose of improving the quality of interactions with the system users; compose questions for users to consider about the insights 201 to further refine the data context; and compose comparisons between insights 201 to get a more verbose feedback about the changing context of the system, environment, and/or production requirements.

Insight generator 1202 can include one or more ML models 1204 for interpreting process data 602, product data 604, inputs from LLM 408 and PGM 608 to generate insights 201.

In the illustrated example, three types of insights 201 are provided by insight generator 1202: descriptive insights 202 for communicating process/product relationships/knowledge to a user; predictive insights 204 for modeling process/product relationships and outcome prediction and communicating these aspects to a user; and prescriptive insights 206 for recommending process improvements and risk mitigation to a user.

Insights 201 are generated with the objective of: (1) leveraging an application-specific causal network (i.e., PGM 608) to perform product focused analysis, such as product quality root cause investigations, and generate associated descriptive, predictive, and prescriptive manufacturing insights that can be communicated to process operators and process control systems for improved process decision making and performance improvements; and (2) leveraging an application-specific causal network (i.e., PGM 608) to perform process focused analysis, such as process health investigations, and generate associated descriptive, predictive, and prescriptive manufacturing insights that can be communicated to process operators and process control systems for improved process decision making and performance improvements.

In example applications, insight generator 1202 is pre-configured based on application-specific threshold settings and context settings and executes insight generation software continually to process incoming data, compare pre-configured analysis and generation settings, then curate and delivers insights 201 back to the machine and/or operator. This workflow may be completely automated or manually configured and curated depending on the application. Insights may also be curated based on a user hypothesis, for example "does the injection setpoint in an injection molding process have a direct impact on the production of products with flash defects", and can return a summarized data analysis that helps answer the hypothesis.

In example implementations, insight data that includes insights 201 can be communicated to operators and/or machines associated with process 104. For example, insights 201 can be presented to the user through a client module 310 or other local human machine interface (HMI) device for in-factory actions, such as recommended operator interactions or recommended control action changes. In some cases, insights can be presented to the user through a cloud-connected computing device (e.g., other module 318) accessing a cloud platform for the purposes of offline data exploration. In some examples, insights can be presented to the machine control network (e.g., via control module 308) for automatic adjustment of controller settings. User interactions through the cloud platform can be communicated to a local edge device and/or HMI for in-factory actions, such as recommended operator actions or automated control actions.

Figure 13A:
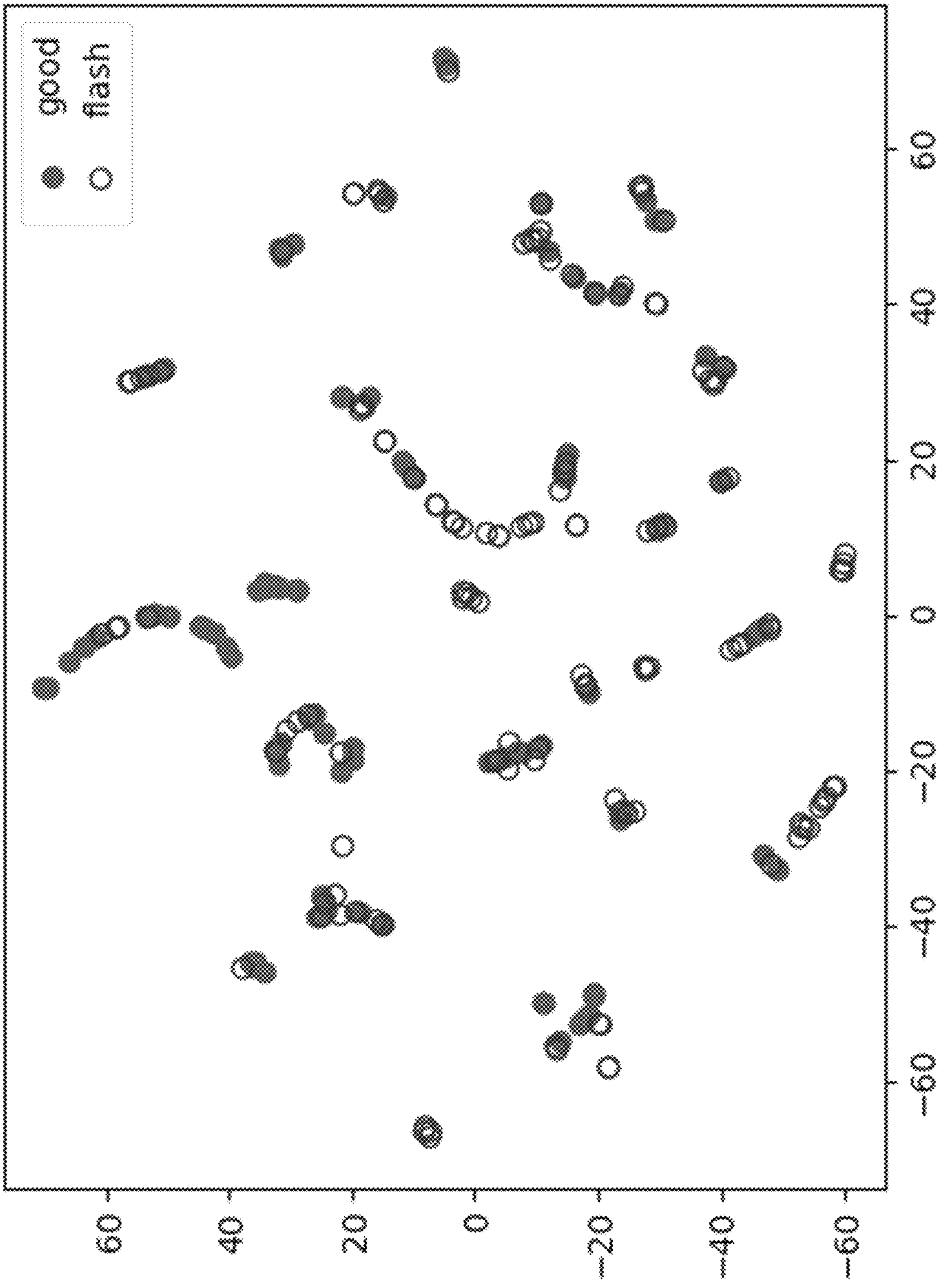
FIG. 13A shows an example of dimensionality reduction techniques applied to injection molding process data and associated product quality outcomes.

In the context of an injection molding process, examples of descriptive insights 202 may, for example, include: (1) Statistics on product data (e.g. defect categories, defect/fault scores, defect clusters) and process data (e.g. critical features); (2) Data on relationships between process data and product data (e.g. showing "good" parts and "defect" parts in a dimension-reduced feature space); and (3) summary of daily/weekly/monthly production statistics. By way of example, FIG. 13A illustrates a plot representation of "good" parts and "defect" (flash) parts: x and y axis are two features of a feature space whose dimensions are reduced by approaches such as manifold learning.

Example of predictive insights 204 for an injection molding process can, for example, include: Outcome prediction (e.g. probability of defects); Sensor failure prediction; and Quality measurement prediction.

Figure 13B:
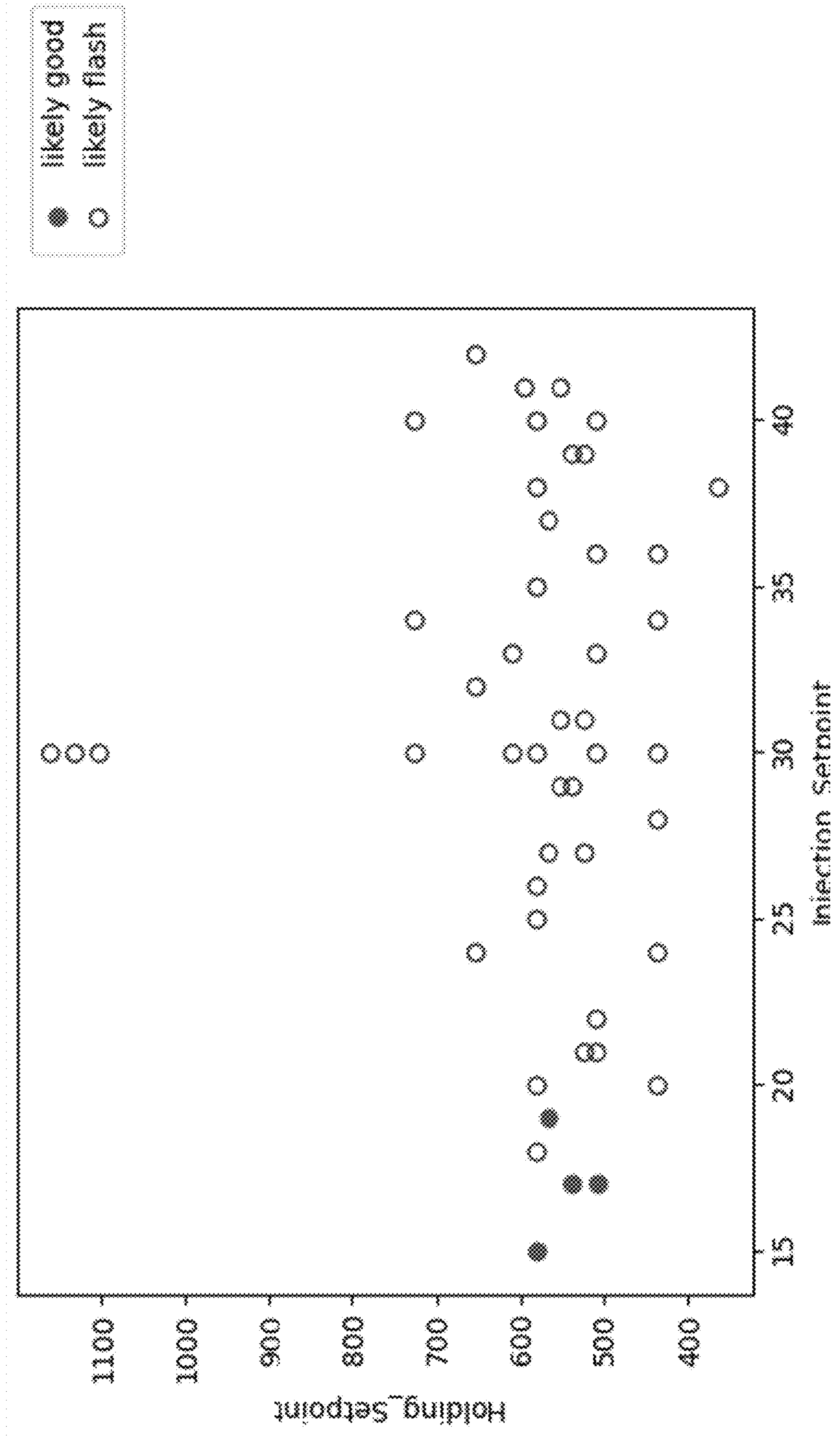
FIG. 13B shows an example of relationships between injection molding setpoint data and associated product quality outcomes.

Examples of prescriptive insights 206 for an injection molding process can, for example, include: (1) Action recommendation. For example, the plot of FIG. 13B represents a prescriptive insight indicating that some injection setpoint and holding setpoint values will likely lead to flash defects; (2) Consequence of action/no-action (e.g., when the injection setpoint value is fixed at 18 and the holding setpoint value is increased from 565 to 580, the probability of flash would increase from 29% to 59%.); (3) Maintenance suggestion (e.g. feature descriptors FD from a sensor time series indicate unexpected change.); (4) Risk ahead (e.g., the on-going data are moving from the "likely good" region to the "likely defect" region.) and (5) Insights on data exploration (e.g. day-night shift comparison, comparison before/after a new equipment, comparison before/after a new standard).

FIGS. 14A and 14B illustrate further examples of context insight information that can be generated by insight generator 1202 according to example implementations. As depicted in FIG. 14A, causation and correlation insights can be obtained performing causality structure prediction to obtain context graph and path relevance scores. A simplified representation of the context graph and path relevance scores, as depicted in FIG. 14A, can be presented as part of an interactive GUI.

With reference to FIG. 14B, process prediction insights can be obtained by performing conditional probability inference querying to estimate the predicted outcome of the system. Confidence scores can be communicated through a user insight when the process is trending towards the production of defective parts. An example user insight can be presented as a simplified GUI representation of the analysis of the relevant Conditional Probability Distributions, as depicted in FIG. 14B.

Action Implementation (Block 368)

Referring again to FIG. 3B, in some examples, method 350 can also cause actions to be implemented (Block 368) based on the context predictions and insight generations. In some examples, the actions may be limited to presenting information on a display screen such as described above. In other examples, the actions may include causing a system controller to automatically implement actions that are specified in generated insights.

Transfer Learning

Figure 15:
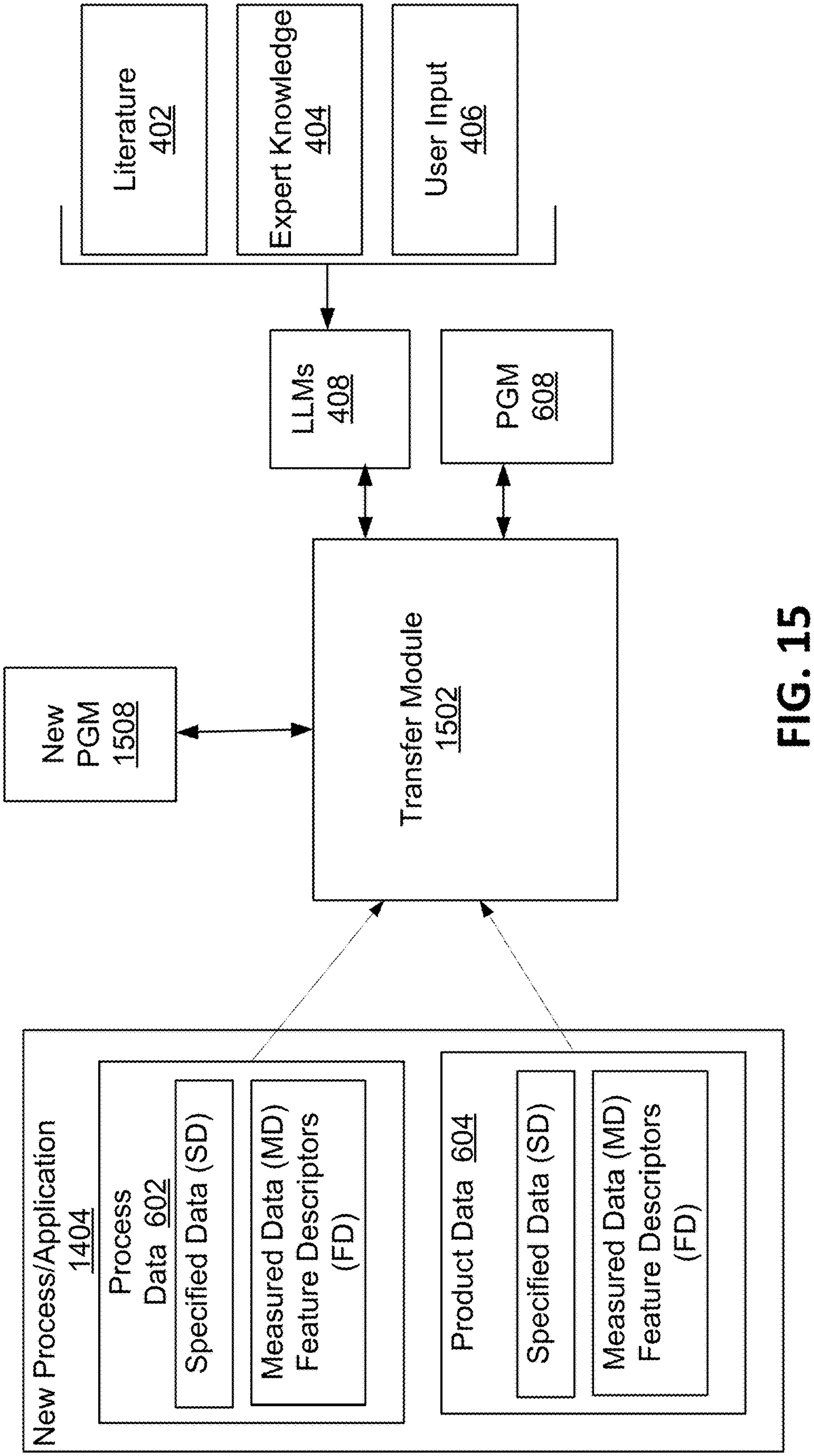
FIG. 15 is a block diagram illustrating the transference of application knowledge to similar compatible applications.

With reference to FIG. 15, in some examples a transfer module 1502 can be used to transfer learning for a PGM 608 trained in respect of one process domain (e.g., process 204) to a new PGM 1508 that models a new industrial process 1404.

Conventional black box modeling techniques do not provide a clear connection between the internal states of the model nodes in relation to the states of the real-world problem. This creates a scenario where transferring the learning about specific machines, products, and production environments is challenging, and can limit the amount of a-priori knowledge that can be leveraged when creating new models for new applications and processes.

However, the semantic layer that is included in the nodes of the causal networks represented in PGM 608 enables context similarities and differences to be identified when evaluating a new scenario. This is accomplished by using the semantic embeddings generated by LLMs 408 as indexes for previously learned causal structures (e.g., existing PGM 608). These causal structures can represent the entire structure of a specific application and/or subsets of a causal structure where there is high relevance with respect to the physical process An example would be to search previous causal structures from an injection molding process to find related physical sub-process that are relevant to another process (e.g., new process 1404) such as metal die-casting. The overall context of the two processes are very different, but certain sub-processes such as melting, injection, and cooling share similar physical characteristics that are measured with similar sensors. The process of transferring knowledge through PGMs is to share the statistical strengths between models for two knowledge domains or two production processes. For example, an additional random variable can be introduced as a connector to link two processes (Xuan, J., Lu, J., & Zhang, G. (2021). Bayesian Transfer Learning: An Overview of Probabilistic Graphical Models for Transfer Learning (arXiv. https://doi.org/10.48550/arXiv.2109.13233), and the knowledge from one process can be transferred to the other process through this variable. The design of the variable for transfer learning depends on the problem and users' understanding of this problem. Specifically, methods for transfer learning with PGMs include but not limit to: Gaussian distribution prior (mean and/or standard deviation), probabilistic latent semantic analysis or latent Dirichlet allocation for document modeling, Bayesian nonparametric models, tree structures, attributes (e.g. color, texture, shape attributes of sensor images), and factor analysis (Xuan, J., Lu, J., & Zhang, G. (2021). Bayesian Transfer Learning: An Overview of Probabilistic Graphical Models for Transfer Learning (arXiv:2109.13233). arXiv. https://doi.org/10.48550/arXiv.2109.13233).

By leveraging learned causal structures from other processes the transfer module 1502 does not need to calculate all the joint probabilities represented in the feature descriptor space, thus allowing it to learn much faster and with less training examples. Either expert judgements or knowledge transferred from other processes can be incorporated as node constraints of the PGMs. Parameter learning accuracy can be improved with transferred priors and constraints although training data are limited or not relevant (Zhou, Y., Fenton, N., Hospedales, T. M., & Neil, M. (2015). Probabilistic Graphical Models Parameter Learning with Transferred Prior and Constraints. Proceedings of the Thirty-First Conference on Uncertainty in Artificial Intelligence, 972-981.).

In terms of process data 602, there is often a large degree of variation in the methods of data capture, even for very similar machines and processes. This creates a unique set of data for each machine and process and creates a significant challenge in developing an optimal set of feature descriptors for that data that are most relevant to the process context. By leveraging semantic comparison of historical causal structures the transfer module 1502 can apply the best techniques for identifying critical feature computation, and the structured relationships between those features.

Regarding product data 604, a major contribution of a causal graph structure is its ability to unify data across multiple domains in industrial processes. The data captured by quality control systems often exist in data silos and are not easily comparable for the purpose of determining a root cause of a quality issue. Using different feature extraction techniques for different data sources such as images, video, audio, for example, allows the causal graph to connect a large and diverse feature space between measured data and specified data. The features extracted from product quality data can be generated by any number of different modeling or data analysis strategies such as clustering/classification/regression models. It is the relationship between these features under the current context that is critical for the causal structure to determine. Quality metrics can be subjective to user preference or production requirements, so the semantic information related to connections in the graph are used dynamically to adjust the significance of features.

Figure 16:
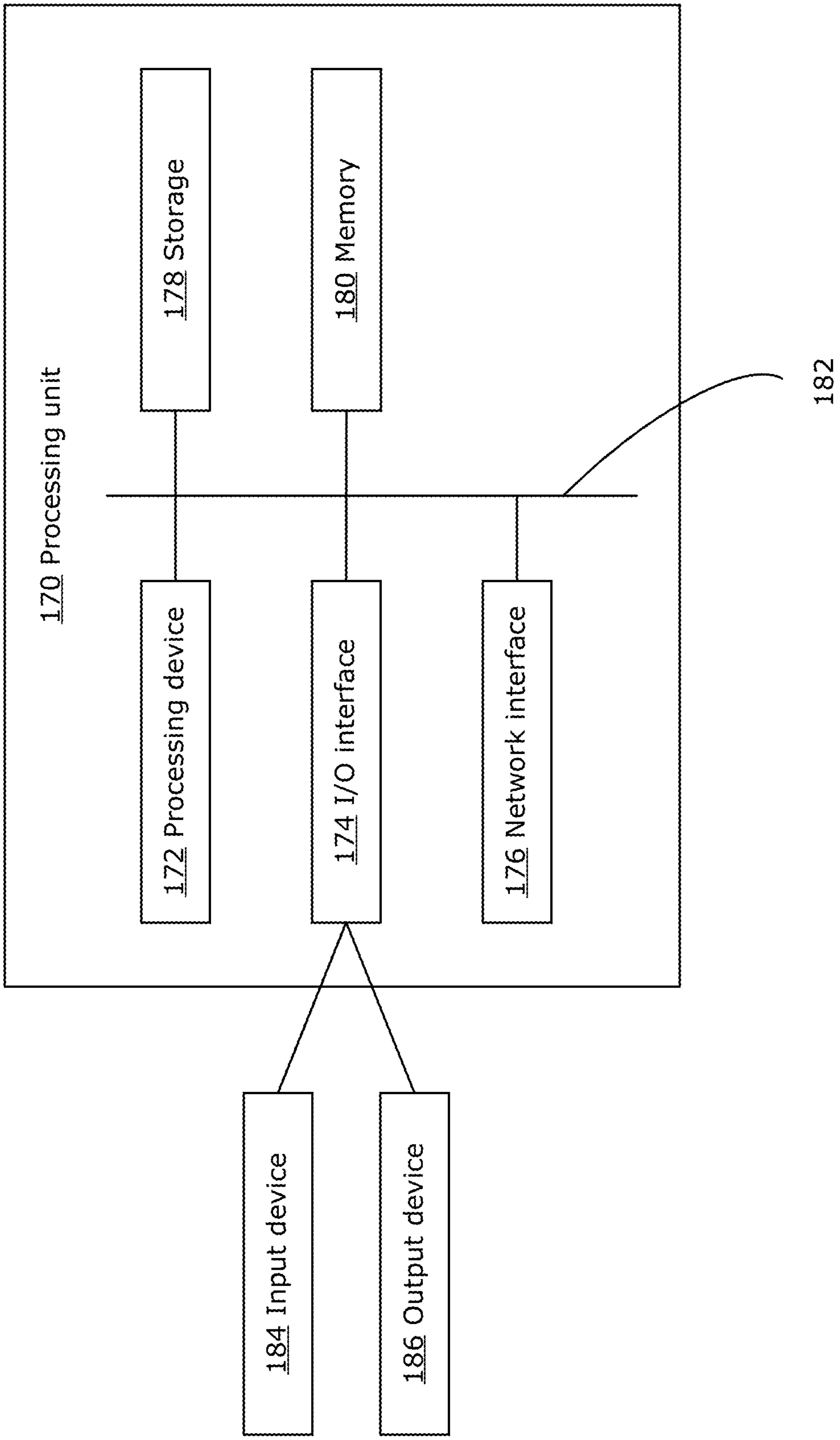
FIG. 16 is a block diagram of a processing unit that can be used to implement modules and units of the system of FIG. 3 according to example embodiments.

FIG. 16 is a block diagram of an example processing unit 170, which may be used to implement one or more of the modules disclosed herein. Processing unit 170 may be used in a computer device to execute machine executable instructions that implement one or more of the modules noted above or parts of the modules noted above. Other processing units suitable for implementing embodiments described in the present disclosure may be used, which may include components different from those discussed below. Although FIG. 16 shows a single instance of each component, there may be multiple instances of each component in the processing unit 170.

The processing unit 170 may include one or more processing devices 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g with networks 316 or 320).

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions. There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

From the above description, it will be appreciated that one or more aspects of the present disclosure can enable data based context to be acquired in respect of a production process and effectively leveraged to enable online visuality and real-time monitoring of the production process. This can support improved quality inspection insights through available process data. This disclosure describes methods of context prediction from inspection data to support process operators with meaningful, interpretable, and actionable quality insights. Among other things, context prediction can, in various applications, enable one or more of: Causality Structure Prediction—identify the causal factors associated with a given outcome (e.g., defect classification) to find answers about why an outcome occurred; and Conditional Probability Inference—predict the likelihood of an outcome (e.g., defects or other risks) occurring based on the inspection data during the production process.

In examples, context prediction derives high-level causal variables (or features) from low-level observations (or settings/sensors) and evaluates their relevance on the outcome. Highly relevant relationships that are computed between variables are then able to be organized into concise user insights and/or machine actions.

Data based context (also referred to as data context) for a manufacturing process can refer to the history of a manufacturing process of a specific type of part in the inspection dataset, consisting of all the observations/data before, during, and after the manufacturing process, including production settings, sensor recordings (features), images, and quality measurements (defects).

Data context also consists of the relevance and variance of the collected data. If the relevance and variance between settings, features, and defects can be identified and quantified, the quality of outcomes can be predicted. The relevance indicates the causal factors associated with the defects, and the variance indicates the likelihood of defects happening.

Context prediction aims to understand the data context through learning-based approaches to effectively identify the causal factors of a process that are statistically relevant to the outcome. This includes evaluating the relevance of different causal factors as well as the likelihood of possible outcomes.

Context Structure

In some example implementations, data context can be considered as falling within three groups: (1) context of defects (e.g., visible or measurable defects between "Good" and "Bad"; (2) context of features (e.g., measurement data that is acquired by sensors, or features extracted from such measurements); and (3) context of settings (e.g., environment defined context, and specified data such as material, machine or production settings).

A context prediction system such as described above can learn from an inspection dataset through the three context groups and their relations in order to perform causal structure predictions and make conditional probability inferences. Constructing the relations between defects and features plays an important role in accurate and efficient prediction. Feature extraction (e.g., from time series or an image) and feature selection (e.g., by factor analysis and graphical model) determine the context of features.

From a process operator's perspective, the context groups of defects and settings are relatively clear and understandable, whereas the context of features, especially unobservable latent features extracted from time series or using methods of dimension reduction (for example, Principal Component Analysis) may lose their original physical meanings.

Feature Extraction and Selection

Generally, the observations/data contained within the data context are of the following types: (1) setpoint data; (2) time-series data; (3) image data; and (4) outcome labels (i.e., classifications). Context prediction can benefit from a refined set of high-level features extracted and selected from a large amount of low-level observations. In at least some example applications, the extracted feature sets effectively summarize the relevant feature contexts of the observations. Feature extraction and feature transformation are techniques that can be applied to observations/data to reduce their dimensionality to produce a minimalistic data representation. This abstraction improves the performance of learning models that leverage feature representations of the data.

Relevant feature extraction techniques are applied to each observation/data contained within the data context (eg. the extracted features can be used to minimally describe the time series and their dynamics). They can also be used to cluster time series and to train machine learning models that perform classification or regression tasks on time series. This primarily allows to reduce the dimensionality of the problem and focus the resulting predictions on the most relevant features of the data. The extracted features have successful applications in sensor anomaly detection, activity recognition of synchronized sensors, and quality prediction during a continuous manufacturing process.

Having a lower dimensional representation of the relevant observation/data features is beneficial; however, not all of these features are relevant to understand the feature context. That is, multiple features may describe redundant context and therefore further dimensionality reduction is possible. Factor Analysis is one tool that is used to describe variability among extracted, correlated features in terms of a potentially lower number of unobserved variables called factors. Factor analysis seeks an intuitive explanation about what's common among the features. The extracted features are then transformed as linear combinations of the potential factors (which also belong to the feature context) plus "error" terms.

FURTHER EXAMPLES

Further examples of the acquisition and use of causal network data such as a PGM 608 to provide information about causal relations and related insights in the context of a mass production process will now be described.

Further Example 1

An example will now be described in the context of a plastic injection molding process using an Injection molding machine (IMM) to produce plastic parts. The IMM data context includes setpoint parameters, sensor time series, and camera captures (optical image, thermal image and its temperature intensity in pixels). In this example, 8 setpoint parameters (e.g., specified data SD elements) (see Table 3) were fed into the IMM control system. The parameters were set by a randomized factorial design. A series number was granted to each part after it was produced (e.g. '2023-11-14-16-30-45').

Defects were manually labeled into four categories: flash, splay, short shot, sink.

For the purpose of this example, flash defects are used for showing examples in the following tables and figures.

TABLE 3

| The 8 IMM setpoint parameters | |
|---|---|
| 1 | Injection_Setpoint (Speed) |
| 2 | Packing_Setpoint (Pressure) |
| 3 | Holding_Setpoint(Pressure) |
| 4 | Plasticate_Setpoint (Time) |
| 5 | Pack_Time_Setpoint(Time) |
| 6 | Hold_Time_Setpoint(Time) |
| 7 | Cool_Time_Setpoint(Time) |
| 8 | Coolant_Flow_Set_Setpoint (Flow Rate) |

Different setpoint parameters, different lengths of time series data, and unknown factors (e.g. environment or material change) made each production process unique. Each production generated up to 47 time series data profiles. Certain profiles were removed due to data quality issues (e.g., missing or excessively noisy data). Optical images were enhanced with histogram equalization to improve defect visibility.

Features (e.g., feature descriptors FD) were automatically calculated from measured data. For example, for time series data the Python package Tsfresh™ can be used to automatically calculate relevant features. Example process data is shown in Table 4, for 3 time series profiles (Mold_Temperature_3, Mold_Pressure_2, and Barrel_Pressure_0) for two different production parts ('2023-11-14-16-30-45' and '2023-11-14-16-48-03'). The last column is the labeled binary data of defect Flash.

TABLE 4

An example of input process data.

| Part_id | Time | Mold_Temperature_3 | Mold_Pressure_2 | Barrel_Pressure_0 | Flash |
|---|---|---|---|---|---|
| 2023-11-14-16-30-45 | t0 | 10.51041 | −0.5385742 | 0.393066406 | True |
| 2023-11-14-16-30-45 | t1 | 10.24097 | −0.5385742 | 0.393066406 | True |
| 2023-11-14-16-30-45 | t2 | 10.21793 | −0.5385742 | 0.393066406 | True |
| 2023-11-14-16-30-45 | t3 | 10.06875 | −0.5449218 | 0.478515625 | True |
| . . . | . . . | . . . | . . . | . . . | . . . |
| 2023-11-14-16-48-03 | t0 | 10.21875 | −0.5449218 | 0.478515625 | False |
| 2023-11-14-16-48-03 | t1 | 10.203125 | −0.5839843 | 0.478515625 | False |
| 2023-11-14-16-48-03 | t2 | 10.203125 | −0.5839843 | 0.478515625 | False |
| 2023-11-14-16-48-03 | t3 | 10.203125 | −0.5839843 | 1.840820313 | False |
| . . . | . . . | . . . | . . . | . . . | . . . |

The output features were named with semantic descriptors taking the form of 'sensor name+feature name+feature parameters'. As shown in Table 5, sensor 'Barrel_Pressure_0'+feature 'fourier_entropy'+parameter 'bins_5'. In this study, those time series having no feature outputs were discarded.

TABLE 5

| Example of features. |
|---|
| Barrel_Pressure_0__fourier_entropy_bins_5 |
| Barrel_Pressure_0__agg_linear_trend_attr_"rvalue"__chunk_len_50_f_agg_"mean" |
| Barrel_Pressure_0__standard_deviation |
| Barrel_Pressure_0__variance |
| Barrel_Pressure_0__matrix_profile__feature_"median"__threshold_0.98 |
| Barrel_Pressure_0__energy_ratio_by_chunks__num_segments_10__segment_focus_2 |

Feature Selection was performed as follows. The tsfresh package limits the number of irrelevant features in an early stage of the machine learning pipeline with respect to their significance for a classification or regression task. The tsfresh package deploys Scalable Hypothesis tests to evaluate the importance of the different extracted features. For every feature, the influence on the target (defect) is evaluated by Univariate Statistical Tests and the p-value is calculated: the smaller the p-value, the more the significance, and the feature is more related to the defect. The method of testing relevance is selected according to the data type of features and targets (defects). In tsfresh, for real data type features and binary targets, 'mann' method is used to calculate the p-value, and the default False Discovery Rate (FDR) is 0.05.

The results of feature extraction and selection for the four types of defects are summarized in Table 6. The defect Flash was related to 4 sensors, which were associated with 73 features; since some features had more than one set of parameters, the number of feature columns was much more than 73. Among the 98 IMM product parts, only 50/of the parts had the defect Short Shot. No features were found relevant to the defect Short Shot.

TABLE 6

Feature extraction and selection for the four defects.

| Defect Type | Measured Data MD Elements, acquired from sensors | The Number of Features Selected (No. of Feature Descriptors FDs) |
|---|---|---|
| Flash | (4)<br>Barrel_Pressure_0<br>Barrel_Pressure_2<br>Mold_Pressure_2<br>Mold_Temperature_3 | 73 (187) |

TABLE 6-continued

Feature extraction and selection for the four defects.

| Defect Type | Measured Data MD Elements, acquired from sensors | The Number of Features Selected (No. of Feature Descriptors FDs) |
|---|---|---|
| Splay | (15)<br>Barrel_Pressure_0<br>Barrel_Pressure_1<br>Barrel_Pressure_2<br>Barrel_Pressure_3<br>Current_Sensor_2<br>Current_Sensor_5<br>Current_Sensor_9<br>Engle_Speed<br>Hydraulic_Back_Pressure<br>Mold_Pressure_2<br>Mold_Temperature_3<br>Screw_Position<br>Valve_Injection_Y3<br>Valve_Pressure_K<br>Valve_Speed_Y | 132 (520) |
| Sink | (5)<br>Barrel_Pressure_0<br>Barrel_Pressure_2<br>Mold_Pressure_2<br>Mold_Temperature_3<br>Valve_Injection_Y3 | 80 (249) |
| Short Shot | (0) | 0 (0) |

Feature Transformation was performed using the Python package factor analyzer to conduct factor analysis. The factor analysis model uses a minimum residual (MinRes) method and an orthogonal rotation to return a loading matrix. An absolute value of 0.4 or higher can be considered as a high loading. The MinRes method uses the fit function (i.e. the difference between the model-implied variance-covariance matrix and observed variance-covariance matrix) and adjusts the diagonal elements of the correlation matrix to minimize the squared residual when the factor model is the eigenvalue decomposition of the reduced matrix.

Figure 17A:
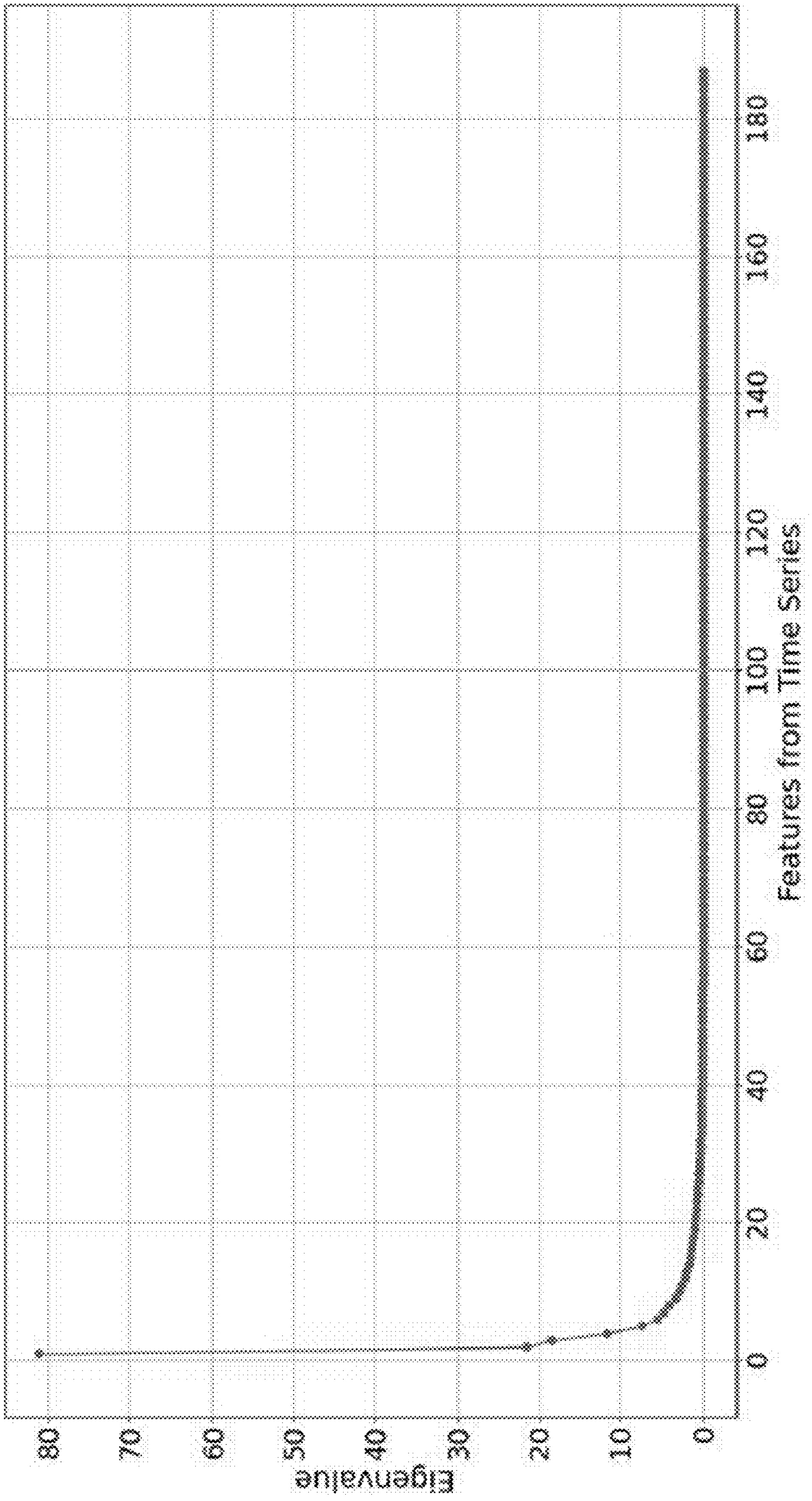
FIG. 17A is a plot showing Eigenvalues of feature descriptors derived from measured data elements for an illustrative injection molding example.

Exploratory Factor Analysis reveals how many factors are present and their associated factor loadings. FIG. 17A is a plot illustrating the output of factor analysis for the 187 features related to the defect Flash. The top 19 eigenvalues were over one, and thus the initial number of factors was set at 19. The cumulative factor variances for the 19 factors were over 93% of the variance. Therefore, the 19 factors and their corresponding loadings could be used for Confirmatory Factor Analysis.

Table 7 lists the factors and the corresponding features with loadings >0.4. Factor F1 contributed to as many as 102 features, while F12 or F16 only contributed to one feature. In Table 9, F1 was related to 4 sensors, F2~F4 related to at least 2 sensors, and F5, F7, F9 and others related to only one sensor. Therefore, F1 is the most common factor among all the features.

TABLE 7

Factors corresponding to features.

| # Factor | # Features |
|---|---|
| F1 | [5, 8, 11, 14, 17, 18, 19, 21, 26, 27, 28, 34, 36, 54, 63, 65, 66, 71, 72, 73, 74, 75, 76, 77, 78, 79, 80, 81, 82, 83, 84, 85, 86, 87, 88, 89, 90, 92, 94, 96, 97, 98, 102, 104, 105, 106, 107, 108, 109, 111, 112, 114, 115, 116, 117, 118, 120, 121, 122, 123, 124, 125, 126, 128, 129, 130, 131, 132, 133, 135, 136, 137, 138, 139, 140, 141, 142, 143, 145, 146, 147, 148, 149, 151, 153, 156, 157, 159, 160, 163, 168, 170, 171, 172, 175, 177, 178, 180, 181, 182, 183, 184], |
| F2 | [1, 8, 11, 14, 39, 40, 41, 42, 43, 44, 45, 46, 47, 48, 49, 50, 51, 52, 53, 54, 55, 56, 57, 58, 59, 61, 62, 63, 69, 72, 73, 74, 75, 76, 77, 78, 79, 80, 83, 85, 87, 88, 90, 94, 96, 102, 106, 107, 108, 111, 117, 118, 120, 134, 142, 161, 164, 165, 169, 174, 176, 179], |
| F3 | [10, 33, 72, 77, 82, 106, 109, 110, 111, 114, 118, 142, 149, 150, 152, 153, 156, 159, 160, 167, 173, 177, 185], |
| F4 | [0, 1, 2, 3, 4, 6, 7, 9, 12, 13, 14, 15, 16, 20, 24, 166, 186], |
| F5 | [102, 107, 108, 134, 161, 164, 165, 169, 174, 176, 179], |
| F6 | [62, 69, 81, 84, 88, 91, 95, 99, 100, 101, 103, 113], |
| F7 | [63, 65, 66, 67, 68, 70, 71], |
| F8 | [17, 18, 19, 26, 27, 34, 36, 168, 181, 182], |
| F9 | [20, 21, 22, 23, 28, 29], |
| F10 | [113, 119, 127, 158], |
| F11 | [30, 32, 35, 37], |
| F12 | [152], |
| F13 | [25, 31, 33, 166], |
| F14 | [39, 40, 41, 42, 43, 53, 61], |
| F15 | [60, 64], |
| F16 | [155], |
| F17 | [6, 178, 183], |
| F18 | [144, 162, 175], |
| F19 | [10, 185] |

Table 8 lists the factors that are related to the sensors for the defect Flash. After factor analysis, the 187 features extracted from time series were reduced to 19 latent factors. Three variables (features) having low loadings (<0.4) of factors were ignored. The left 184 features were transformed to the factor coordinates, which were independent to each other.

TABLE 8

Factors related to sensors for the defect Flash.

| Sensors | Factors # | | | | | | |
|---|---|---|---|---|---|---|---|
| Flash_Barrel_Pressure_0 | F4 | F3 | F2 | F1 | F19 | F17 | |
| Flash_Barrel_Pressure_2 | F13 | F11 | F9 | F8 | F4 | F1 | F3 |
| Flash_Mold_Pressure_2 | F2 | F7 | F15 | F1 | F6 | F14 | |
| Flash_Mold_Temperature_3 | F1 | F3 | F6 | F5 | F10 | F2 | F4 |
| | F18 | F19 | F17 | F8 | F13 | F11 | F16 |

Figure 17B:
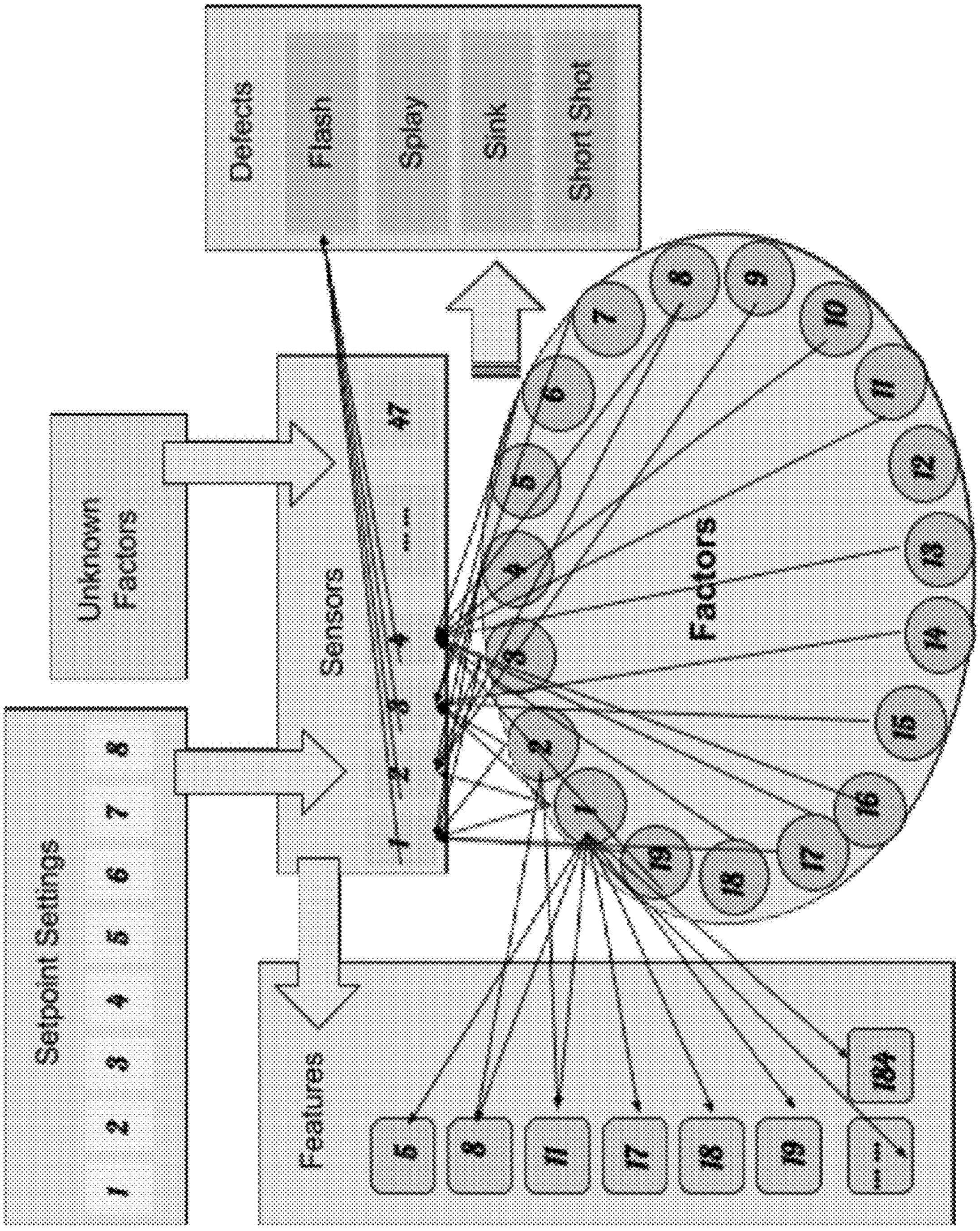
FIG. 17B is a block diagram illustrating a factor structure identified and tested by factor analysis in respect of the illustrative injection molding example.

Based on the factor structure obtained from Exploratory Factor Analysis, Confirmatory Factor Analysis performs a hypothesis test to examine if the factor structure is true, using the method of maximum likelihood. The factor structure identified and tested by factor analysis is shown in FIG. 17B. The setpoint settings and other unknown factors affect sensor data; features extracted from the time series of sensors describe the characteristics and dynamics of sensors; correlated features have some common latent factors, which are also related to sensors. With time series analysis and factors analysis, the contribution of common factors to the features, the relation between factors and sensors, and the association of sensors with defects were identified. However, the dependence of defects on the factors or settings is unknown.

Figure 17C:
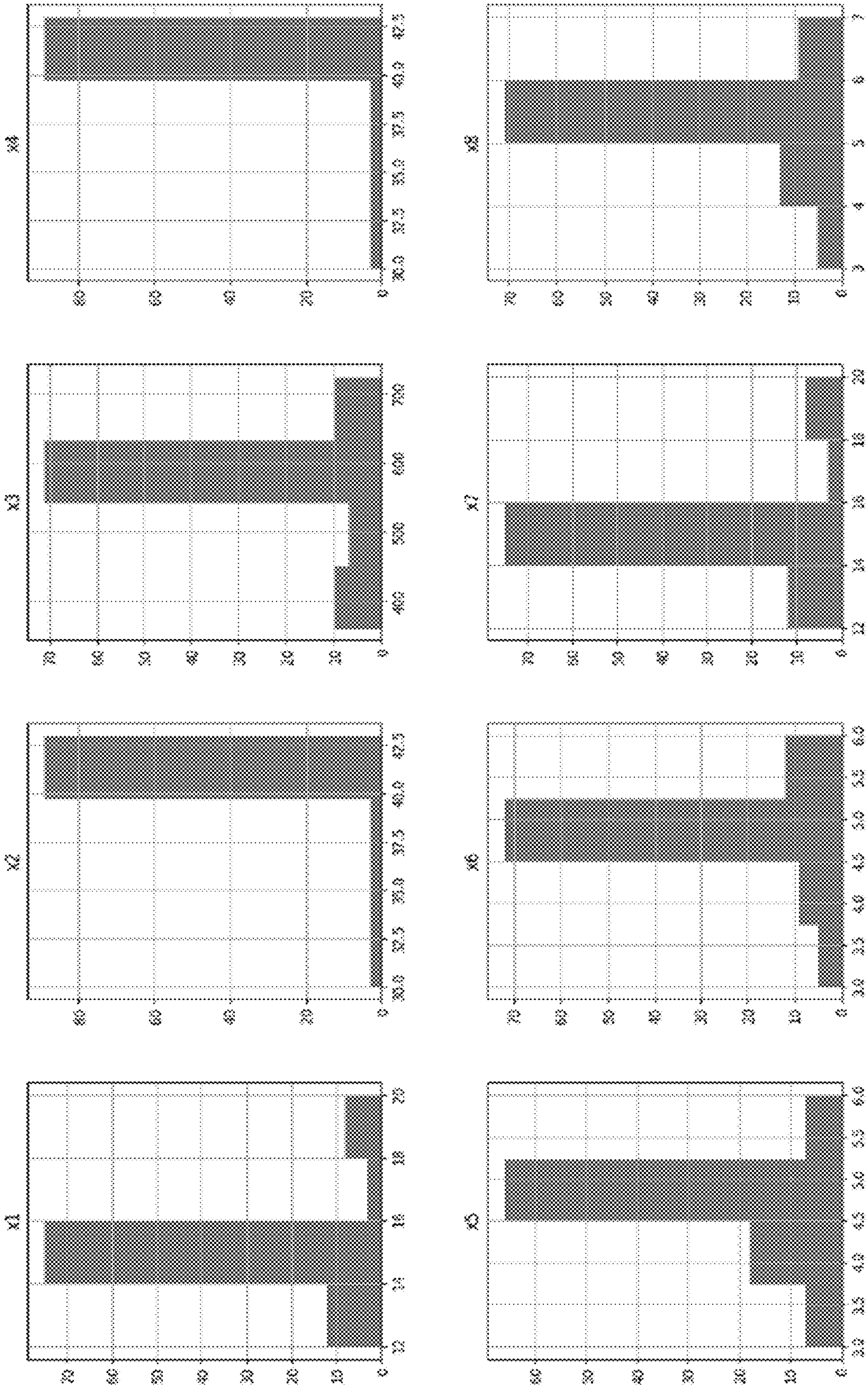
FIG. 17C is a set of plots showing the distribution of 18 respective set points (specified data elements) in respect of the illustrative injection molding example.
Figure 17D:
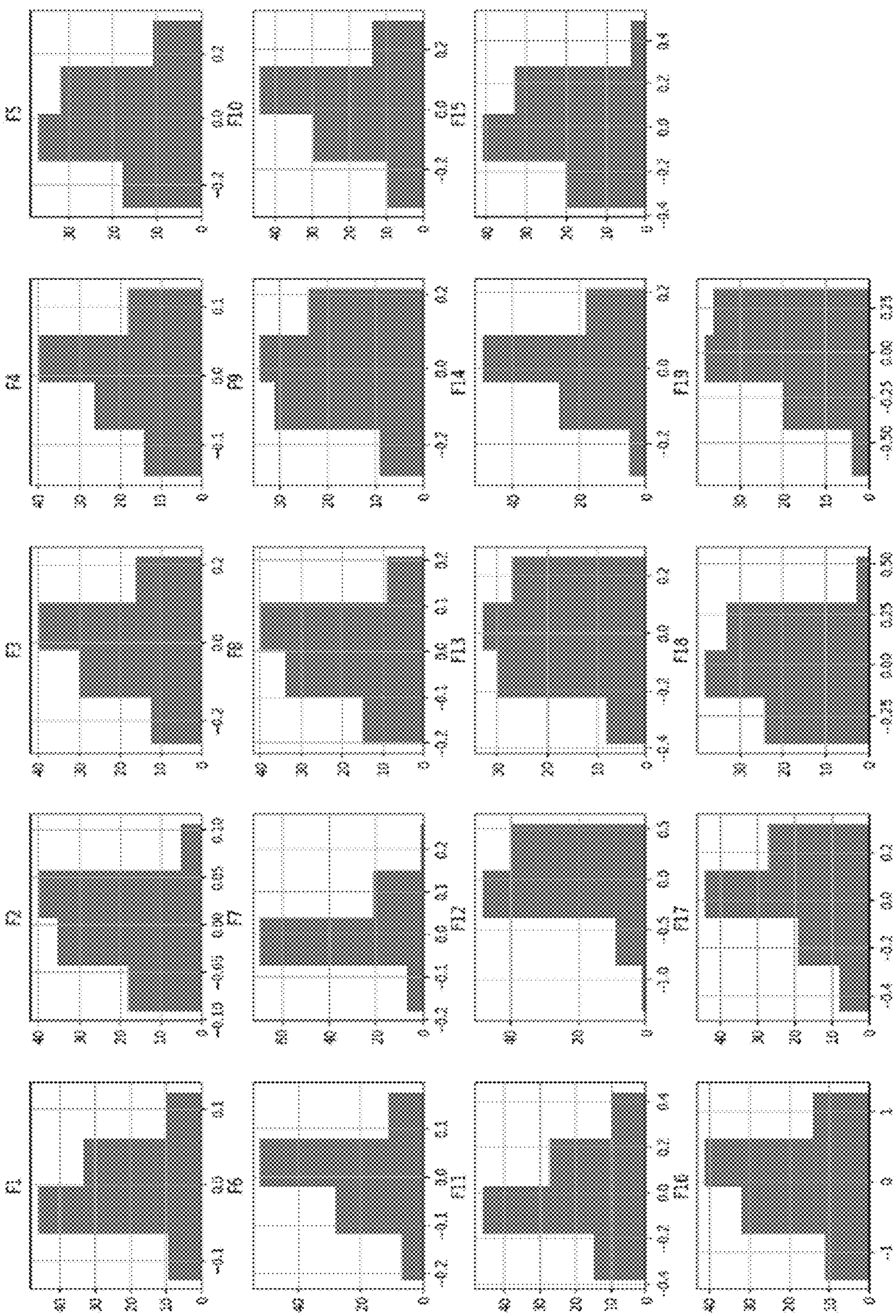
FIG. 17D is a set of plots showing the distribution of 19 respective factors in respect of the illustrative injection molding example.

A PGM is then learned through an automated causal inference analysis of dependencies among defects, factors, and settings. Probability Distributions can be continuous such as normal distribution or log-normal distribution. In this example, since only 98 samples were analyzed, the distribution of each variable (i.e. each node in the structure) may not be a normal distribution (see the distribution of 8 setpoints in FIG. 17C and the distribution of 19 factors in FIG. 17D). To avoid the assumption of distribution for each variable, each variable was discretized into 4 bins as shown in FIG. 17C and FIG. 17D.

There are two typical tasks with graphical models: inference and learning. A Python library pgmpy was used in this example to implement inference and learning.

This example selected Bayesian Dirichlet (K2) scores for structure learning. Given any node of the 8 settings and 19 factors as a parent of the node "Flash" the local scores were calculated and compared in Table 9. The score columns were descending sorted. The comparison showed that the three scores were close, and the orders of parental influence from highest to lowest were also close. Given lists of potential parents, for example [F19, F4, F18] and [F1, F2, F3], the local K2 scores were −68.44 and −71.56 respectively, which indicated "Flash" was more influenced by the parent nodes [F19, F4, F18] than [F1, F2, F3]. The comparison implied that the first 3 common factors (from Factor Analysis) may not be the most influential factor in the Probabilistic Graphical Model. However, Factor Analysis worked on reducing the dimensions from 187 to 19.

The search space of Direct Acyclic Graph is super-exponential in the number of variables/nodes and the scoring functions allow for local maxima. The exhaustive search is intractable for big networks, and the local optimization algorithms such as hill climb search cannot always find the global optimal structure. Thus, heuristic search strategies often yield good results. The pgmpy library allows users to set up the starting structure for the local search. By default, a completely disconnected network is used. The pgmpy library also allows fixed edges—a list of edges that will always be there in the final learned model. The algorithm will add these edges at the start of the algorithm and will never change it.

Constraint-based structure learning constructs Direct Acyclic Graphs according to identified independencies. There are several conditional independence tests available in the pgmpy library, such as Pearson R test, Chi-Square test, Log-likelihood test, Freeman-Tukey test, and Cressie-Read test. This method returns a Direct Acyclic Graph structure which complies with the interdependencies implied by the dataset. Based on the results from constraint-based structure learning, an additional [white_list] or [black_list] can be supplied to the hill climb search. In this case, the search can restrict to a particular subset or exclude certain edges. To enforce a wider exploration of the search space, the search can be enhanced with a tabu list. The list keeps track of the last n modifications; those are then not allowed to be reversed, regardless of the score (similar to tabu search).

TABLE 9

Comparison of structure scores.

| K2 | | Bdeu | | BIC | |
|---|---|---|---|---|---|
| x2 | −66.24 | x5 | −65.78 | x5 | −68.92 |
| x4 | −66.24 | x2 | −65.89 | F4 | −69.16 |
| x5 | −66.34 | x4 | −65.89 | F19 | −69.18 |
| F19 | −66.70 | F4 | −66.13 | x2 | −69.42 |
| F4 | −66.84 | F19 | −66.14 | x4 | −69.42 |
| x8 | −67.00 | x8 | −66.25 | x8 | −69.74 |
| x6 | −67.23 | x6 | −66.49 | F18 | −69.80 |
| F18 | −67.28 | F2 | −66.62 | F2 | −69.94 |
| F2 | −67.37 | F18 | −66.70 | x6 | −70.01 |
| F7 | −67.39 | F14 | −66.77 | F12 | −70.21 |
| F12 | −67.42 | F7 | −66.84 | F14 | −70.23 |
| F14 | −67.47 | F12 | −66.86 | F11 | −70.28 |
| F11 | −67.77 | F11 | −66.98 | F7 | −70.35 |
| F1 | −67.86 | F1 | −67.06 | F1 | −70.37 |
| F6 | −67.94 | F6 | −67.15 | F6 | −70.51 |
| x1 | −68.03 | F9 | −67.23 | F9 | −70.51 |
| x7 | −68.03 | x3 | −67.26 | F17 | −70.65 |
| x3 | −68.04 | x1 | −67.28 | F3 | −70.68 |
| F9 | −68.04 | x7 | −67.28 | F16 | −70.72 |
| F17 | −68.16 | F17 | −67.36 | F8 | −70.79 |
| F8 | −68.18 | F8 | −67.40 | F10 | −70.82 |
| F3 | −68.25 | F3 | −67.46 | x1 | −70.94 |
| F16 | −68.28 | F16 | −67.48 | x7 | −70.94 |
| F10 | −68.32 | F10 | −67.51 | F5 | −70.97 |
| F15 | −68.43 | F15 | −67.63 | x3 | −71.00 |
| F5 | −68.51 | F5 | −67.69 | F13 | −71.05 |
| F13 | −68.62 | F13 | −67.80 | F15 | −71.07 |

Figure 17E:
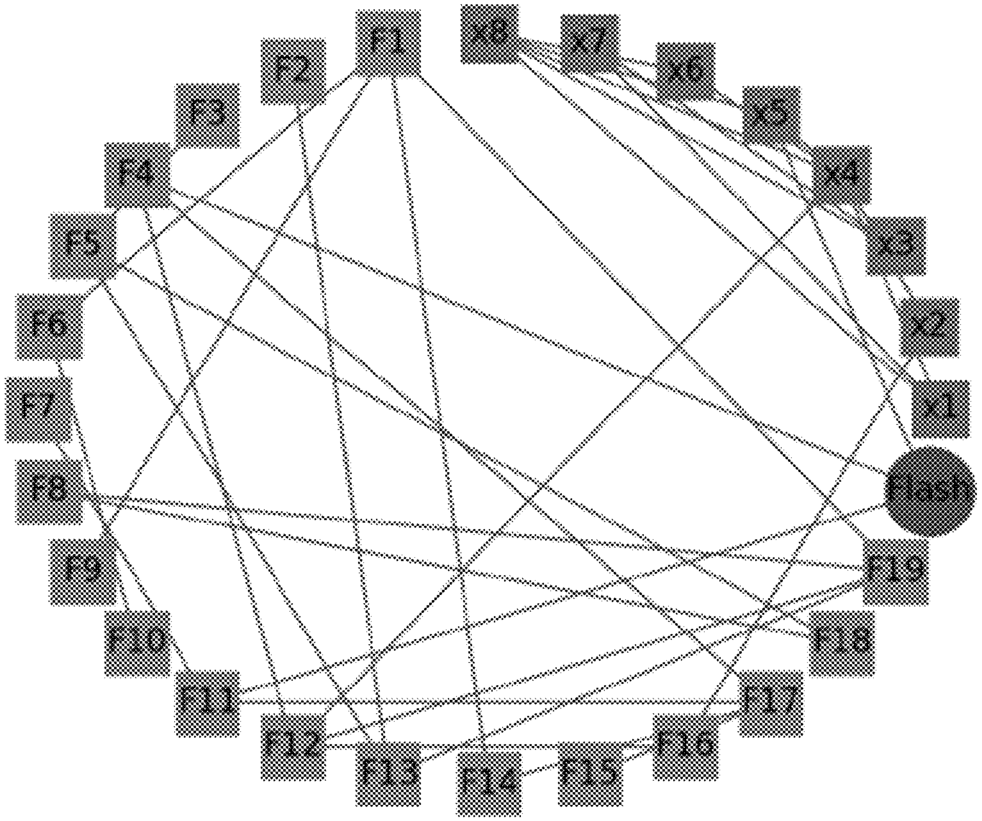
FIG. 17E shows graph representations of Score-based learning (Top) and constraint-based learning (Bottom) in respect of the illustrative injection molding example.
Figure 17E:
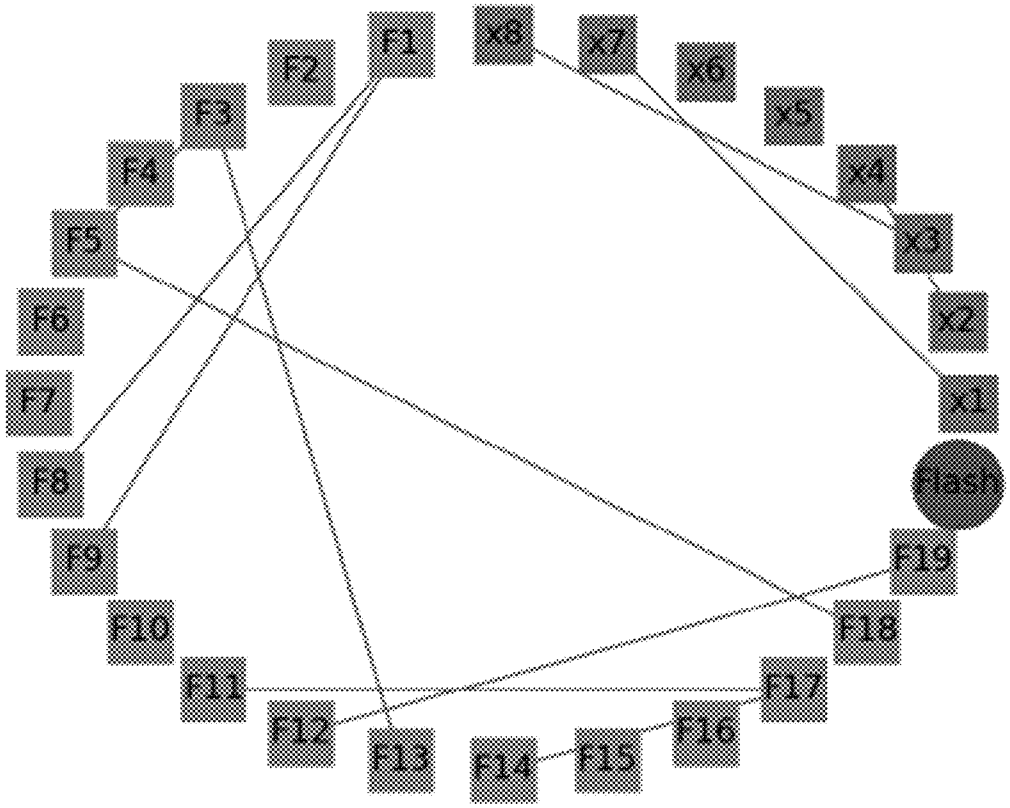

Given 8 setting points, 19 latent factors from sensor time series, and defect Flash, the results of structure learning were compared between score-based (with hill climb search and K2 scores) and constraint-based (with Chi-Square independence test at a significant level of 0.01) methods. Score-based structure learning (FIG. 17E—Top) showed that F4, F11, and x5 (Pack_Time_Setpoint) connected to "Flash". F11 was associated with features [30, 32, 35, 37], which were "Barrel_Pressure_2_autocorrelation" with three different values of lag and "Barrel_Pressure_2_cid_ce" (the complexity of peaks/valleys). And F4 was associated with features [0, 1, 2, 3, 4, 6, 7, 9, 12, 13, 14, 15, 16, 20, 24, 166, €], which were "Barrel_Pressure_0 measures", "Barrel_Pressure_ 2_fft_coefficient", and "Mold_Temperature_3_fft_coefficient". The results indicated that two barrel pressure sensors and one mold temperature sensor were related to the defect "Flash". The physical meaning of the features may provide further information on causality. For example, autocorrelation indicates the degree of similarity or that past values influence the current value.

However, constraint-based structure learning (FIG. 17E—Bottom) showed no connection to "Flash", which meant the connection from "Flash" to any other nodes did not pass the independence test. The connections of F1-F9, F3-F5, F5-F18, F11-F17, F12-F19, F14-F17, x3-x8, and x1-x7 were also observed in the result of score-based structure learning. The different results of two structure learning methods indicated that the hill climb search strategy found a local optimal set of connections which were weak in statistics.

Figure 17F:
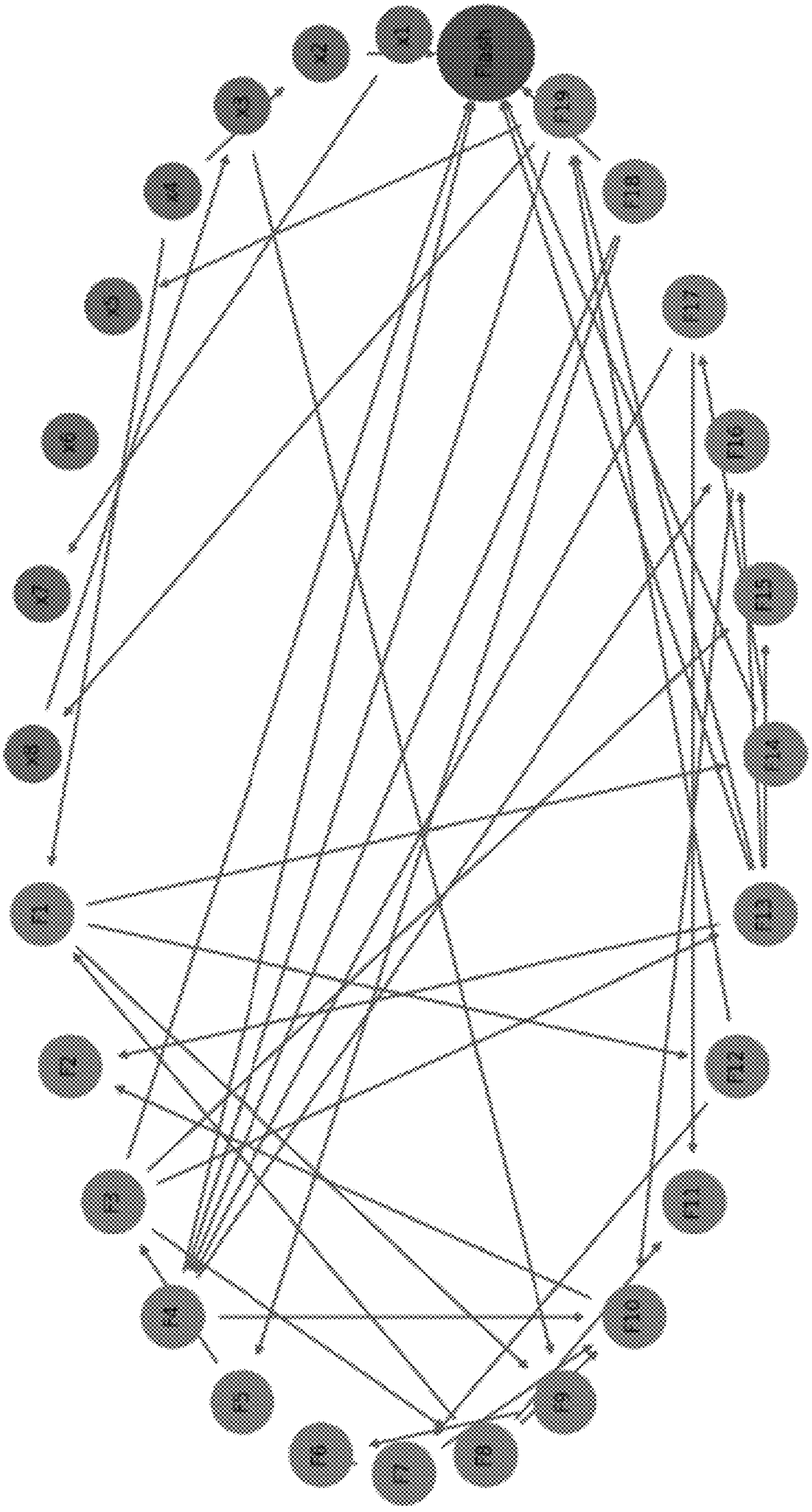
FIG. 17F shows a graph representation of Score-based Structure Learning with heuristic search and tabu strategy in respect of the illustrative injection molding example.

Next, heuristic search strategies were applied. Since the previous local K2 scores (Table 9) have identified the most potential parent nodes of "Flash", the Direct Acyclic Graph structure for starting search could fix the connections of F19-Flash, F4-Flash, and F18-Flash (the top 3 parent nodes). Meanwhile, some connections between x and F failed the independence test (FIG. 17E—Bottom), thus these connections were added into the [black_list]. Furthermore, tabu length was set as double as the default value (default=100) to extend search space. FIG. 17F presents the result of structure learning with heuristic search and tabu strategy: F3, F4, F13, F14, and F18 connecting to "Flash". The corresponding local K2 score was −61.09, which was higher than −68.44 and −71.56 when the parent nodes were [F19, F4, F18] and [F1, F2, F3], respectively.

Hybrid structure learning, such as the MMHC (Max-Min Hill-Climbing) algorithm, combines the constraint-based and score-based methods. The idea is to learn undirected graph skeleton (using the constraint-based construction) before orienting edges (using score-based optimization). The undirected skeleton can be imported as a [white_list] to the Hill-Climbing algorithm.

Parameters Learning. Given a set of data samples and a Directed Acyclic Graph structure that captures the dependencies between the variables, the parameters (Conditional Probability Distributions) of a Discrete Bayesian Network can be learned. The pgmpy library supports three methods: Maximum Likelihood Estimator, Bayesian Estimator, and Expectation Maximization Estimator. In this example, the node "Flash" connected with its parent nodes "F14", "F18", "F19", "F3", "F4", and "x4." Each "F" node or each "x" node had 3 levels (discretized), and the "Flash" node had 2 states: True or False. The tabular listed the probability of "Flash" at each joint condition: P("Flash"|["F14", "F18", "F19", "F3", "F4", "x4" ]).

When estimating parameters for Bayesian Networks, lack of data is a frequent problem. Even if the total sample size is very large, the fact that state counts are done conditionally for each parent node configuration causes immense fragmentation. In this example, the variable "Flash" has 6 parent nodes that each take 3 states, then state counts will be done separately for 3^6=729 parents configurations. This makes the Maximum Likelihood Estimator very fragile and unstable for learning Bayesian Network parameters. A way to mitigate its overfitting is Bayesian Parameter Estimation.

The Bayesian Parameter Estimator starts with already existing prior CPDs before the data are observed. The "priors" can have specific distributions or commonly be uniform. The "priors" are then updated, using the state counts from the observed data. The estimated values in the CPDs can be more conservative than those with Maximum Likelihood Estimator.

The Expectation Maximization algorithm can learn the parameters from incomplete data. The idea is to pick up a starting point for parameter learning and iterate two steps: (1) expectation step to "complete" the data based on current parameters, and (2) maximization step to estimate parameters based on current data.

The most common use of the Expectation Maximization algorithm is learning with latent variables. Latent variables are never observed but important for capturing some structures of data. Latent variables are useful for model sparsity (less parameters), discovering clusters in data, and dealing with missing data. Since latent variables satisfy the missing-at-random assumptions, the Expectation Maximization algorithm is applicable when some latent variables in the model do not have values.

Figure 17G:
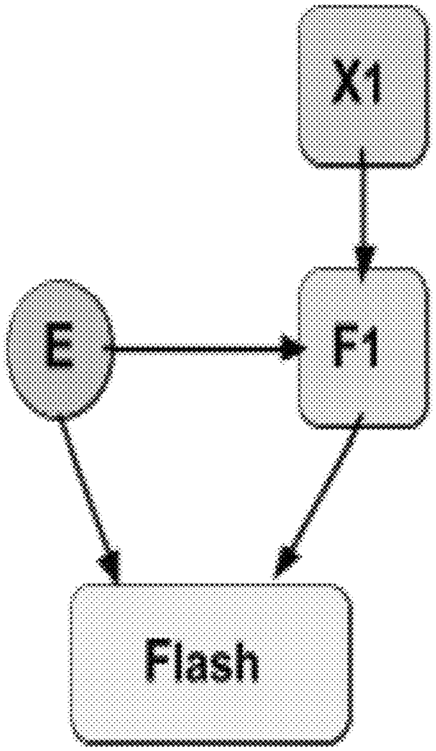
FIG. 17G is a block diagram, showing an example of parameter learning with the Expectation Maximization algorithm, in respect of the illustrative injection molding example.

FIG. 17G presents an example of parameter learning with the Expectation Maximization algorithm. Latent variable "E" represents the environment, which is not observed (no data). "E" is assumed to have two states of cardinality. Setting input "x1" and feature variable "F1" are observed and each has three states of cardinality. The edges (x1, F1), (E, F1), (E, Flash), and (F1, Flash) are based on the knowledge that the setting input and the environment would affect the sensor data and both the environment and the feature are related to the defect Flash. The Expectation Maximization algorithm calculates the Conditional Probability Distributions for each variable. The tabular of P(Flash|[E, F1]) shows that flash is more likely to occur (0.6>0.4) at the condition of Medium F1 and flash is less likely to occur (0.42<0.58) at the condition of High F1. The tabular of P(F1|[E, x1]) shows that at the condition of High x1, F1 is unlikely to exist (P=0.00).

Inference algorithms deal with efficiently finding the conditional probability queries. Two algorithms are available in the pgmpy package for inference: Variable Elimination and Belief Propagation. Both of them are exact inference algorithms. The basic concept of Variable Elimination is sum over Joint Distribution. The elimination order is evaluated through heuristic functions, which assign an elimination cost to each node that has to be removed.

Belief propagation, also known as sum-product message passing, calculates the marginal distribution for each unobserved variable, conditional on any observed variables. The belief is the normalized product of likelihood and priors (i.e. the probabilities of certain events already known in the beginning).

The inference process attempts at answering to some key questions using probability queries about the defects scenario: A considerable setpoint value growth lead to an increase of one type of defects; An increase of time series features are important factors in flash; One setpoint increase leads to some features change; An increase of environmental parameter is evidence of an increase of flash; A reduction of one critical feature value is evidence of a reduction of one type of defects; One setpoint value reduction and one feature value increase impact significantly on a specific defect at a specific location.

Path Strength

Structure learning with Probability-Graphic-Model demonstrates the dependency between variables. The associated variables are connected with each other by Directed Acyclic Lines. One variable can be a child node of several parent nodes (variables). The evaluation of the strength of dependency between the variables is critical for causality inference.

Two ways to calculate the strength of dependency are as follows: one is the Chi-Square Test for dependency. In the pgmpy package, ITests.chi_square( ) would return Chi statistics and p-value. The higher the Chi statistics, the lower the p-value, the stronger strength of dependen-cy. The other way is to use a score function such as k2, Bayesian Dirichlet equivalent uniform (BDeu), BDs, factorized Normalized Maximum Likelihood (fNML), or Bayesian Information Criterion (BIC), which measures how much a given variable is "influenced" by a given list of potential parents. The higher the score, the stronger the dependency.

The first scoring method calculates the dependency score of only two variables. However, the second scoring method can compute a score for either only two variables or the whole structure including a sequence of parent-child nodes. When computing the structure score, it relies on the probability distribution of the variables, as well as conditional probability between the variables. Therefore, both scoring methods can provide the strength of dependency in local and global perspectives.

Further Example 2

Figure 18A:
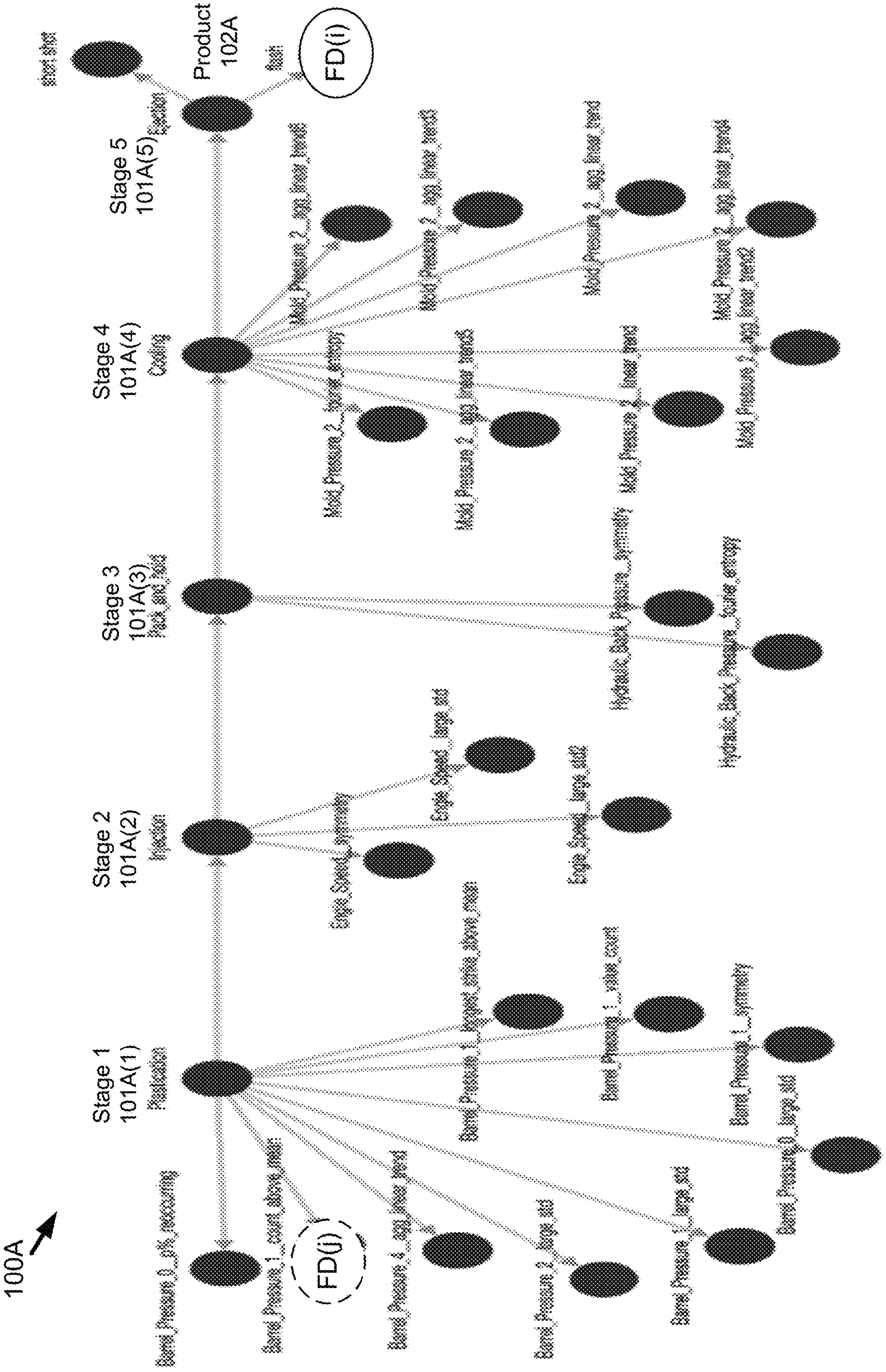
FIG. 18A illustrates an interactive graphical user interface (GUI) depicting a process graph representing an industrial process according to a further illustrative example.

FIG. 18A shows a further example of a representation of a process graph 100A that can be generated in respect of an injection molding process. In the illustrated embodiment, a visual representation of process graph 100A can be displayed as part of an interactive GUI, which may for example be displayed by a client module 310 on a display screen of a computer device. The data that is included in the interactive GUI may be obtained, for example, from an application program interface supported by insight generator 1202. Process graph 100A includes nodes that represent actual physical stages of the injection molding process, namely: Stage 1 node, representing a plastication (heating) stage 101A(1); Stage 2 node, representing an injection stage 101A(2); Stage 3 node, representing a pack and hold stage 101A(3); Stage 4 node, representing a cooling stage 101A (4); and Stage 5 node, representing an ejection stage 101A (5). Process graph 100A also includes respective sets of data nodes that are associated with (e.g., connected by edges to) the physical stage nodes. These data nodes can include measured data MD elements, measured feature descriptors FD that have been derived from measured data MD elements, specified data SD elements, and specific feature descriptors FD that have been derived from specified data SD elements.

In the illustrated example of FIG. 18A, one of the product data measured feature descriptors FD for product 102A represented as a node is a "Flash" feature descriptor node FD(i). The value for "Flash" feature descriptor node FD(i) can, for example, be derived from a measured data MD element that takes the from of an image of the ejected product 102A captured by an image sensor. The image is processed by an ML model 330 that has been pretrained to process a product image and map that image to a classification of either "Flash" (indicating a fash defect) or "No Flash". In the illustrated example the "Flash" feature descriptor node FD(i) has been mapped to "Flash", indicating that the product 102A has a flash defect. Further in FIG. 18A, one of the process data measured feature descriptors FD obtained in respect of Stage 1 (a plastication stage 101A(1)) is "Barrel_Pressure_1_count above mean" feature descriptor node FD(j), which is derived from a time-series of barrel pressure measurements.

Figure 18B:
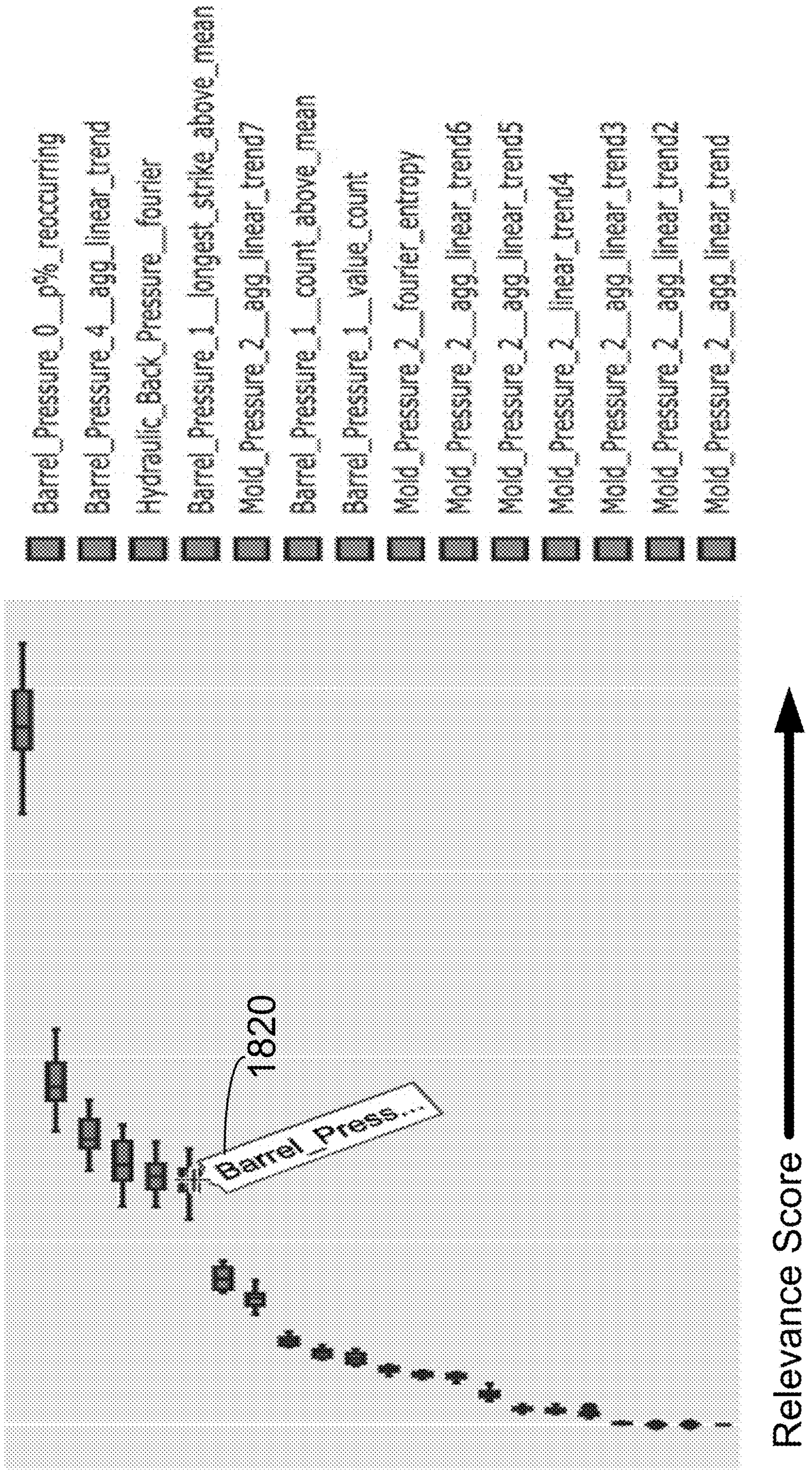
FIG. 18B illustrates a GUI depicting ranked importance of feature descriptors included in the process graph of FIG. 18A.

In the illustrated example, insight generator 1202 has access to a PGM 608 that has been obtained based on historic process data and product data processed for the injection molding represented in process graph 100A. An operator has selected the product data "Flash" feature descriptor node FD(i) from the GUI. In response to user selection of the "Flash" feature descriptor node FD(i), PGM processing module 1202 processes PGM 608 using context prediction generator 1206 to identify which of the feature descriptors FDs included in the process graph of FIG. 18A are relevant to the selected "Flash" feature descriptor node FD(i). In an example implementation, "Relevance Scores" are generated for each of the feature descriptors FDs using context prediction techniques described above. A further GUI display is generated (FIG. 18B) that depicts, in plot form, the ranked importance of the most relevant feature descriptors FDs included in the process graph of FIG. 18A. The GUI can also represent the most relevant feature descriptors FDs in tabular format, with relevance scores, as illustrated in FIG. 18C.

Referring again to FIG. 18A, in the illustrated example, the user/operator has also use a navigation pointer to select "Barrel_Pressure_1_count above mean" feature descriptor node FD(j). As a result, the "Barrel_Pressure 1_count above mean" feature descriptor node FD(j) is visually highlighted with a visible marker 1820 in the relevance plot of FIG. 18B.

Figure 18D:
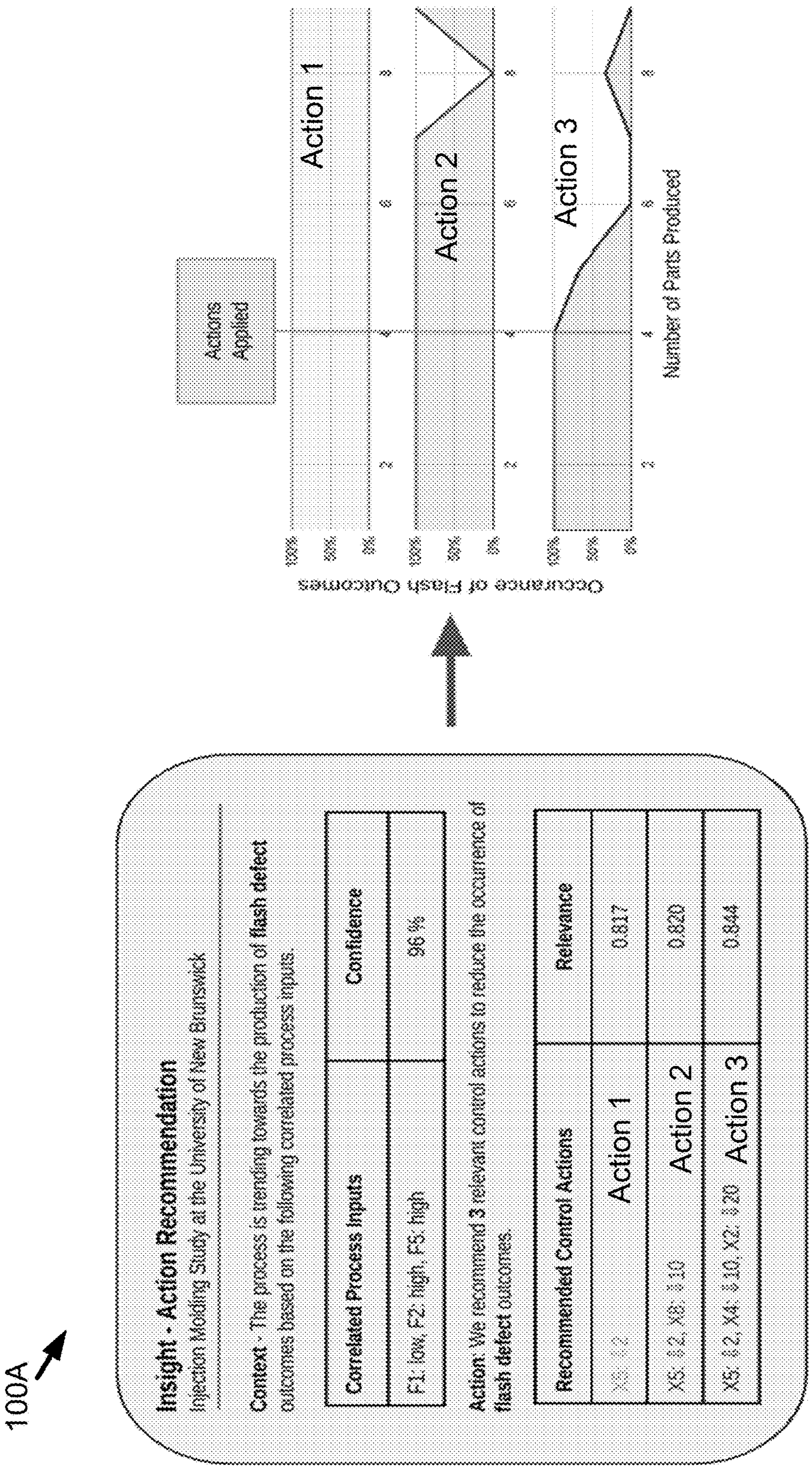
FIG. 18D illustrates a GUI depicting a prescriptive insight for the industrial process and a plot of the production of flash related to three recommended control actions.

In the illustrated example, PGM processing module 1202 processes PGM 608 using insight generator 1202 to generate insights based on the current values of data nodes in the process graph 100A. In this regard, FIG. 18D illustrates a GUI depicting a prescriptive insight for the industrial process and a plot predicting the future production of flash related to three recommended control actions. The prescriptive insight recommends three different control actions, each of which specifies a different set of setpoint adjustments (e.g., specified data SD element adjustments), with the predictive plots showing an anticipated result for each of the respective recommendations.

Figure 18E:
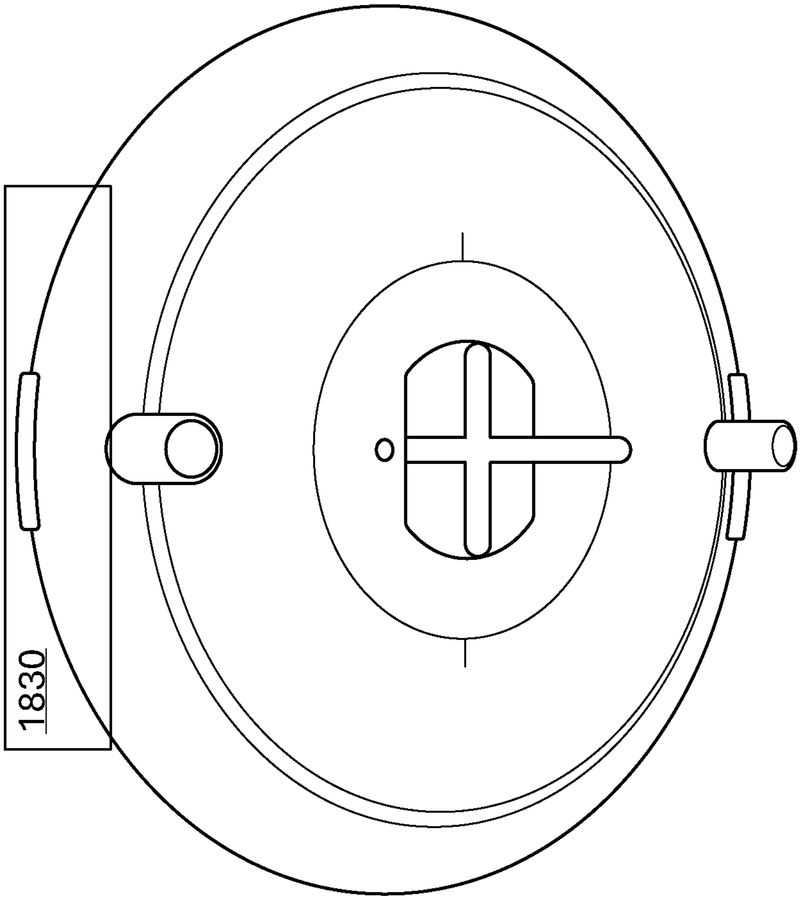
FIG. 18E illustrates a GUI depicting an image of a part generated by the industrial process, indicating a flash defect.

In some examples, the GUI can also display image representations of measured data MD elements and/or feature descriptors FS. By way of example, FIG. 18E illustrates a GUI depicting an image of a part generated by the industrial process, indicating a flash defect highlighted by a visual marker (e.g., a bounding box) 1830. In the illustrated example, the image of the part corresponds to a measured data MD element that has been processed using an object detection MLM that has been trained to locate and classify flash defects. Thus, bounding box 1830 represents the derived "Flash" feature descriptor FD(i).

Figure 18F:
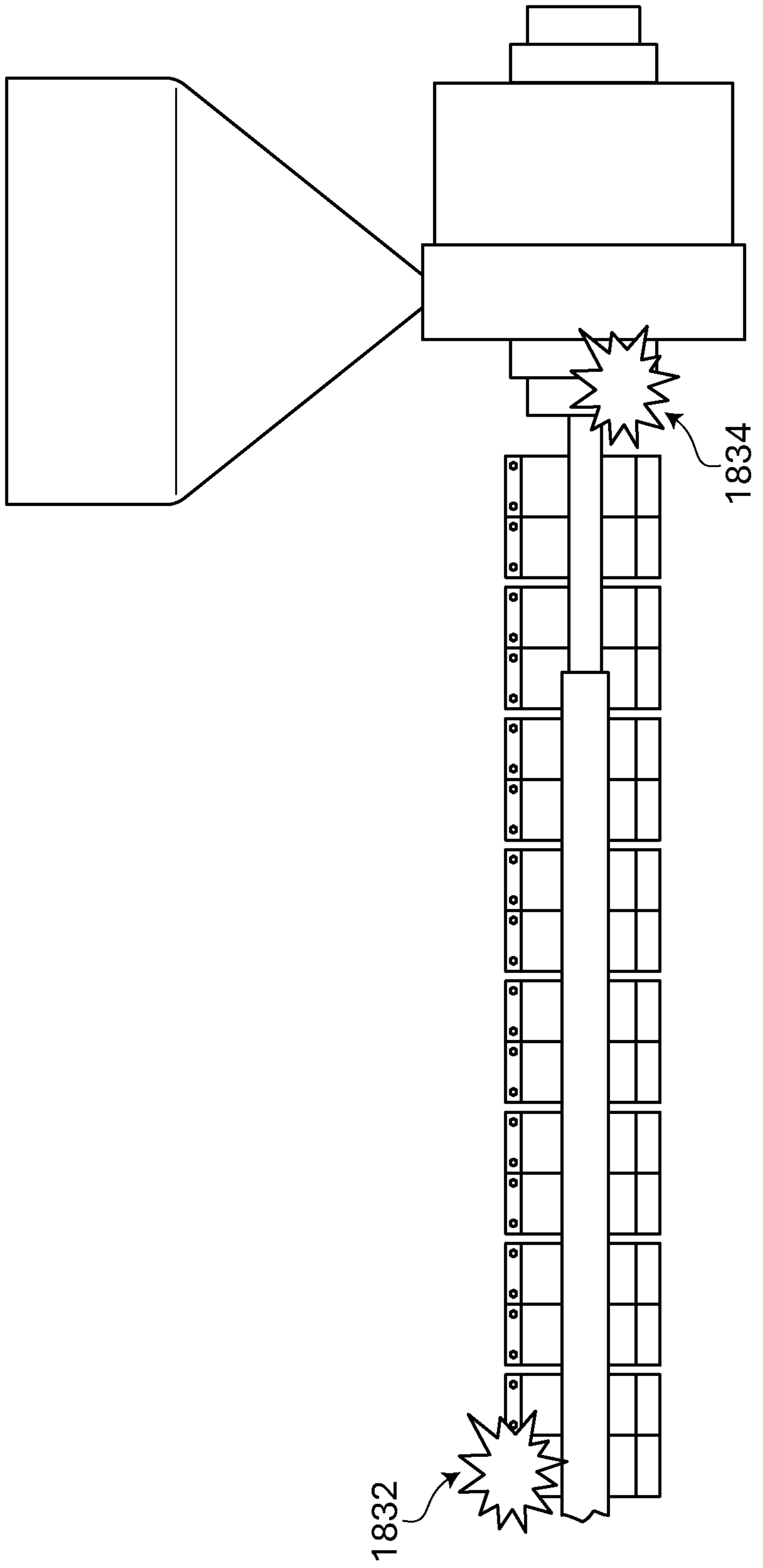
FIG. 18F illustrates a GUI depicting an image of the industrial process that has been highlighted to show regions of interest.

In some examples, the GUI can also display image representations of the industrial process overlaid with region of interest markers that correspond to detected faults and the process or data nodes that are identified as relevant to such defects. By way of example, FIG. 18F illustrates a GUI depicting an image of the industrial process (an IMM in the illustrated example) that has been highlighted to show regions of interest. Region of interest markers 1832 and 1834 indicate sensor locations that correspond to feature descriptors FDs that have been identified as highly important to a detected "Flash" defect.

Some example aspects of the present disclosure are summarized in the following clauses.

Clause 1: Method or system to associate manufacturing process data to product data using measured data (MD), specified data (SD), and associated feature descriptors (FD) to construct application-specific causal networks from preconfigured process graphs for the purposes of automatically generating descriptive, predictive, and prescriptive insights, for manufacturing applications that can be communicated to process operators and process control systems for improved process decision making and performance improvements. In at least some examples, the application-specific causal networks are constructed without human input.

In some examples, expert judgements or user learning can be added to the causal networks if correctness is approved by the data Clause 2: (Data collection interfaces) Clause 1 whereby the measured data (MD) and specified data (SD) for the process and product are collected with an edge device: inline at the machine through a PLC or other communication interface; inline during the production process from external sensors directly connected to the edge device; from manual operator inputs through a human-machine-interface; and/or from other factory data sources such as upstream machines and other process and user management systems.

Clause 3: (Product quality data) Method or system according to one or more of the previous clauses, whereby the specified data (SD) of the product may describe desired characteristics of the product preconfigured for the application, such as geometry, surface texture, and quality thresholds and the measured data (MD) of the product may be collected from one or more quality-based inspection devices, such as a machine vision sensor, colour measurement sensor, or 3D measurement sensor, and one or more algorithms compute associated quality-based metrics that can be used as feature descriptors (FD) (eg. using a trained machine learning model that computes 'good' and 'defect' quality labels).

Clause 4: (Standardized product data) Method or system according to one or more of the previous clauses, whereby the product has an associated CAD model and measured data (MD) collected from one or more machine vision sensor is standardized through a post-processing operation to remove undesired variabilities, such as pose variations and background changes, and the associated feature descriptors (FD) are derived from geometric characteristics of the product (eg. warpage, defect proximity, colors/temperature profiles at particular locations/paths).

Clause 5: (Feature descriptors) Method or system according to one or more of the previous clauses, whereby: the collected data is pre or post-processed using specialized algorithms to standardize/normalize the data applied to improve the compatibility of data within the causal network; trained machine learning models are applied to the pre/post/un-processed data to generate associated lower dimensional feature vectors or logit scores that can be used as feature descriptors (FD) within the causal network; and feature extraction techniques are applied to the pre/post/un-processed data to generate associated lower dimensional feature descriptors (FD) within the causal network.

Clause 6: (Transferability) Method or system according to one or more of the previous clauses, whereby the process data included in the causal network may include: one or more machines manufacturing the same product or similar product (eg. different materials, finishes, etc.); one or more machines manufacturing different products that incorporate similar processes; and/or one or more products from the same manufacturing process.

Clause 7: (Data processing devices) Method or system according to one or more of the previous clauses, whereby: the data collection, processing, and insight generation are completed inline at a factory with an edge device; the data collection is completed inline at a factory with an edge device and communicated to a connected cloud server that performs the processing and insight generation; and/or where the insight results are communicated from a cloud server to an edge device or human-machine-interface for operator interactions.

Clause 8: (Application-specific process graph) Method or system for creation of an application-specific process graph for manufacturing from a set of inputs containing measured data (MD) and specified data (SD) that is used to generate a causal network, where the process graph and causal network are generated from any combination of: Operator or subject-matter-expert inputs during configuration, either through the use of whitelists, blacklists, or connectivity graphs/matrices/maps; the use of Large-Language-Models (LLMs) to intelligently organize the process graph structure and to identify relevant connectivity graphs/matrices/maps based on learned application contexts; and/or the use of statistical algorithms to automatically identify relevant relationships and connections, such as Probabilistic Graphical Models (PGMs).

Clause 9: (Application-specific causal network) Method or system for development of an application-specific causal network from a process graph that associates process data and product data where the high-level causal network is expanded by incorporating further feature descriptor (FD) nodes, where feature descriptors are derived from applying customized feature extraction and feature selection pipelines or trained machine learning models to the measured data (MD) and specified data (SD) and inserting the resulting feature descriptor nodes into the causal network.

Clause 10: (Product insight) Method or system for leveraging an application-specific causal network to perform product focused analysis, such as product quality root cause investigations, and generate associated descriptive, predictive, and prescriptive manufacturing insights that can be communicated to process operators and process control systems for improved process decision making and performance improvements.

Clause 11: (Process insight) Method or system for leveraging an application-specific causal network to perform process focused analysis, such as process health investigations, and generate associated descriptive, predictive, and prescriptive manufacturing insights that can be communicated to process operators and process control systems for improved process decision making and performance improvements.

Clause 12: (Insight interface) Method or system of clause 10 or 11 whereby the generated manufacturing insights are: presented to the user through a local HMI device for in-factory actions, such as recommended operator interactions or recommended control action changes; presented to the user through a cloud-connected computing device accessing a cloud platform for the purposes of offline data exploration; presented to the machine control network for automatic adjustment of controller settings; and/or configured and generated through the cloud platform then communicated to a local edge device and/or HMI for in-factory actions, such as recommended operator actions or automated control actions.

Clause 13: (Insight generation) Method or system for leveraging an application-specific causal network to generate: descriptive insights for communicating process/product relationships/knowledge to a user; predictive insights for modeling process/product relationships and outcome prediction and communicating these aspects to a user; and/or prescriptive insights for recommending process improvements and risk mitigation to a user.

Clause 14: (LLM input/output interpretation layers) A natural language interpretation layer to transform expert knowledge into the causal network domain and to interpret contextualized causal data for interpretability and guided human intervention, whereby the interpretation layer leverages Large-Language-Model (LLM) machine learning architectures to: generate semantic causal structures from real-time natural expert knowledge capture system; generate semantic causal structures from publicly available literature; generate semantic embeddings for all elements of the contextualized causal network; and/or generate natural language explanations of context prediction and causal prediction in the formation of descriptive, predictive and prescriptive insights.

Clause 15: (LLM refinement) Clause 14 whereby the LLM is used to evaluate the long range historical relationships between generated insights and their impact on real-time operating environments to refine and adapt the data context for the purpose of improving the quality of interactions with the system users.

Although the present disclosure describes methods and processes with steps in a certain order, one or more steps of the methods and processes may be omitted or altered as appropriate. One or more steps may take place in an order other than that in which they are described, as appropriate. As used herein, statements that a second item (e.g., a signal, value, label, classification, attribute, scalar, vector, matrix, calculation) is "based on" a first item can mean that characteristics of the second item are affected or determined at least in part by characteristics of the first item. The first item can be considered an input to an operation or calculation, or a series of operations or calculations that produces the second item as an output that is not independent from the first item. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of any publications identified in this disclosure are incorporated herein by reference.

The invention claimed is:

1. A method of generating a causal network representation of an industrial process that is configured to perform one or more process operations to generate a product, comprising:

obtaining a process graph that comprises a set of data nodes for the industrial process, the set of data nodes including:

for at least some of the process operations, a respective set of operation specific process data nodes, wherein the operation specific process data nodes for each respective process operation represent variables that are specified, measured or derived for the respective process operation, and one or more product data nodes that represent variables that are specified, measured, or derived for the product;

learning a probabilistic graph model (PGM) for the industrial process based on the process graph and historic process and product data collected for the industrial process in respect of the data nodes, wherein learning the PGM comprises:

computing a graph structure based on the process graph and the historic process and product data, the graph structure including a subset of the set of data nodes from the process graph and defining a set of edges that connect data nodes within the subset that have been identified as having causal relationships, and computing a set of parameters that includes a respective probability for each of the edges in the set of edges, the respective probability for each edge indicating a causal relationship probability between the data nodes that are connected by the edge, wherein the PGM comprises the computed graph structure and the computed set of parameters; and storing the learned PGM.

2. The method of claim 1 further comprising:

obtaining new values in respect of the industrial process for the variables of the data nodes represented in the process graph;

generating predictions or insights in respect of the process based on the new values and the PGM; and performing an action based on the generated predictions or insights.

3. The method of claim 2 wherein the action comprises causing information about the predictions or insights to be displayed as part of a graphical user interface display.

4. The method of claim 2 wherein the action comprises causing an operating parameter of the industrial process to be adjusted.

5. The method of claim 2 wherein generating the predictions or insights comprises performing causality structure predictions or conditional probability inference to generate a causal information prediction that estimates the relevance of relationships between respective pairs of the data nodes included in the graph structure.

6. The method of claim 5 wherein the causal information prediction is provided for at least one pair of data nodes that are not directly connected to each other by an edge.

7. The method of claim 2 wherein at least some of the data nodes have associated semantic descriptors, wherein generating the predictions or insights comprises generating insights based on the output of large language model (LLM) that has received at least some of the associated semantic descriptors as inputs.

8. The method of claim 1 wherein at least some of the data nodes are associated with a respective semantic descriptor that provides a natural language context for the variable that is represented by the data node.

9. The method of claim 8 wherein obtaining the process graph comprises prompting an LLM with information about the industrial process and receiving a list of proposed data nodes together with associated semantic descriptors for the process graph in response to the prompting.

10. The method of claim 8 wherein the respective set of operation specific data nodes for at least one of the process operations includes: specified data (SD) nodes that represent variables that are specified for the respective process operation; measured data (MD) nodes that represent variables that are obtained using respective process operation sensors at the respective process operation; and feature descriptor (FD) nodes that represent variables that are derived from data included in SD nodes or MD nodes.

11. The method of claim 8 comprising obtaining a value for an FD node by: (i) computing a representative value for time series of MD node values; or (ii) applying a machine learning based model to map an image captured for an MD node to a node value.

12. The method of claim 8 wherein computing the graph structure comprises computing an optimized graph structure by applying a structure learning algorithm to identify non-relevant data nodes and non-relevant edges that are represented in the process graph.

13. The method of claim 1 wherein obtaining the PGM model further comprises obtaining a base PGM model for a different industrial process and applying transfer learning to adapt the base PGM model for the industrial process.

14. The method of claim 1 wherein the data nodes include a quality related data node representing a variable that indicates a quality of the product, and the PGM model embeds causal relationship information indicative of the relevance of other data nodes within the PGM model to the quality related data node.

15. The method of claim 1 wherein the set of parameters that includes respective probability for each of the edges in the set of edges are represented as one or more conditional probability tables.

16. The method of claim 1 wherein the industrial process in an injection molding process.

17. A system comprising a processor and a persistent storage that stores instructions that, when executed by the processor configuring the system to perform a method of generating a causal network representation of an industrial process that is configured to perform one or more process operations to generate a product, the method comprising:

obtaining a process graph that comprises a set of data nodes for the industrial process, the set of data nodes including: (i) for at least some of the process operations, a respective set of operation specific process data nodes, wherein the operation specific process data nodes for each respective process operation represent variables that are specified, measured or derived for the respective process operation, and (ii) one or more product data nodes that represent variables that are specified, measured, or derived for the product;

learning a probabilistic graph model (PGM) for the industrial process based on the process graph and historic process and product data collected for the industrial process in respect of the data nodes, wherein learning the PGM comprises: (i) computing a graph structure based on the process graph and the historic process and product data, the graph structure including a subset of the set of data nodes from the process graph and defining a set of edges that connect data nodes within the subset that have been identified as having causal relationships, and (ii) computing a set of parameters that includes a respective probability for each of the edges in the set of edges, the respective probability for each edge indicating a causal relationship probability between the data nodes that are connected by the edge, wherein the PGM comprises the computed graph structure and the computed set of parameters; and storing the learned PGM.

18. A system for managing industrial processes comprising:

a data collection module configured to collect specified data (SD) and measured data (MD) from an industrial process;

a processing module configured to process the collected data to generate feature descriptors (FD) from the specified data (SD) and measured data (MD);

a graphical modeling engine configured to generate a probabilistic graphical model (PGM) from the feature descriptors (FD), specified data (SD), and measured data (MD);

an PGM processing module configured to produce context predictions or insights based on the PGM; and a client module configured to present the generated insights to process operators through an interactive graphical user interface (GUI).

19. The system of claim 18 wherein the data collection module is further configured to collect data from inline process components, including machine-based controllers and sensors, and manual operator inputs through a human-machine interface.

20. The system of claim 18 wherein the specified data (SD) includes predefined product characteristics and the measured data (MD) includes information collected from quality-based inspection devices such as machine vision sensors.

* * * * *